United States Patent
Cheung et al.

(10) Patent No.: US 7,835,943 B2
(45) Date of Patent: Nov. 16, 2010

(54) SYSTEM AND METHOD FOR PROVIDING PLACE AND PRICE PROTECTION IN A SEARCH RESULT LIST GENERATED BY A COMPUTER NETWORK SEARCH ENGINE

(75) Inventors: Dominic Dough-Ming Cheung, South Pasadena, CA (US); Narinder Pal Singh, Half Moon Bay, CA (US); Thomas A. Soulanille, Pasedena, CA (US); Darren J. Davis, Rowland Heights, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1790 days.

(21) Appl. No.: 09/922,028

(22) Filed: Aug. 3, 2001

(65) Prior Publication Data
US 2002/0169760 A1   Nov. 14, 2002

Related U.S. Application Data

(63) Continuation-in-part of application No. 09/911,674, filed on Jul. 24, 2001, now Pat. No. 7,092,901, which is a continuation of application No. 09/322,677, filed on May 28, 1999, now Pat. No. 6,269,361.

(51) Int. Cl.
G06Q 30/00   (2006.01)
G06F 7/00    (2006.01)
G06F 17/30   (2006.01)
G06F 3/00    (2006.01)

(52) U.S. Cl. .................. 705/26; 707/3; 707/4; 707/5; 707/102; 707/104.1; 715/760

(58) Field of Classification Search .................. 705/1, 705/14, 38–40, 26, 27; 707/1–5, 102, 104.1; 715/1, 500, 517, 760; 709/217, 224
See application file for complete search history.

(56) References Cited

U.S. PATENT DOCUMENTS 5,659,732 A   8/1997   Kirsch ..................... 395/605

(Continued)

FOREIGN PATENT DOCUMENTS

EP   1 282 060 A3   3/2004

(Continued)

OTHER PUBLICATIONS

Jackson, Tim; "Cash is the key to a true portal: Goto.com has found a way to make searching profitable in itself, in a radical depature from the service other sites and engines provide; [London Edition]"; Financial Times London (UK); Feb. 2, 1999; pp. 1-3.*

(Continued)

*Primary Examiner*—Ella Colbert
(74) *Attorney, Agent, or Firm*—Brinks Hofer Gilson & Lione

(57) ABSTRACT

A method and apparatus for managing search listings in a search database include storing one or more search listings for an advertiser. Each search listing includes an associated search term. The system receives from the advertiser identification information for a search listing and a desired rank for the identified search listing, a maximum cost per click for the search listing, or both. The system stores the desired rank and/or maximum cost per click for the search listing. The system then determines a cost per click for the identified search listing based on the desired rank and other search listings which include the search term associated with the identified search listing.

8 Claims, 39 Drawing Sheets

U.S. PATENT DOCUMENTS

| | | | | |
|---|---|---|---|---|
| 5,717,923 | A | 2/1998 | Dedrick | 396/613 |
| 5,724,424 | A | 3/1998 | Gifford | 380/24 |
| 5,724,521 | A | 3/1998 | Dedrick | 395/226 |
| 5,724,524 | A | 3/1998 | Hunt et al. | 395/237 |
| 5,745,882 | A | 4/1998 | Bixler et al. | |
| 5,748,954 | A | 5/1998 | Maudlin | 395/610 |
| 5,752,238 | A | 5/1998 | Dedrick | 705/14 |
| 5,768,521 | A | 6/1998 | Dedrick | 395/226 |
| 5,778,367 | A | 7/1998 | Wesinger, Jr. et al. | |
| 5,794,210 | A | 8/1998 | Goldhaber et al. | |
| 5,826,241 | A | 10/1998 | Stein et al. | 705/26 |
| 5,848,397 | A | 12/1998 | Marsh et al. | 705/14 |
| 5,848,407 | A | 12/1998 | Ishikawa et al. | 707/2 |
| 5,852,820 | A | 12/1998 | Burrows | 707/2 |
| 5,855,008 | A | 12/1998 | Goldhaber et al. | 705/14 |
| 5,862,223 | A | 1/1999 | Walker et al. | |
| 5,864,845 | A | 1/1999 | Voorhees et al. | 707/5 |
| 5,864,846 | A | 1/1999 | Voorhees et al. | 707/5 |
| 5,903,882 | A | 5/1999 | Asay et al. | 705/44 |
| 5,918,014 | A | 6/1999 | Robinson | 395/200.49 |
| 5,920,854 | A | 7/1999 | Kirsch et al. | 707/3 |
| 5,920,859 | A | 7/1999 | Li | 707/5 |
| 5,930,777 | A * | 7/1999 | Barber | 705/40 |
| 5,946,646 | A | 8/1999 | Schena et al. | |
| 5,974,398 | A | 10/1999 | Hanson et al. | |
| 6,078,866 | A * | 6/2000 | Buck et al. | 702/2 |
| 6,223,178 | B1 | 4/2001 | Himmel et al. | |
| 6,243,691 | B1 | 6/2001 | Fisher et al. | 705/37 |
| 6,269,361 | B1 | 7/2001 | Davis et al. | |
| 6,296,361 | B1 | 7/2001 | Davis et al. | 707/3 |
| 6,278,966 | B1 * | 8/2001 | Howard et al. | 703/23 |
| 6,285,987 | B1 | 9/2001 | Roth et al. | |
| 6,370,527 | B1 * | 4/2002 | Singhal | 707/6 |
| 6,421,675 | B1 * | 7/2002 | Ryan et al. | 707/100 |
| 6,907,566 | B1 * | 6/2005 | McElfresh et al. | 715/210 |
| 7,043,450 | B2 | 5/2006 | Velez et al. | 705/37 |
| 7,225,151 | B1 | 5/2007 | Konia | 705/37 |
| 7,373,599 | B2 * | 5/2008 | McElfresh et al. | 715/210 |
| 2002/0004735 | A1 | 1/2002 | Gross | |
| 2004/0008824 | A1 | 1/2004 | Resuta | 379/27.02 |
| 2006/0253434 | A1 | 11/2006 | Beriker et al. | 707/3 |

FOREIGN PATENT DOCUMENTS

| | | |
|---|---|---|
| JP | 2001-118011 | 4/2001 |
| WO | WO 97/22066 A | 6/1997 |
| WO | WO 99/20486 | 9/1999 |
| WO | WO 99/48028 | 9/1999 |
| WO | WO 00/16218 | 3/2000 |
| WO | WO 00/16218 A | 3/2000 |
| WO | WO 00/41090 | 7/2000 |
| WO | WO 00/57333 A2 | 9/2000 |
| WO | WO 01/01217 | 1/2001 |
| WO | WO 01/52092 A2 | 7/2001 |
| WO | WO 01/55929 A1 | 8/2001 |
| WO | WO 01/82178 A2 | 11/2001 |

OTHER PUBLICATIONS

Jeff Pelline; "Pay-for-placement gets another shor"; CNet News; Feb. 19, 1998; pp. 1-3.*

Yukari Iwatani; "Search engines' bissing system elimates ads// Strategy: GoTo.com makes money by ranking search results based on which marketer pays the most"; Reuters; Feb. 6, 1999; pp. 1-2.*

Sullivan, R. Lee; "Toll booths on the infor highway"; Forbes; Mar. 25, 1996; vol. 157, Iss. 6; pp. 1-3.*

PR Newswire; @home Network Rich Media Study Reveals Broadband Advertising Offers More Effective Branding and Communications Channel; Mar. 1, 1999; pp. 1-3.*

Patent Cooperation Treaty International Search Report dated Jun. 17, 2003 for corresponding patent application No. PCT/US02/23502, 1 page.

English language translation of German Office Action in corresponding German patent application No. 102 35 429.4, dated Nov. 18, 6 pages.

Clickpatrol, "If you buy and manage cost-per-click advertising, you'll save time and money with Clickpatrol", copyright 2001 ClickPatrol.com, obtained from the Internet at: <http://web.archive.org/web/20010519014126/http://www.clickpatrol.com>, on Nov. 12, 2004, 1 page.

PPC Management—The Ultimate Goto Bidding Software, "The Ultimate, Downloadable, Goto.com Bid Monitoring Software is Here!!!", obtained from the Internet at:: < http://web.archive.org/web/20010721020423/http:/www.ppcmanagemnt.com/>, dated Nov. 12, 2004, 3 pages.

Supplementary Search Report for corresponding European Patent Application No. EP 00 936393, dated Feb. 20, 2004, 3 pages.

Brin, Sergey et al., "The Anatomy of a Large Scale Hypertextual Web Search Engine", *Computer Networks and ISDN Systems*, North Holland Publishing, Amsterdam, NL, dated Apr. 14, 1998, pp. 1-20.

Doran, David, "Search Engines . . . Their popularity, their secrets, their flaws", *Entrepreneur*, Jul. 1998, p. 18.

Glaser, Ken, "Who Will GoTo.com?", OnlinePress.com, dated Feb. 20, 1998, 2 pages.

Kramer, Ralf et al., "Thesaurus federations: loosely integrated thesauri for document retrieval in networks based on Internet technologies", *Int. J. Digit Libr*, 1997, pp. 122-131.

Sullivan, Danny, "GoTo Sells Positions", *The Search Engine Report*, dated Mar. 3, 1998, 4 pages.

"GoTo.com Announces First Round of Financing, Totaling More Than $6 Million, Led by Draper Fisher Jurvetson", *Business Wire*, dated May 19, 1998, printed from Dialog Gale Group New products, 2 pages.

"New Service Puts Ad Auction, Search Engine Under One Roof", *Electronic Advertising & Marketplace Report*, dated Apr. 28, 1998, vol. 12, Issue 8, 2 pages.

Great Britain Search Report dated Feb. 19, 2003 for corresponding patent application No. GB 02182132.9 , 1 page.

News of the Week articles, *Telephony*, May 1, 1995, pp. 8 and 10.

Nuts 'N Bolts articles, *Target Marketing*, Oct. 1997, 1 page.

DoubleClick TestIt!, obtained at the internet address: http://web.archive.org/web/19980205034316/www.doubleclick.com/nf/adinfo/testiset.htm, dated Oct. 16, 2002, 4 pages.

DoubleClick Frequently Asked Questions, obtained at the internet address: http://web.archive.org/web/19980205033925/www.doubleclick.com/nf/adinfo/facts.htm, dated Oct. 16, 2002, 5 pages.

"New Service Puts Ad Auction, Search Engine Under One Roof", article from Electronic Advertising & Marketplace Report, *Simba Information, Inc.* Apr. 28, 1998, 2 pages.

Google Search, communication from Jeffrey Brewer at Jeffrey@goto.com, titled "Need reverse stemming software", dated May 27, 1998, obtained at the internet address: http://groups.google.com/groups?selm= 356CEE4A8DE882A8%40goto.com, on Dec. 19, 2002, 1 page.

Ketchpel, Steven P. et al. "U-PAI: A Universal Payment Application Interface", conference material article from the Second USENIX Workshop on Electronic Commerce Proceedings, Oakland, California, Nov. 18-21, 1996, 17 pages.

Schwartz, Randal L., "Click-Through Tracking in Perl", *Web Techniques*, dated May 1998, located at the internet address: www.webtechniques.com, 3 pages.

Van Roeden, Adriaan, "Your Own Search Engine With SWISH, A Custom Search Facility for Your Web Site", *Web Techniques*, dated Nov. 1996, located at the internet address: www.webtechniques.com, pp. 63-66 pages.

Full Catalog—Categories Menu, Sun Microsystems Sun Solutions Catalog, obtained at the internet address: http://web.archive.org/web/19981205110211/solutions.sun.com/catalogs/all/index.htm, printed on Dec. 19, 2002, 2 pages.

Help on Making Queries—Search by Company or Product, obtained at the internet address: http://web.archive.org/web/19981203050002/solutions.sun.com/search-help.htm, printed on Dec. 19, 2002, 4 pages.

Online Updating, Sun Microsystems Sun Solutions Catalog obtained at the internet address: http://web.archive.org/web/19990220190636/solutions.sun.com/editmodule/help.html, printed on Dec. 19, 2002, 2 pages.

Press Release article titled "GoTo.com Announces First round of Financing, Totaling More Than $6 Million, Led by Draper, Fisher Jurvetson", *Business Wire*, dated May 19, 1998, printed from the Internet at <http://www.dialogclassic.com/main.vingw>on Nov. 9, 2000, 2 pages.

Database of Corporate ResourceNet, "New Service Puts An Auction Search Engine Under One Roof", Electronic Advertising & Marketplace Report, vol. 12, Issue 8, Apr. 1998, p. 6.

Espe, "Online Search Engines Start to Charge for Listings", Washington Business Journal, vol. 18, Issue 1, May 1999, p. 31.

Dawson et al., "2 Search Sites Narrow Their Parameters", Adweek—Western Edition, vol. 48, Issue 42, Oct. 1998, p. 1.

Database of Corporate ResourceNet, "Bits", from Adweek—Eastern Edition, vol. 40, Issue 14, Apr. 1999, p. 46.

Komando, "Searching for Search Engines—from Dogpile to Deja News", Business First—Colombus, vol. 14, Issue 43, Jun. 1998, p. 46.

Database of Corporate ResourceNet, New services Aim to Boost Efficiency of Search Engines, Electronic Advertising & Marketplace Report, vol. 12, Issue 13, Jun. 1998, p. 6.

Database of Corporate ResourceNet, "Goto.com Chooses Quest's SharePlex(R) for Oracle Software to Ensure Uptime for Business-Critical Web Site", PR Newswire, Jun. 2000.

Database of Corporate ResourceNet, "Capitalist Tool", Time Canada, vol. 151, Issue 8. Mar. 1998, p. 41.

Database of DialogClassic(m), :Homestead Technologies' Continued Success Draws $17.50 Million In second Round of Venture Funding, PR Newswire, Apr. 1999.

"APS Search Tools—Patent Search Client Strategy", by US Patent & Trademark Office, Sep. 1997.

"Frequently Asked Questions NT Image Search & Retrieval (IS&R)", by US Patent & Trademark Office, Dec. 1997.

"Chapter 1-Introduction to Dialog", by Dialog Information Service, Inc. pp. 1-1 to 1-14.

"Automated Patent System (APS) Workstation Reference Manual", by US Patent & Trademark Office, Jul. 1996.

Frentzen, Jeff, "Help for Getting the Word Out About Web Sites", PC Week, v14, n46, p. 27(1), Nov. 3, 1997.

Miller, Karen L., "Improve Your Ranking (Building Web Sites to Attract Web Searches)", Home Office Computer, v16, n1, p. 51(2) Jan, 1998.

Wingfiled, "Another Engine Takes Ads by the Click", from http://www.news.com?news/Item/0.4.1387,00/html, May 1996.

Pelline, "New Search Engine Goes Commercial", by CNET News.com, Feb. 1998.

Wang, "Engines Battle Irrelevance of Results—New Search Service Hope to Fill the Void", by Internet World, Feb. 1998.

Vondr Haar, "Searching for the Highest Bidder", from *Inter@active week*.

Riedman, "Search Engine Startup to Auction Listings", from Interactive-Advertising, Feb. 1998.

Rich, "New Search Engine Allows Sites to Pay Their Way to Top", from http://www.adweek.com/iq/iqnews02.asp.

Mardesich, "Web Site Operators Pay for Top Billing—Search Engine Allows Site Sponsors to Buy Place on Special List", from Knight Ridder Newspapers, Mar. 1998.

Hilty, "GoTo.Hell-What Happens When On Line Search Engine Accepts Cash From Web Sites?" from http://www.ocweekly.com/link/archives/97/27/byte-3.11.98-1.html, Mar. 1998.

Flynn, "With GoTo.com's Search Engine, the Highest Bidder Shall Be Ranked First", by the New York Times, Mar. 1998.

Clark, "Start-Up Plans Internet Search Service Tying Results To Advertising Spending", from the Wall Street Journal, Feb. 1998.

"Going, Going . . . ", from A Closer Look of the Wall Street Journal-Marketplace, Apr. 1998.

"Coursey.com", David Coursey's Insider report on Personal Computing, the Internet and Communications, Mar. 1998.

Glaser, "Who Will GoTo.com", from OnlinePress.com, Feb. 1998.

Mardesic, "Search Engine Charges Hit Sites", from http://www.sjmercury.com/business/center/goti022198.html, Feb. 1998.

"News Watch About Search Engines", from http://searchenginewatch.com/ness.html, Feb. 1998.

Wang, "Engines Battle Irrelevence of Results", from Internet World.

Swartz, "Browser Only Lists Paying Web Sites Critics Fear Approach Will Squeeze Out Most Small Internet Players", from http://www.sfgate.com/cgi-bin/ publish on San Francisco Chronicle, Feb. 1998.

McWilliams, PC World Online, Feb. 23, 1998, "Search Engine To Sell Top Positions On Results Lists", from http://www.pcworld.com/news/daily/data/ 0298/....html.

"Search Engine Start Up To Auction Listings", from http://www.adage.com/interactive/daily/index/html, Feb. 1998.

Alyson, "Searching The Search Engines", from Bacon's, May 1998.

Pelline, "Pay-for-placement gets another shot", from http://www.newscom.?news/item/0,4,19307,00.html, Sep. 1997.

IBM Technical Disclosure Bulletin, "Organizing A Ranked List of Search Matches", Nov. 1994.

Jeffrey Brewer, ClickZ Today, Aug. 18, 1998, "Pay-For-Performance: Creating More And Better Value", obtained at the internet address http://www.clickz.com, Aug. 18, 1998.

Jesse Berst, ZDNet, Aug. 17, 1998, "Search Sites' Shocking Secret", obtained at the internet address http://www.zdnet.com/anchordesk/story/story_2432.html, Aug. 17, 1998.

Sara Fisher, "Budding Internet Firm Finds Niche in Satisfaction", L.A. Business Journal, Aug. 10, 1998.

"Disclosure Rules", The Industry Standard—The Newsmagazine of the Internet Economy, Aug. 10, 1998.

G. David Doran, "Pay to Play", Entrepreneur, Jul. 1998, p. 18.

Advertising Age—Interactive Daily Homepage; obtained at the internet address http://www.adage.com/interactive/daily/index.html, Jun. 8, 1998.

Kim Komando, "With About 320 Million Sites, Search Engines Offer Some Help", copyright 1998, Los Angeles Times Syndication.

Margot Williams, "How To Ease Your Online Searches", Lansing State Journal, Jun. 1, 1998.

"GoTo.com Gets Venture Funding", Internet World Magazine, Jun. 1, 1998.

Sasha Alyson, "Searching The Search Engines", Front Page, May 8, 1998.

Advertising Age—Interactive Daily Homepage, Feb. 23, 1998, "Search Engine Startup To Auction Listings", obtained at the internet address http://www.adage.com/interactive/mdaily/index.html.

Brian McWilliams, PC World Online, Feb. 23, 1998, "Search Engine To Sell Top Positions On Results Lists", obtained at the internet address http://www.pcworld.com/news/daily/data/0298/9880223173204.html.

Jon Swartz, San Francisco Chronicle, Feb. 23, 1998, "Browser Only Lists Paying Web Sites Critics Fear Approach Will Squeeze Out Most Small Internet Players", obtained at the internet address http://www.sfgate.com/cgi-bin/arti...le/archive/1998/02/21/BU102470.DTL.

Nelson Wang, "Engines Battle Irrelevance of Results", from http://www.internetworld,com/print/current/news/19980223-battle.html, Feb. 1998.

Search Engine Watch, Feb. 21, 1998, "GoTo Sells Positions", obtained at the internet address http://www.searchenginewatch.com/news.html, Feb. 23, 1998.

Jodi Mardesich, "Search Engine Charges Hit Sites", from http://wwww.sjmercury.com/businrss/center/goto022198.html, Feb. 1998.

Ken Glaser, Who Will GoTo.com?, OnlinePress.com, Feb. 1998.

Jeff Pelline, "New Search Engine Goes Commercial", from http://www.news.com/News/Item/ 0,4,19281,00.html, Feb. 20, 1998.

"Going, Going . . . ", The Wall Street Journal, Apr. 1998. p. B1.

David Coursey, "Coursey.com", Mar. 1998.

Don Clark, "Start-Up Plans Internet Search Service Tying Results To Advertising Spending", The Wall Street Journal, Feb. 20, 1998.

Laurie J. Flynn, "With GoTo.com's Search Engine, The Highest Bidder Shall Be Ranked First", The New York Times, Mar. 1998, p. C1.

Wyn Hilty, OCWeekly byte marks, "GoTo.Hell", from http://www.ocweekly.com/ink/archives/97/27byte-3.11.98-1.shtml, Mar. 13, 1998.

Jodi Mardesich, "Web Site Operators Pay for Top Billing", The News—Herald (Willoughby, OH), Mar. 2, 1998.
Laura Rich, Adweek Online IQ News Online, Feb. 23, 1998, "New Search Engine Allows Sites to Pay Their Way to Top", from http://www.adweek.com/iq/ iqnews02.asp, Feb. 1998.
Patricia Riedman, "Search Engine Startup to Auction Listings", Advertising Age Magazine, Feb. 23, 1998, p. 34.
Steven Vonder Haar, ZDNet,com, Feb. 19, 1998, "Searching For The Highest Bidder", obtained at the internet address http://www.zdnet.com/intweek/daily/980219i.html, Feb. 23, 1998.
Nelson Wang, "Engines Battle Irrelevance of Results", Internet World, Feb. 10, 1998, p. 1.
Interactive Week Magazine, Garden City, N.Y. May 25, 1998.
Jeff Pelline, "New Search Engine Goes Commerical", CNET News.com, from http://www.news.com/News/Item/0,4,19281,00.html, Feb. 20, 1998.
Nick Wingfield, Staff Writer, CNET News.com, Jun. 21, 1996, "Engine Sells Results, Draws Fire", obtained at the internet address http://www.news.com/News/Item/Textonly/0,25,1635,00.html, Jul. 29, 1999.
Nick Wingfield, Staff Writer, CNET News.com, May 22, 1996, "Another Engine Takes Ads By The Click", obtained at the internet address http://www.news.com/News/Item/0,4,1387,00.html, Jul. 29, 1999.
Rose Aguilar, Staff Writer, CNET News.com, Apr. 29, 1996, "New Ad Model Charges By The Click", obtained at the internet address http://www.news.com/News/Item/0,4,1199,00.html, Jul. 29, 1999.
Alex Lash, Staff Writer, CNET News.com, Dec. 11, 1996, "Open Text Updates Tools", obtained at the internet address http://www.news.com/News/Item/0,4,6118,00.html, Jul. 29, 1999.
"About SearchUP, Inc.", Jul. 15, 1999, obtained at the internet address http://www.searchup.com/about.cfm.
"Testimonials"., Jul. 15, 1999, obtained at the internet address http://www.searchup.com/testimonials.cfm.
"Benefits", Jul. 15, 1999, obtained at the internet address http://www.searchup.com/benefits.cfm.
"Information", Jul. 15, 1999, obtained at the internet address http://www.searchup.com/information.cfm.
"Tips & Tricks", Jul. 15, 1999, obtained at the internet address http://www.searchup.com/tipsandtricks.cfm.
Correspondence from Bryan Buck, President of SearchUp.com, Jul. 7, 1999.
Saul Hansell "Alta Vista Invites Advertisers to Pay for Top Ranking", The New York Times, Apr. 15, 1999, p. C2.
Galore—Super Search Engine, May 21, 1999, obtained at the internet address http://www.galore.com/1/mainframe.shtml.
hitsgalore.com Search Engine, May 21, 1999, obtained at the internet address http://www.hitsgalore.com.
I Seek It "The Next Generation Search Engine", May 21, 1999, obtained at the internet address http://www.iseekit.com.
Correspondence from Emilia F. Cannella to Robert Brahms, CEO of BeFirst Internet Corporation regarding findwhat.com, Jul. 20, 1999.
Correspondence from Emilia F. Cannella to Michael Melcher, MC Services regarding SearchUP.com, Jul. 1, 1999.
Correspondence from Emilia F. Cannella to Robert G. Schuler, Esq., Kegler, Brown, Hill & Ritter regarding iseekit.com, Jul. 1, 1999.
Correspondence from Emilia F. Cannella to Andrew Conru, Vote Publishing regarding galore.com, Jun. 30, 1999.
SearchUP.com—Internet Directory, Automated Bid Placement System, obtained at the internet address http://www.searchup.com/search.cfm, Aug. 25, 1999.
SearchUP: URL Position Manager, obtained at the internet address https://www.securearea.net/searchup/login.cfm, Aug. 25, 1999.
SearchUP: URL Position Manager, obtained at the internet address https://www.securearea.net/searchup/newaccount.cfm, Aug. 25, 1999.
SearchUP: URL Position Manager, obtained at the internet address https://www.securearea.net/getaccount/login.cfm, Aug. 25, 1999.
Correspondence from Emilia F. Cannella to Mr. D. Reed, Reports Galore, regarding hitsgalore.com, Jun. 30, 1999.
Miller, Karen L., "Improve Your Ranking", Home Office Computer, vol. 16, No. 1, Jan. 1998, p. 51(2).
Jeff Fretzen, "Help For Getting The Word Out About Web Sites", PC Week, Vo. 14, No. 46, Nov. 3, 1997, p. 27(1).
Article from the Search Engine Report, "GoTo To Sell Positions", Mar. 3, 1998, http://www.searchenginewatch.com/sereport/9803-to-to-html.
Article from CNET News, "Engine Sells Results, Draws Fire", Jun. 21, 1996, http://www.nees.com/News?Item/0,4,1635,00.html.
Press release on Lightweight Directory Access protocol (LDAP), Netscape Comm. Corp. Mountain View, CA., Apr. 1996.
ClickMail Central directory, circa Apr. 1996.
GoTo.com, circa 1998, at www.goto.com.
Northern Light, circa 1997-98, at sirocco.northernlight.com.
Laura Rich, Adweek Online IQ News Online, Feb. 23, 1998, "New Search Engine Allows Sites to Pay Their Way to Top", from http://www.adweek.com/iq/ iqnews02.asp, Feb. 23, 1998.
Smith, Laura B., article "Going . . . Gone", PC Week, vol. 13, No. 34, Aug. 26, 1996, p. E1 (2), http://www.dialog-classic.com/DialogClassic/dialog.
Cliff Kurtzman, "Another Internet Advertising List", Internet Advertising Digest #006, dated Jun. 19, 1996, from http://www.o-a.com/archive/1996/june.0021.html, printed Sep. 28, 2001, 5 pages.
Q. Huai, et al., Mobile Agents in an electronic auction house, Mobile Agents in the Context of Competition and Cooperation (MAC3) Workshop at the Third International Conference on Autonomous Agents (AGENTS), May 1, 1999, pp. 1-5 and 24-33.
T. Sandholm, et al., Nomad: Mobile Agent System for an Internet-Based Auction House, IEEE Internet Computing, Mar.-Apr. 2000, pp. 80-86.
Archive.org, Managebid.com, 2001, Don't Waste Your Money, available at http://web.archive.org/web/20020120002225/http://managebid.com (3 pages).
Archive.org, Managebid.com, 2001, Example, available at http://web.archive.org/web/20020603010733/managebid.com/faq_managebid.html (2 pages).
Archive.org, Managebid.com, 2001, ManageBid Services Comparison Chart, available at http://web.archive.org/web/20020306050357/managebid.com/services/comparison.html (2 pages).
Archive.org, ManageBid.com, 2001, available at http://web.archive.org/web/20011205072600/managebid.com/faq_steps.html (4pages).
Archive.org, ManageBid.com, 2001, available at http://web.archive.org/web/20011205071946/managebid.com/faq_roi.html (2 pages).
JimTools.com, *GoTo.com Keyword Wizard*, web page from http://jimtools.com, published 1999, 2000, 2 pages, archived at http://web.archive.org.
Woodhead, R., web pages from http://selfpromotion.com/, published 1997-2000, 66 pages, archived at http://web.archive.org.
RocketLinks.com, web pages from http://www.rocketlinks.com, published 1999, 6 pages, archived at http://web.archive.org.
Web Site Publicity, Inc., web pages from http://www.websitepublicity.com, published 1999, 2000, 2001, 6 pages.
Huhns, M. et al., "Online Auctions," IEEE Internet Computing, May/Jun. 1999, 3 pages.

* cited by examiner

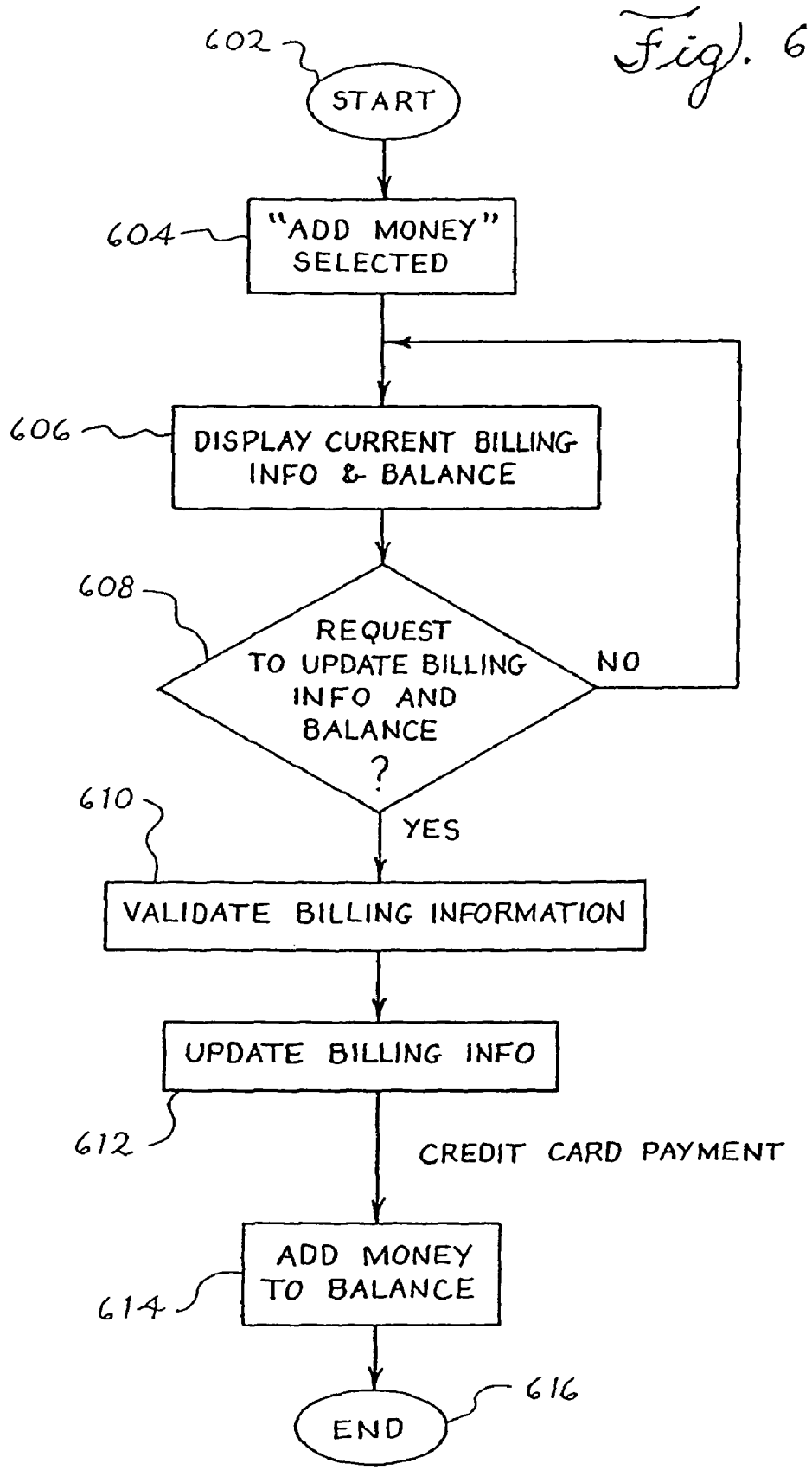

*Fig.* 7

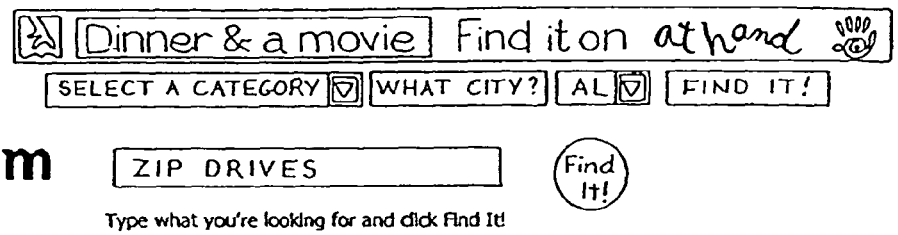

[🖼] [Dinner & a movie] Find it on at hand
[SELECT A CATEGORY ▽] [WHAT CITY?] [AL ▽] [FIND IT!]

[ ZIP DRIVES ]  (Find It!)

Type what you're looking for and click Find It!

760a — Try Go To Remote!    730    Add Go To to Favorites

1. We Buy And Sell Zip Drives — 720    — 710a

Buy Sell or Trade used computers, memory, peripherals, hardware and software. We offer
   the best brand names, competitive prices, large inventory, and reliability. We can ship
   anywhere.
   http://www.micro-tradingpost.com/ (Cost to advertiser: $0.08)

720

740 / 2. MacInFind.com – Click Here!    750a    — 710b

760b   Online guide to apple computer retailers. Find iMacs, power macintosh G3's, powerbooks,
   mac software and much more!
   http://www.macinfind.com/ (Cost to advertiser: $0.07) — 750b 760c / 3. Custom Computer Systems, Inc (CCS)    — 710c CCS, a wholesale distributor of computer systems, parts & accessories. Online shopping and
   same day shipping! 800.379.1227
   http://www.wvccsi.com/ (Cost to advertiser: $0.06) — 750c 760d / 4. Best Price on Zip Drives    — 710d ATMAN – USA.COM Computer on-line shopping. Huge selection, competitive price, reliable
   service. Major credit cards are welcome.
   http://www.atman-usa.com/ (Cost to advertiser: $0.02) — 750d 760e / 5. Computer Beat...One – Step Web Directory    — 710e A One-Stop Web Directory featuring top computer, PC, Mac web sites on the Internet.
   Spotlights Computer News, Help Desks, HTML, Internet and Computer Shopping!
   http://www.search-beat.com/ (Cost to advertiser:$0.01) — 750e 760f / 6. Macnet Online Computer Store    — 710f Computer retailer of hardware software peripherals consumerable and accessories for
   PC/Macintosh users. See Powermac, Imac, DVD, digital camera, monitors, printers,
   scanners, networking, PDA, notebook, and more.
   http://www.applemacnet.com/ (Cost to advertiser: $0.01) — 750f 760g / 7. hard drives for sale, western digital, maxtor, seagate, samsung, ibm, iomega zip drives. Ide,    — 710g
   scsi, PSA Inc reseller Offering computer systems, memory, cpu sales, motherboards, computer upgrades at
   volume and dealer pricing. A distributor; reseller, broker for all pc needs from corporations
   to individual personal computer users. PSA Inc. – computer sales and upgrades.
   http://www.psai.com/

760h / 8. Tape Drives, Zip Drives, Floppy Drives    — 710h

Wholesale distributor in Cleveland Ohio of computer hardware, computer systems, computer
   components, peripherals, cases, keyboards, mice, tape backup and floppy drives. Free
   technical support.
   http://www.bitsandbytesinc.com/ http://ww.../;$sessionId$MEPODQAA4BYLQFIEE1APUQ?type=home&Keywords=zip+drive

| Timestamp: | Alpha PPPP | Bravo PPPP | Charlie fixed CPC | Delta PPP | Echo PP | Foxtrot Place Prot. | Winner CPC |
|---|---|---|---|---|---|---|---|
| | 723 | 750 | 77 | 617 | 687 | 139 | |
| Rank 1 | $1.10 | $1.00 | $0.90 | - | | - | TBD |
| Rank 2 | $1.30 | $1.20 | $0.90 | $0.75 | $0.75 | - | TBD |
| Rank 3 | - | $0.80 | $0.90 | $0.75 | $0.75 | X | TBD |
| Rank 4 | $0.50 | $0.70 | $0.90 | $0.75 | $0.75 | - | TBD |
| Rank 5 | $0.40 | $0.70 | $0.90 | $0.75 | $0.75 | - | TBD |
| Rank 6 | - | $0.70 | $0.90 | $0.75 | $0.75 | - | TBD |
| Rank 7 | - | $0.70 | $0.90 | $0.75 | $0.75 | - | TBD |
| Rank 8 | - | $0.70 | $0.90 | $0.75 | $0.75 | - | TBD |

SYSTEM AND METHOD FOR PROVIDING PLACE AND PRICE PROTECTION IN A SEARCH RESULT LIST GENERATED BY A COMPUTER NETWORK SEARCH ENGINE

CROSS REFERENCE TO RELATED APPLICATIONS

This application is a continuation in part of application Ser. No. 09/911,674, now U.S. Pat. No. 7,092,901, filed Jul. 24, 2001 in the names of Darren J. Davis, et al., which application is incorporated herein in its entirety and which is a continuation of application Ser. No. 09/322,677, filed May 28, 1999, in the names of Darren J. Davis, et al., now U.S. Pat. No. 6,269,361.

REFERENCE TO COMPUTER PROGRAM LISTINGS SUBMITTED ON COMPACT DISK

A compact disc appendix is included containing computer program code listings pursuant to 37 C.F.R. 1.52(e) and is hereby incorporated by reference in its entirety. The total number of compact discs is 1 including 23,713 files and 105,827,757 bytes. The files included on the compact disc are listed in a file entitled "dir_s" on the compact disc. Because of the large number of files contained on the compact disc, the required listing of file names, dates of creation and sizes in bytes is included in the file dir_s on the compact disk and incorporated by reference herein.

BACKGROUND OF THE INVENTION

The transfer of information over computer networks has become an increasingly important means by which institutions, corporations, and individuals do business. Computer networks have grown over the years from independent and isolated entities established to serve the needs of a single group into vast internets which interconnect disparate physical networks and allow them to function as a coordinated system. Currently, the largest computer network in existence is the Internet. The Internet is a worldwide interconnection of computer networks that communicate using a common protocol. Millions of computers, from low end personal computers to high end super computers, are connected to the Internet.

The Internet has emerged as a large community of electronically connected users located around the world who readily and regularly exchange significant amounts of information. The Internet continues to serve its original purposes of providing for access to and exchange of information among government agencies, laboratories, and universities for research and education. In addition, the Internet has evolved to serve a variety of interests and forums that extend beyond its original goals. In particular, the Internet is rapidly transforming into a global electronic marketplace of goods and services as well as of ideas and information.

This transformation of the Internet into a global marketplace was driven in large part by the introduction of an information system known as the World Wide Web ("the web"). The web is a unique distributed database designed to give wide access to a large universe of documents. The database records of the web are in the form of documents known as "pages". These pages reside on web servers and are accessible via the Internet. The web is therefore a vast database of information dispersed across countless individual computer systems that is constantly changing and has no recognizable organization or morphology. Computers connected to the Internet may access the web pages via a program known as a browser, which has a powerful, simple-to-learn graphical user interface. One powerful technique supported by the web browser is known as hyperlinking, which permits web page authors to create links to other web pages which users can then retrieve by using simple point-and-click commands on the web browser.

The pages may be constructed in any one of a variety of formatting conventions, such as Hyper Text Markup Language (HTML), and may include multimedia information content such as graphics, audio, and moving pictures. Any person with a computer and a connection to the Internet may access any publicly accessible page posted on the web. Thus, a presence on the World Wide Web has the capability to introduce a worldwide base of consumers to businesses, individuals, and institutions seeking to advertise their products and services to potential customers. Furthermore, the ever increasing sophistication in the design of web pages, made possible by the exponential increase in data transmission rates and computer processing speeds, makes the web an increasingly attractive medium for advertising and other business purposes, as well as for the free flow of information.

The availability of powerful new tools that facilitate the development and distribution of Internet content has led to a proliferation of information, products, and services offered on the Internet and dramatic growth in the number of consumers using the Internet. International Data Corporation, commonly referred to as IDC, estimates that the number of Internet users will grow from approximately 97 million worldwide in 1998 to approximately 320 million worldwide by the end of 2002. In addition, commerce conducted over the Internet has grown and is expected to grow dramatically. IDC estimates that the percentage of Internet users buying goods and services on the Internet will increase from approximately 28% at the end of 1998 to approximately 40% in 2002, and that over the same period of time, the total value of goods and services purchased over the Internet will increase from approximately $32.4 billion to approximately $425.7 billion.

The Internet has emerged as an attractive new medium for advertisers of information, products and services to reach consumers. However, the World Wide Web is composed of a seemingly limitless number of web pages dispersed across millions of different computer systems all over the world in no discernible organization. Mechanisms, such as directories and search engines, have been developed to index and search the information available on the web and thereby help Internet users locate information of interest. These search services enable consumers to search the Internet for a listing of web sites based on a specific topic, product, or service of interest.

Search services are, after e-mail, the most frequently used tool on the Internet. As a result, web sites providing search services have offered advertisers significant reach into the Internet audience and have given advertisers the opportunity to target consumer interests based on keyword or topical search requests.

In a web-based search on an Internet search engine, a user enters a search term comprising one or more keywords, which the search engine then uses to generate, in real time, a listing of web pages that the user may access via a hyperlink. The search engines and web site directories of the prior art, however, rely upon processes for assigning results to keywords that often generate irrelevant search results. The automated search technology that drives many search engines in the prior art rely in large part on complex, mathematics-based database search algorithms that select and rank web pages based on multiple criteria such as keyword density and keyword location. The search results generated by such mechanisms often rely on blind mathematical formulas and may be random and even irrelevant. In addition, search engines that use automated search technology to catalog search results generally rely on invisible web site descriptions, or "meta tags", that are authored by web site promoters. Web site owners may freely tag their sites as they choose. Consequently, some web site promoters or promoters insert popular search terms into their web site meta tags which are not relevant because by doing so they may attract additional consumer attention at little to no marginal cost. Finally, many web sites have similar meta tags, and the search engines of the prior art are simply not equipped to prioritize results in accordance with consumers' preferences.

Search engines and web site directories may also rely on the manual efforts of limited editorial staffs to review web page information. Since comprehensive manual review and indexing of an unpredictable, randomly updated database such as the web is an impossible task, search engine results are often incomplete or out-of-date. Moreover, as the volume and diversity of Internet content has grown, on many popular web search sites, consumers must frequently click-through multiple branches of a hierarchical directory to locate web sites responsive to their search request, a process that is slow and unwieldy from the consumer's standpoint. Thus, the prior art search engines are ineffective for web page owners seeking to target their web exposure and distribute information to the attention of interested users on a current and comprehensive basis.

Furthermore, current paradigms for generating web site traffic, such as banner advertising, follow traditional advertising paradigms and fail to utilize the unique attributes of the Internet. In the banner advertising model, web site promoters seeking to promote and increase their web exposure often purchase space on the pages of popular commercial web sites. The web site promoters usually fill this space with a colorful graphic, known as a banner, advertising their own web site. The banner may act a hyperlink a visitor may click on to access the site. Like traditional advertising, banner advertising on the Internet is typically priced on an impression basis with advertisers paying for exposures to potential consumers. Banners may be displayed at every page access, or, on search engines, may be targeted to search terms. Nonetheless, impression-based advertising inefficiently exploits the Internet's direct marketing potential, as the click-through rate, the rate of consumer visits a banner generates to the destination site, may be quite low. Web site promoters are therefore paying for exposure to many consumers who are not interested in the product or service being promoted, as most visitors to a web site seek specific information and may not be interested in the information announced in the banner. Likewise, the banner often fails to reach interested individuals, since the banner is not generally searchable by search engines and the interested persons may not know where on the web to view the banner.

Thus, the traditional paradigms of advertising and search engine algorithms fail to effectively deliver relevant information via the World Wide Web to interested parties in a cost-effective manner. Internet advertising can offer a level of targetability, interactivity, and measurability not generally available in other media. With the proper tools, Internet advertisers have the ability to target their messages to specific groups of consumers and receive prompt feedback as to the effectiveness of their advertising campaigns.

Ideally, web site promoters should be able to control their placement in search result listings so that their listings are prominent in searches that are relevant to the content of their web site. The search engine functionality of the Internet needs to be focused in a new direction to facilitate an on-line marketplace which offers consumers quick, easy and relevant search results while providing Internet advertisers and promoters with a cost-effective way to target consumers. A consumer utilizing a search engine that facilitates this on-line marketplace will find companies or businesses that offer the products, services, or information that the consumer is seeking. In this on-line marketplace, companies selling products, services, or information bid in an open auction environment for positions on a search result list generated by an Internet search engine. Since advertisers must pay for each click-through referral generated through the search result lists generated by the search engine, advertisers have an incentive to select and bid on those search keywords that are most relevant to their web site offerings. The higher an advertiser's position on a search result list, the higher likelihood of a "referral"; that is, the higher the likelihood that a consumer will be referred to the advertiser's web site through the search result list. The openness of this advertising marketplace is further facilitated by publicly displaying, to consumers and other advertisers, the price bid by an advertiser on a particular search result listing.

U.S. patent application Ser. No. 09/322,677, now U.S. Pat. No. 6,269,361 describes a system and method for enabling promoters to influence a position on a search result listing generated by an Internet search engine for a specified set of search terms. The system and method enable promoters to specify key search terms to the search engine so as to target their search result list placement to the search queries most relevant to their business. Further, the system and method enable promoters to examine their current search term and placement couplings online and to make substantially instantaneous changes to their selected search terms, placements, and web site titles and descriptions.

In this system, advertisers, or web site promoters, establish bid amounts for search listings with a pay for performance web site operator which are chargeable to the advertiser by the pay for performance web site operator. In response to a received query from a searcher, search listings are located, arranged according to bid and displayed to the searcher. If a searcher selects or clicks through an advertiser's search listing, the bid amount is charged to the advertiser by the pay for performance web site operator. Advertisers can control the position of their search listing in the search result list by adjusting the bid amount associated with the search listing.

The method of application Ser. No. 09/322,677 can be burdensome to manage for some advertisers. In particular, some advertisers want to maintain favorable positions in the search results (so as to obtain a high volume of qualified traffic) at a favorable price. Generally, a higher position (displayed first, second, third, etc.) is a preferred or more favorable position. The system described in application Ser. No. 09/322,677 provides no ready means to do that. Advertisers can resort to frequent inspection of their ranking on search terms that are important to them, for example, by performing a search on www.goto.com. When an advertiser observes a change as a consequence of competing advertisers' bidding activities, the advertiser can log in to the account management server and change bids manually in response. In the case where the advertiser has been outbid for a position the advertiser wants to retain, the advertiser can increase a bid to retake the position, if the required cost per click ("CPC"), which is equal to the amount of the bid, is one the advertiser is willing to pay. In the case where the bid of the listing ranked below theirs has decreased, some advertisers may wish to lower their bid to reduce the amount they pay while still maintaining their position in the results set.

This can lead to oscillatory behavior, wherein an advertiser lowers his bid, the advertiser above him responds by lowering his bid a like amount, and the first advertiser then outbids the second advertiser, e.g. by the minimum bid increment, taking the higher ranked spot. Then the second advertiser overtakes the first, again by the minimum bid increment, and so forth until most-recently-outbid advertiser decides it's more economic for him to accept the lower position (hence lower traffic) and lower his bid to increase his unit margins, starting another cycle of the oscillation.

Some advertisers do this several times a day. Some of them have a plurality of employees dedicated to the management of their participation in the pay for performance web site, monitoring the positions of their listings and adjusting their bids. Therefore, a need exists for a means for advertisers to maintain their desired place within the rankings as the competitive environment changes, with a much lower expenditure of human effort. A further need exists for a means for advertisers to establish limits on the price they will pay per clickthrough, while managing their actual cost per click to an advantageous amount in the competitive context. A further need exists for a means that eliminates oscillations that are detrimental to the average CPC for the operator of the pay for placement web site. A still further need exists for a means to obtain the full competitive effect in the marketplace of an advertiser's willingness to pay for leads. A yet further need exists for the means to be simple and readily understood by advertisers, and transparent in its operation, to create confidence on the part of advertisers that they know how to act in their best interests in the pay for placement marketplace.

BRIEF SUMMARY OF THE INVENTION

One approach to addressing the need to reduce the workload on advertisers to maintain their economic position is by the use of software agents to adjust bids on behalf of advertisers. Such agents could, for example, take instructions from advertisers as follows: "Keep me in the top-ranked position, unless the cost per click (CPC) required is more than $1.00 to do so. In any event, pay no more than the minimum increment over the next lower ranked listing."

This can lead to undesirable results. For example, this does nothing to damp out the oscillations in bids. Instead, in the case of agents in competition, it produces full amplitude oscillations at a rate as fast as the agents operate. In the event that agents operate periodically, the advertiser with the agent that operates more often, or that is last in turn to make changes, has the economic advantage. Such economic forces will tend to drive toward a situation in which agents operate continuously at maximum rate, limited only by the capacity of the underlying infrastructure, which is provided by the pay for placement web site operator and is a source of cost to the pay for placement web site operator.

In the case where the pay for placement web site operator chooses to provide agents of limited functionality, or limited rate of operation (e.g. hourly or daily), an economic incentive remains for advertisers to produce agents of their own, interacting with the account management systems of the pay for placement web site operator, to obtain the economic advantage available relative to the limited agents provided by the pay for placement web site operator. As a further consequence, such a situation provides economic incentive for third parties to produce bidding agents for the use of advertisers, for a fee, or a commission on the alleged savings produced.

By way of introduction only, one of the present embodiments described herein may be referred to as Price and Place Protection. Price and Place Protection is an improvement on existing pay for performance systems. In the prior system, an advertiser logs on to an account management server, identifies a set of search terms, their description, and other information, which includes the cost per click ("CPC") for each search term, which is the amount that the advertiser will pay if a user clicks on the listing. Clicking on the listing refers to selection of a search listing so that a user's web browser is redirected to the uniform resource locator (URL) associated with the search listing.

In the prior system, an advertiser uses the account management server to specify a bid for a listing. The amount the advertiser pays for each clickthrough, the Cost Per Click (CPC), is equal to the bid. This bid, and consequently the CPC, can only be changed by the advertiser, and the advertiser can use the account management server to do this.

The embodiments described herein use the concept of a bid which corresponds to economic value which the advertiser will give when network locations associated with the advertiser is referred to a searcher in response to a query from the searcher. The economic value may be a money amount charged or chargeable to the advertiser, either directly or indirectly. The economic value may be an amount debited from an account of the advertiser. The amount may be a money amount or another value, such as credit points. The economic value may be given by the advertiser to the operator of a database search system or to a third party.

The economic value is given when one or more network locations, such as advertiser web sites, are referred to a searcher. The referral may be by presenting the network locations on a screen used for data entry and receipt by the searcher, alone or with other search results. Alternatively, and in an embodiment generally described herein, the referral may occur when the searcher clicks on or clicks through to access the network locations of the advertiser, as will be described in greater detail below. Or the referral may be by some other action taken by the searcher after accessing the network locations of the advertiser.

Price and Place Protection in accordance with the embodiments described herein is an improvement wherein an advertiser's bid does not establish a fixed CPC. Instead, his bid sets the maximum CPC the advertiser will incur. Further, the present embodiments allow the advertiser to specify a desired rank in the search results displayed to the searcher. The rank of a search listing is the ordinal positioning of the search listing among a group of search listings matching the searcher's search term. Higher or better listed search listings are displayed higher on a page and earlier on a number of pages of search listings. The system of the present embodiments determines the actual rankings and actual CPC's. The listings matching a search may then be ranked in descending order of CPC, with priority among listings of equal CPC by chronological seniority.

Thus, the system in accordance with these embodiments includes a database which is searchable by a search engine. The database includes a plurality of search listings. Search listings include one or more of a search term and a bid/desired rank associated with the search term. The bid/desired rank includes a maximum cost per click and a desired rank desired by the advertiser. The cost per click may be considered an accounting variable and may correspond, for example, to an amount chargeable to an account of the advertiser. Other types of accounting variables may be substituted, such as credit points which may be redeemed by the operator of the system, or data corresponding to a some economic value to be paid by the advertiser upon referral of the advertiser's web site to a searcher. The desired rank may be considered to be a referral variable and is used to control the manner in which the searcher is exposed to the advertiser's search listing. In one example, the desired rank controls the rank at which a search listing is displayed to the searcher. In other examples, the referral variable may be a display color or font size or any other feature related to the presentation of advertiser-associated information for a search listing. Search listings may include other data as well, such as time stamp data.

Features associated with Price and Place Protection may be actively selected for one or more of an advertiser's search listings. Other listings may be positioned in search results without the dynamic CPC adjustment offered by the present system. The pay for performance web site operator may charge a premium for the Price and Place Protection service according to the convenience provided to advertisers.

Each listing has a time stamp, which is the most recent time when the bid or fixed CPC of the listing was last changed or first entered. At a given CPC there may be zero or more listings. If there is more than one listing at a given CPC then these listings are sorted by their chronological order—the one with the earlier time stamp may be given a better rank. If two listings have the same CPC and time stamp, then these may be ordered arbitrarily. Consequently, it may be impossible for a listing to be presented at given rank. For example, if listing $L_1$ is at rank 1 with CPC $0.85, and there are two listings with CPC $0.84, each having an earlier time stamp than $L_1$, then $L_1$ can either be at rank 1 with CPC $0.85 (or higher) or at rank 3 with CPC $0.84—$L_1$ cannot be at rank 2.

One advantage of the Price and Place Protection system according to the present embodiments is to implement the following instructions on behalf of participating advertisers:
1. Adjust the CPC of my listing to maintain it at my desired rank, if that can be done without exceeding my bid.
2. If my listing cannot be maintained at my desired rank without exceeding my bid, get me to the highest rank my bid will allow.
3. In no event permit my CPC to exceed my bid.
4. In any event, set my CPC no higher than necessary to satisfy these instructions.

In a first embodiment, the Price and Place Protection system will act on behalf of an advertiser to adjust the CPC of a listing in accordance with the instructions listed above. These adjustments may be periodic, or may be made at random times. The system will do the same for all other listings having Price and Place Protection. In this mode it is possible that after the system acts on behalf of one advertiser that the conditions desired by some other advertisers may no longer be satisfied.

For example, suppose an advertiser $A_0$ has a listing matching a search for "LCD Projector," and specifies that listing should be maintained at rank 3, with a bid of $3.90, thereby limiting his maximum CPC to $3.90. Further suppose that currently for the term "LCD Projector" advertiser $A_1$ has a CPC of $4.20 and is at rank 1, advertiser $A_2$ has a CPC of $4.00 and is at rank 2, advertiser $A_3$ has a CPC of $3.84 and is at rank 3, advertiser $A_4$ has a CPC of $3.80 and is at rank 4, and so on. The system can set the CPC for advertiser $A_0$ to be the minimum to get it to rank 3. If the time stamp of $A_0$ is earlier than the time stamp of $A_3$ then the system can set the CPC of $A_0$ to be $3.84. In this example the system has not required a minimum CPC increment to bump $A_3$ from rank 3. In practice this is at the discretion of the pay for performance website operator. Advertiser $A_0$ will now have its listing at rank 3—displacing the listing of advertiser $A_3$ to rank 4 and displacing advertiser $A_4$ to rank 5, and so on.

Suppose now that advertiser $A_3$ increases his CPC to $3.86. Advertiser $A_3$ will again return to rank 3, with a CPC of $3.86, thus displacing advertiser $A_0$ to rank 4. Immediately upon $A_3$ increasing its CPC to $3.86 the system can act on behalf of $A_0$ and increase $A_0$'s CPC from $3.84 to $3.86. This will return $A_0$ to rank 3 ($A_0$ having an earlier time stamp than $A_3$), and $A_3$ will be returned to rank 4 again.

Advertiser $A_3$ may next increase his CPC from $3.86 to $3.91 to regain the number 3 ranking of his listing. Advertiser $A_0$ will again be displaced to rank 4. At this point the system will check if it is possible to increase the CPC of advertiser $A_0$ in order to return him to rank 3—the system will only be able to raise the CPC of $A_0$ to $3.90, which is the maximum specified by $A_0$. Unfortunately, this is not sufficient to return $A_0$ to rank 3—this would have required increasing the CPC of $A_0$ to $3.91, which is greater than the CPC of $3.90 specified by $A_0$. Advertiser $A_0$ will thus remain at rank 4, and his CPC will be reset to $3.81 (one cent higher than the CPC of the advertiser below, $A_4$—here we are assuming that the time stamp of $A_4$ is earlier than the time stamp of $A_0$).

In the first embodiment, the system is in an endless loop where it waits for a random or periodic time, and then acts on behalf of successive advertisers. Setting the CPC on behalf of one advertiser can undo the goals of other advertisers. This has the disadvantage that the CPCs of listings can oscillate up and down, as the system acts on behalf successive advertisers.

In a second embodiment, the CPC of a listing is only decreased if the system knows that no other listing with Price and Place Protection can have its CPC increased to unseat the advertiser from his desired rank, based on the existing bids and desired ranks of competing listings. In this embodiment, one advantage of Price and Place Protection is to implement the instructions previously given on behalf of an advertiser, in concert with this additional instruction:
5. Do not set the CPC of my listing such that the application of the standing instructions for competing listings would produce a result inconsistent with these instructions.

The effect of this additional instruction is to require a solution that satisfies all the listing instructions simultaneously, and is therefore stable. This adds the further advantage of eliminating the CPC oscillations.

In a third embodiment, an advertiser can specify a bid without specifying a desired rank. This embodiment may be referred to as Price Protection. In this case the advertiser wishes to be at the best possible rank, without the advertiser's CPC exceeding the advertiser's bid. This is substantially equivalent to the second embodiment with the desired rank of the listing being 1. Other listings may have a fixed CPC, or they may have a bid (a maximum CPC) and a desired rank.

In this third embodiment, for listings having both a desired rank and a bid (maximum CPC), Price and Place Protection has the same advantages as in the second embodiment. For listings with only a maximum CPC (implicit desired rank 1), one advantage of Price and Place Protection is to implement the following instructions on behalf of an advertiser:
1. Adjust the CPC of my listing to maintain the highest rank possible without exceeding my bid.
2. Set my CPC no higher than necessary to satisfy these instructions.
3. Do not set the CPC of my listing such that the application of the standing instructions for competing listings would produce a result inconsistent with these instructions.

In a fourth embodiment, an advertiser can specify a desired rank without specifying a bid. This embodiment may be referred to as Place Protection. In this case, the advertiser wishes to be at the desired rank no matter what CPC is required to maintain that rank. At most one listing is permitted per desired rank with an unlimited CPC. This can be allocated, for example, to the first one to request it. Other listings may have a fixed CPC, or they may have a bid and a desired rank, or they may have a CPC only, with an implicit desired rank of 1.

In this fourth embodiment, for listings with a CPC, Price and Place Protection has the same advantages as in the third embodiment. For listings with a desired rank, but without a CPC, one advantage of Price & Place Protection is to implement the following instructions on behalf of an advertiser:

1. Adjust the CPC of my listing to maintain my desired rank.
2. Set my CPC no higher than necessary to satisfy these instructions.
3. Do not set the CPC of my listing such that the application of the standing instructions for competing listings would produce a result inconsistent with these instructions.

In a fifth embodiment, an advertiser can specify a separate bid for every rank. This may be referred to as Plural Price and Place Protection (PPPP). The bid for some or all ranks can be zero. Compared to other embodiments, this has the advantage of permitting an advertiser to have fine-grained control over bids for different ranks.

One way of accomplishing this is for an advertiser to provide a collection of specific bid/rank combinations and to also provide a default bid/rank. The bid of the default bid/rank must be less than all other bids. For a non-default bid/rank, the advertiser is specifying the maximum CPC for that rank is the supplied bid for that rank. For the default bid/rank, the advertiser is specifying the maximum CPC for the default rank, and all worse ranks, is the bid supplied.

For example, an advertiser may specify "I bid $2.50 for rank 1, $1.95 for rank 3, $0.90 for rank 4, and $0.80 for rank 5 and all worse ranks." This means that the advertiser is willing to pay up to $2.50 to be at rank 1, the advertiser is not willing to be at rank 2, he is willing to pay $1.95 to be at rank 3, he is willing to pay $0.90 to be at rank 4, and he is willing to pay $0.80 for rank 5 and all ranks worse than rank 5.

One advantage of the Plural Price and Place Protection embodiment is to implement the following instructions on behalf of an advertiser:

1. Try to maintain my listing at my best rank (of all the bid/rank combinations), if it is possible to do so without exceeding its bid limit.
2. If my listing cannot be maintained at my best desired rank, then try to get me to the next best rank that its corresponding bid will allow.
3. In no event permit my CPC for a rank to exceed my bid for that rank.
4. In any event, set my CPC no higher than necessary to satisfy these instructions.
5. Do not set the CPC of my listing such that the application of the standing instructions for competing listings would produce a result inconsistent with these instructions.

It is possible to have any combination of listings with fixed bids, Place Protection, Price Protection, Price & Place Protection (PPP), and Plural Price & Place Protection (PPPP) embodiments. This can be accomplished by converting every listing into the PPPP framework, and using PPPP on the result:

1. Every Place Protection listing can be converted to an equivalent PPP listing by assigning it an implicit bid higher than all other bids or fixed CPCs.
2. Every Price Protection listing can be converted to an equivalent PPP listing by assigning it an implicit desired rank of 1.
3. Every PPP listing with bid/rank can be converted to an equivalent PPPP listing with default bid/rank (and without any non-default bid/rank specifications).
4. Every fixed CPC listing can be directly incorporated into the PPPP framework.

As used herein, a "bid" is the maximum cost per click (CPC) that the system may set on behalf of an advertiser for the listing for a given term. A bid is denominated in a money amount. A bid is associated with a desired rank which is an ordinal number. For price and place protection (PPP), there is a single bid/desired rank combination. For plural price and place protection (PPPP), there may be multiple bid/desired rank combinations, where one of the bid/desired rank combinations is the default. The CPC is what the advertiser is charged for a clickthrough. The CPC may be lower than the bid for the listing for a search term.

The foregoing discussion of the preferred embodiments has been provided only by way of introduction. Nothing in this section should be taken as a limitation on the following claims, which define the scope of the invention.

BRIEF DESCRIPTION OF SEVERAL VIEWS OF THE DRAWINGS

FIG. 6 is a flow chart illustrating a method of adding money to an account record used in one embodiment of the present invention;

FIG. 7 illustrates an example of a search result list generated by one embodiment of the present invention;

FIG. 31 illustrates a workspace for performing data operations in a computer memory.

DETAILED DESCRIPTION OF THE INVENTION

Methods and systems for generating a pay-for-performance search result determined by a site promoter, such as an advertiser, over a client/server based computer network system are disclosed. The following description is presented to enable any person skilled in the art to make and use the invention. For purposes of explanation, specific nomenclature is set forth to provide a thorough understanding of the present invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
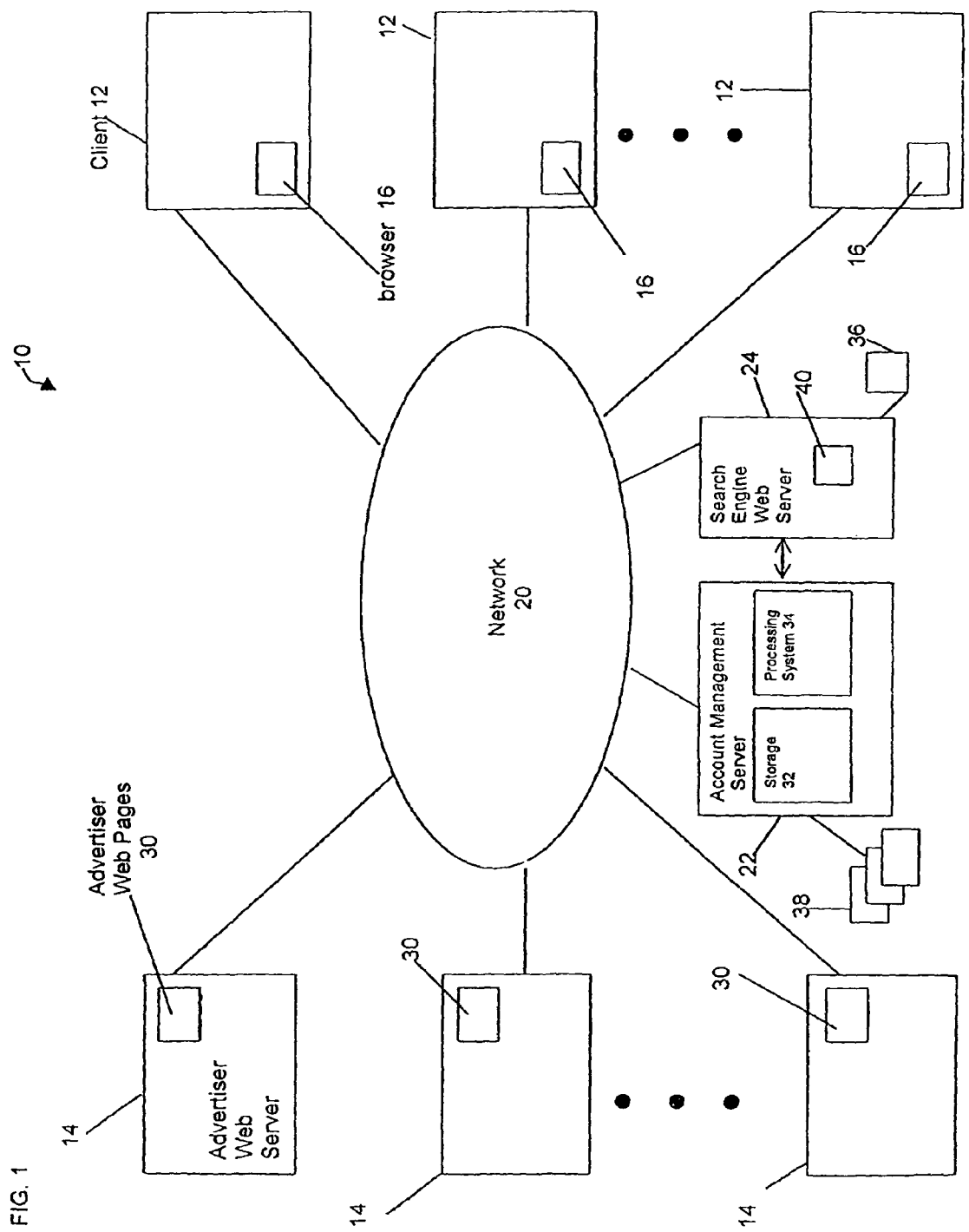
FIG. 1 is a block diagram illustrating the relationship between a large network and one embodiment of the system and method for generating a pay-for-performance search result of the present invention.

Referring now to the drawings, FIG. 1 is an example of a distributed system 10 configured as client/server architecture used in a preferred embodiment of the present invention. A "client" is a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the other server program or the server itself. In networked systems, a client process usually runs on a computer that accesses shared network resources provided by another computer running a corresponding server process. However, it should also be noted that it is possible for the client process and the server process to run on the same computer.

A "server" is typically a remote computer system that is accessible over a communications medium such as the Internet. The client process may be active in a second computer system, and communicate with the server process over a communications medium that allows multiple clients to take advantage of the information-gathering capabilities of the server. Thus, the server essentially acts as an information provider for a computer network.

The block diagram of FIG. 1 therefore shows a distributed system 10 comprising a plurality of client computers 12, a plurality of advertiser web servers 14, an account management server 22, and a search engine web server 24, all of which are connected to a network 20. The network 20 will be hereinafter generally referred to as the Internet. Although the system and method of the present invention is specifically useful for the Internet, it should be understood that the client computers 12, advertiser web servers 14, account management server 22, and search engine web server 24 may be connected together through one of a number of different types of networks. Such networks may include local area networks (LANs), other wide area networks (WANs), and regional networks accessed over telephone lines, such as commercial information services. The client and server processes may even comprise different programs executing simultaneously on a single computer.

The client computers 12 can be conventional personal computers (PCs), workstations, or computer systems of any other size. Each client 12 typically includes one or more processors, memories, input/output devices, and a network interface, such as a conventional modem. The advertiser web servers 14, account management server 22, and the search engine web server 24 can be similarly configured. However, advertiser web servers 14, account management server 22, and search engine web server 24 may each include many computers connected by a separate private network. In fact, the network 20 may include hundreds of thousands of individual networks of computers.

The client computers 12 can execute web browser programs 16, such as the NAVIGATOR, EXPLORER, or MOSAIC browser programs, to locate the advertiser web pages 30 stored on advertiser server 14. The browser 16 allow the users to enter addresses of specific web pages 30 to be retrieved. These addresses are referred to as Uniform Resource Locators, or URLs. In addition, once a page has been retrieved, the browser 16 can provide access to other pages or records when the user "clicks" on hyperlinks to other web pages. Such hyperlinks are located within the advertiser web pages 30 and provide an automated way for the user to enter the URL of another page and to retrieve that page. The pages can be data records including as content plain textual information, or more complex digitally encoded multimedia content, such as software programs, graphics, audio signals, videos, and so forth.

In a preferred embodiment of the present invention, shown in FIG. 1, clients 12 communicate through the network 20 with various network information providers, including account management server 22, search engine server 24, and advertiser servers 24 using the functionality provided by a HyperText Transfer Protocol (HTTP), although other communications protocols, such as FTP, SNMP, TELNET, and a number of other protocols known in the art, may be used. Preferably, search engine web server 24, account management server 22, and advertiser servers 14 are located on the World Wide Web.

As discussed above, at least two types of server are contemplated in a preferred embodiment of the present invention. The first server contemplated is an account management server 22 comprising storage 32 and a processing system 34. A database 38 is stored on the storage 32 of the account management server 22. The database 38 contains advertiser account information. It will be appreciated from the description below that the system and method of the present invention may be implemented in software that is stored as executable instructions on a computer storage medium, such as memories or mass storage devices, on the account management server 22. Conventional browsers 16, running on clients 12, may be used to access advertiser account information stored on account management server 22. Preferably, access to the account management server 22 is accomplished through a firewall, not shown, which protects the account management and search result placement programs and the account information from external tampering. Additional security may be provided via enhancements to the standard communications protocols such as Secure HTTP or the Secure Sockets Layer.

The second server type contemplated is a search engine web server 24. A search engine program permits network users, upon navigating to the search engine web server URL or sites on other web servers capable of submitting queries to the search engine web server 24 through their browser program 16, to type keyword queries to identify pages of interest among the millions of pages available on the World Wide Web. In a preferred embodiment of the present invention, the search engine web server 24 generates a search result list that includes, at least in part, relevant entries obtained from and formatted by the results of the bidding process conducted by the account management server 22. The search engine web server 24 generates a list of hypertext links to documents that contain information relevant to search terms entered by the user at the client computer 12. The search engine web server transmits this list, in the form of a web page, to the network user, where it is displayed on the browser 16 running on the client computer 12. A presently preferred embodiment of the search engine web server may be found by navigating to the web page at URL goto.com. In addition, the search result list web page, an example of which is presented in FIG. 7, will be discussed below in further detail.

Search engine web server 24 is connected to the Internet 20. In a preferred embodiment of the present invention, search engine web server 24 includes a search database 40 comprised of search listing records used to generate search results in response to user queries. In addition, search engine web server 24 may also be connected to the account management server 22. Account management server 22 may also be connected to the Internet. The search engine web server 24 and the account management server 22 of the present invention address the different information needs of the users located at client computers 12.

For example, one class of users located at clients 12 may be network information providers such as advertising web site promoters or owners having advertiser web pages 30 located on advertiser web servers 14. These advertising web site promoters, or advertisers, may wish to access account information residing in storage 32 on account management server 22. An advertising web site promoter may, through the account residing on the account management server 22, participate in a competitive bidding process with other advertisers. An advertiser may bid on any number of search terms relevant to the content of the advertiser's web site. In one embodiment of the present invention, the relevance of a bidded search term to an advertiser's web site is determined through a manual editorial process prior to insertion of the search listing containing the search term and advertiser web site URL into the database 40. In an alternate embodiment of the present invention, the relevance of a bidded search term in a search listing to the corresponding web site may be evaluated using a computer program executing at processing system 34 of account management server 22, where the computer program will evaluate the search term and corresponding web site according to a set of predefined editorial rules.

The higher bids receive more advantageous placement on the search result list page generated by the search engine 24 when a search using the search term bid on by the advertiser is executed. In a preferred embodiment of the present invention, the amount bid by an advertiser comprises a money amount that is deducted from the account of the advertiser for each time the advertiser's web site is accessed via a hyperlink on the search result list page. A searcher "clicks" on the hyperlink with a computer input device to initiate a retrieval request to retrieve the information associated with the advertiser's hyperlink. Preferably, each access or "click" on a search result list hyperlink will be redirected to the search engine web server 24 to associate the "click" with the account identifier for an advertiser. This redirect action, which is not apparent to the searcher, will access account identification information coded into the search result page before accessing the advertiser's URL using the search result list hyperlink clicked on by the searcher. The account identification information is recorded in the advertiser's account along with information from the retrieval request as a retrieval request event. Since the information obtained through this mechanism conclusively matches an account identifier with a URL in a manner not possible using conventional server system logs known in the art, accurate account debit records will be maintained. Most preferably, the advertiser's web site description and hyperlink on the search result list page is accompanied by an indication that the advertiser's listing is a paid listing. Most preferably, each paid listing displays a "cost to advertiser," which is an amount corresponding to a "price-per-click" paid by the advertiser for each referral to the advertiser's site through the search result list.

A second class of users at client computers 12 may comprise searchers seeking specific information on the web. The searchers may access, through their browsers 16, a search engine web page 36 residing on web server 24. The search engine web page 36 includes a query box in which a searcher may type a search term comprising one or more keywords. Alternatively, the searcher may query the search engine web server 24 through a query box hyperlinked to the search engine web server 24 and located on a web page stored at a remote web server. When the searcher has finished entering the search term, the searcher may transmit the query to the search engine web server 24 by clicking on a provided hyperlink. The search engine web server 24 will then generate a search result list page and transmit this page to the searcher at the client computer 12.

The searcher may click on the hypertext links associated with each listing on the search results page to access the corresponding web pages. The hypertext links may access web pages anywhere on the Internet, and include paid listings to advertiser web pages located on advertiser web servers 14. In a preferred embodiment of the present invention, the search result list also includes non-paid listings that are not placed as a result of advertiser bids and are generated by a conventional World Wide Web search engine, such as the INKTOMI, LYCOS, or YAHOO!search engines. The non-paid hypertext links may also include links manually indexed into the database 40 by an editorial team. Most preferably, the non-paid listings follow the paid advertiser listings on the search results page.

Figure 2:
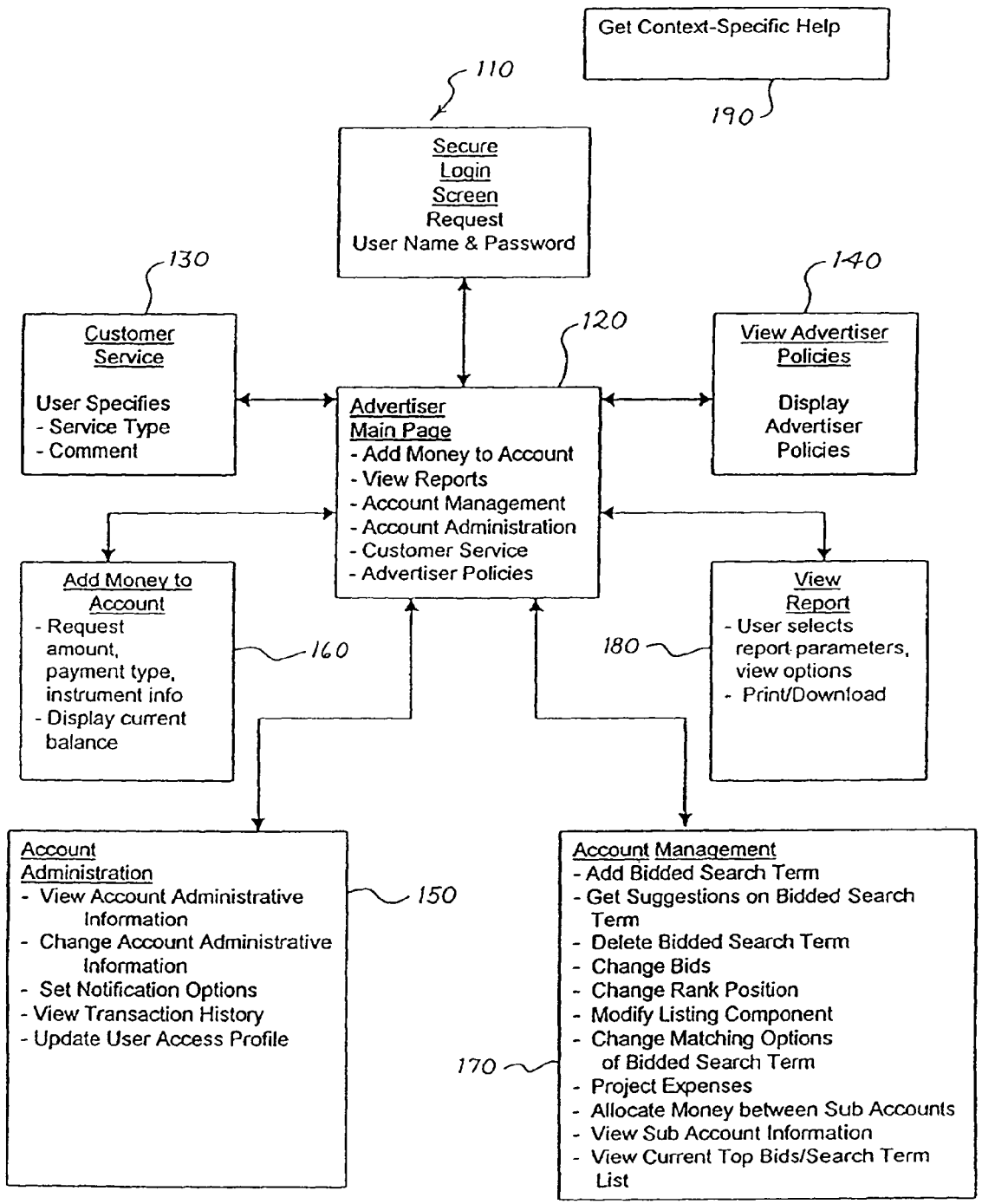
FIG. 2 is a chart of menus, display screens, and input screens used in one embodiment of the present invention.

FIG. 2 is a diagram showing menus, display screens, and input screens presented to an advertiser accessing the account management server 22 through a conventional browser program 16. The advertiser, upon entering the URL of the account management server 22 into the browser program 16 of FIG. 1, invokes a login application, discussed below as shown at screen 110 of FIG. 2, running on the processing system 34 of the server 22. Once the advertiser is logged-in, the processing system 34 provides a menu 120 that has a number of options and further services for advertisers. These items, which will be discussed in more detail below, cause routines to be invoked to either implement the advertiser's request or request further information prior to implementing the advertiser's request. In one embodiment of the present invention, the advertiser may access several options through menu 120, including requesting customer service 130, viewing advertiser policies 140, performing account administration tasks 150, adding money to the advertiser's account 160, managing the account's advertising presence on the search engine 170, and viewing activity reports 180. Context-specific help 190 may also generally be available at menu 120 and all of the above-mentioned options.

Figure 3:
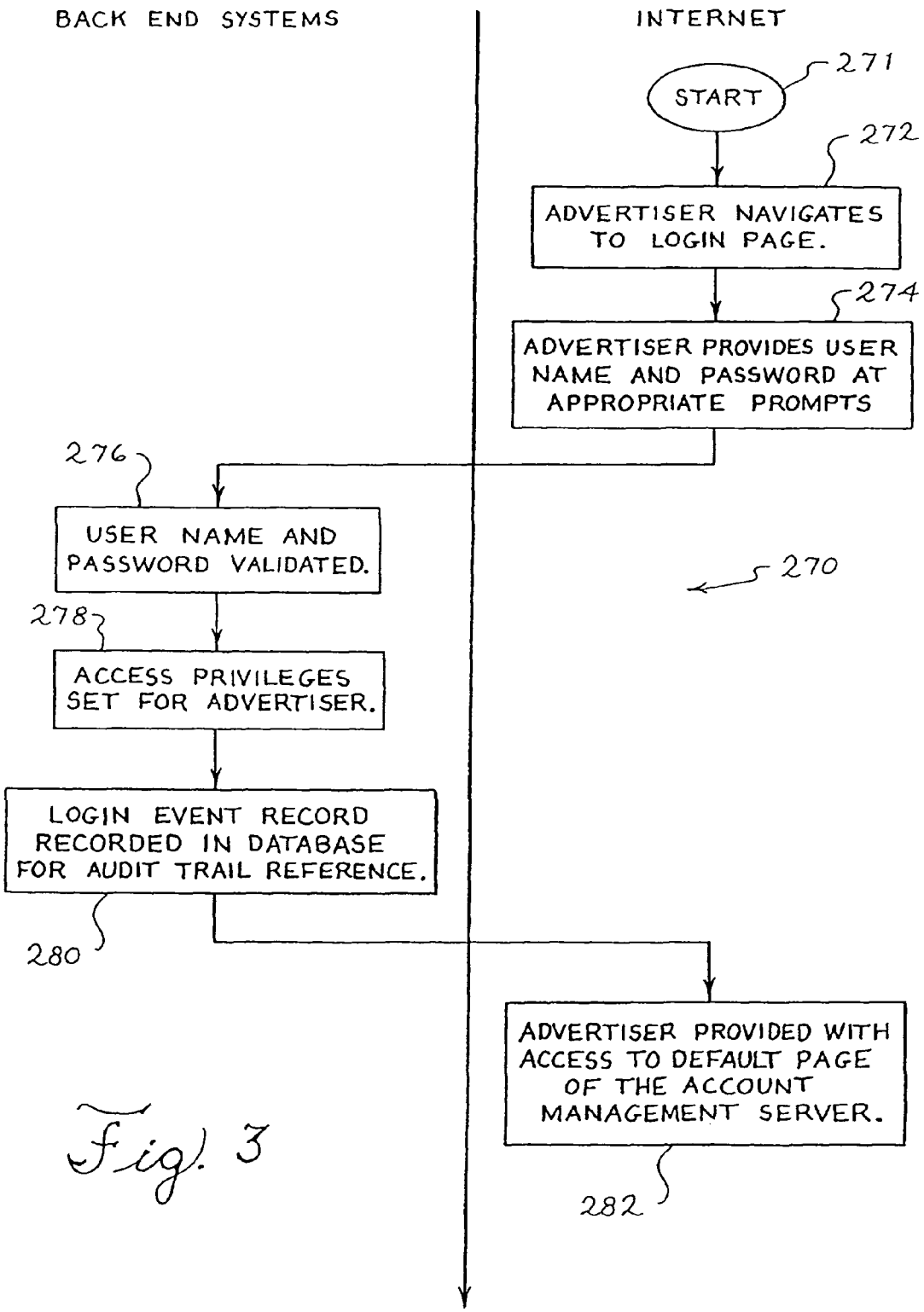
FIG. 3 is a flow chart illustrating the advertiser user login process performed in one embodiment of the present invention.
Figure 4:
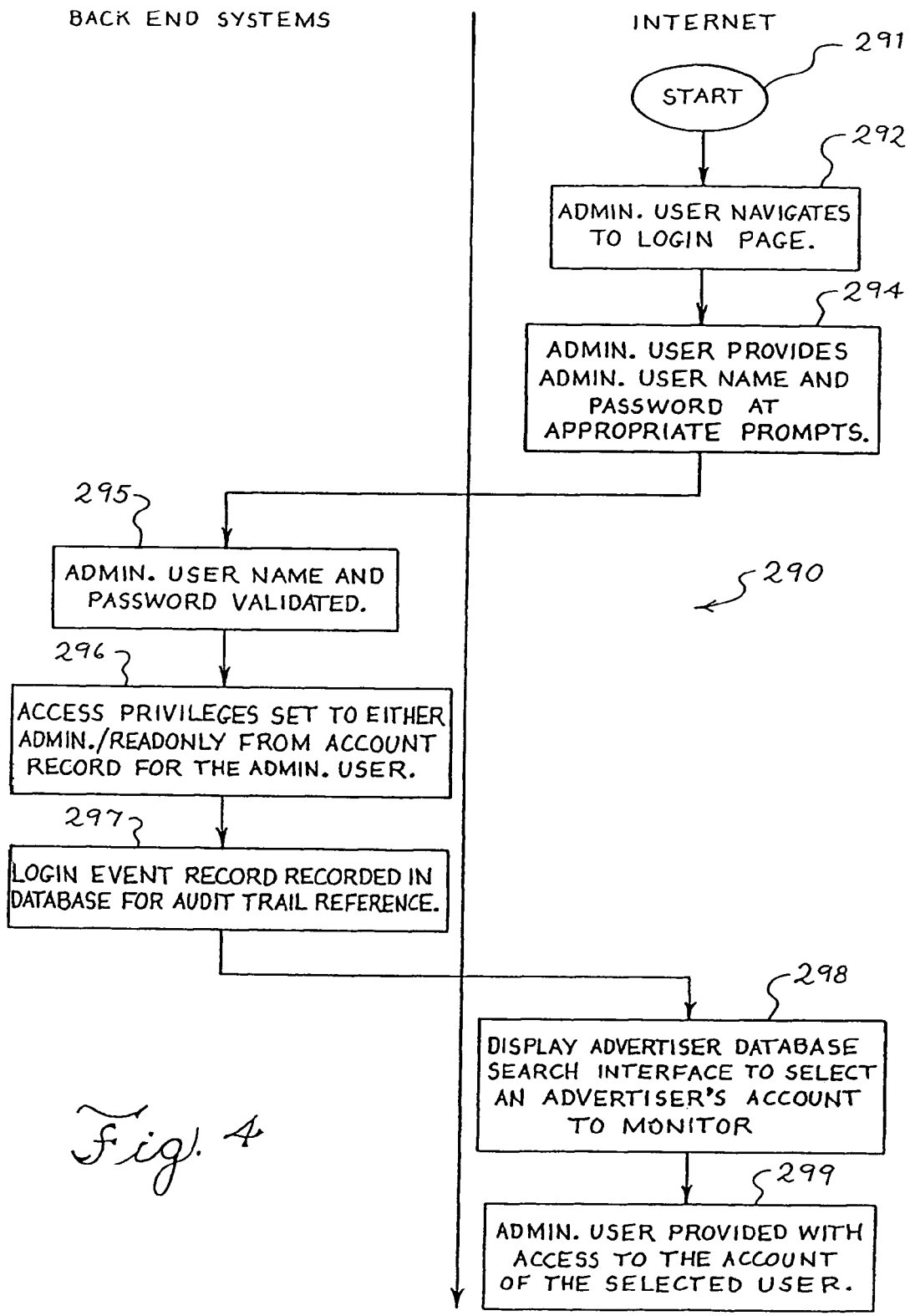
FIG. 4 is a flow chart illustrating the administrative user login process performed in one embodiment of the present invention.

The login procedure of the preferred embodiment of the present invention is shown in FIGS. 3 and 4 for two types of user. FIG. 3 shows the login procedures 270 for an advertiser. FIG. 4 shows the login procedures 290 for an administrator managing and maintaining the system and method of the present invention. As discussed above, the advertiser or administrator at a client computer 12 must first use a browser program at steps 271 or 291 to access the account management server. After the advertiser navigates to the URL of the login page to start the login process at step 272 or 292, the processing system 34 of the account management server 22 invokes a login application at steps 274 or 294. According to this application, the processor provides an input screen 110 (FIG. 2) that requests the advertiser's or administrator's user name and password. These items of information are provided at steps 276 or 296 to a security application known in the art for the purpose of authentication, based on the account information stored in a database stored in storage 32 of account management server 22.

According to FIG. 3, after the user has been authenticated as an advertiser, the advertiser is provided with the menu screen 120 of FIG. 2 and limited read/write access privileges only to the corresponding advertiser account, as shown in step 278. The advertiser login event 278 may also be recorded in step 280 in an audit trail data structure as part of the advertiser's account record in the database. The audit trail is preferably implemented as a series of entries in database 38, where each entry corresponds to an event wherein the advertiser's account record is accessed. Preferably, the audit trail information for an account record may be viewed by the account owner and other appropriate administrators.

However, if the user is authenticated as an administrator in step 295 of FIG. 4, the administrator is provided with specified administrative access privileges to all advertiser accounts as shown in step 296. The administrator login event 296 is recorded in step 297 in the audit trail data structure portion of the administrator's account record. This audit trail is preferably implemented as a series of entries in database 38, where each entry corresponds to an event wherein the administrator's account record is accessed. Most preferably, the administrator's audit trail information may be viewed by the account owner and other appropriate administrators.

Furthermore, instead of the general advertiser main menu shown to the authenticated advertiser users in step 282, the authenticated administrator is provided in step 298 with access to search the database 38 of advertiser accounts. Preferably, a database search interface is provided to the administrator that enables the administrator to select an advertiser account to monitor. For example, the interface may include query boxes in which the administrator may enter an account number or username or contact name corresponding to an account the administrator wishes to access. When the administrator selects an advertiser account to monitor in step 299, the administrator is then brought to the main advertiser page 120 of FIG. 2, which is also seen by the advertisers.

Access to the account information 32 located on the account management server 22 is restricted to users having an account record on the system, as only those users are provided with a valid login name and password. Password and login name information is stored along with the user's other account information in the database 38 of the account management server 22, as shown in FIG. 1. Account information, including a login user name and password, is entered in the database 38 of FIG. 1 via a separate online registration process that is outside the scope of the present invention.

Figure 5:
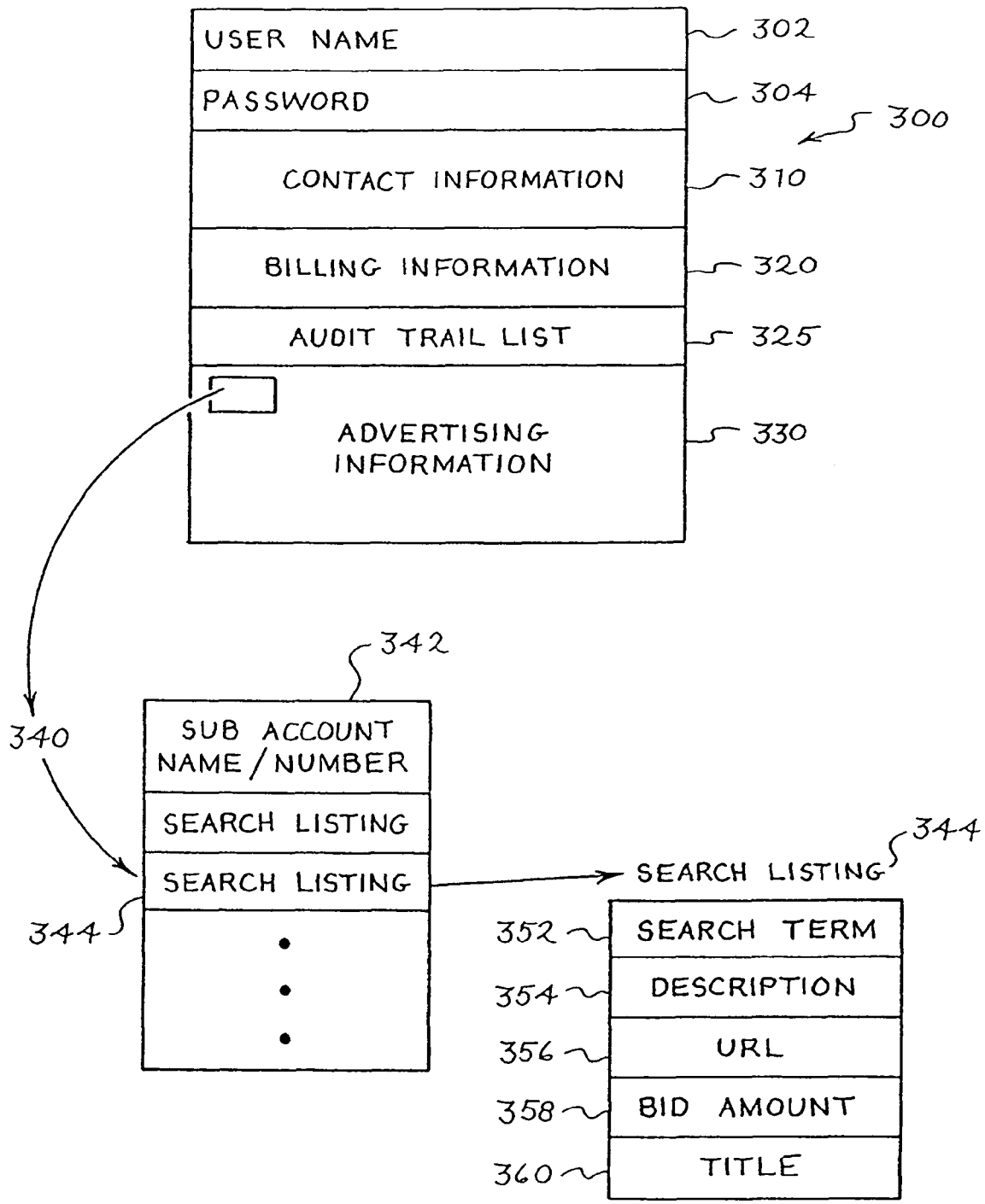
FIG. 5 is a diagram of data for an account record for use with one embodiment of the present invention.

FIG. 5 is a diagram showing the types of information contained in each advertiser account record 300 in the database. First, an advertiser account record 300 contains a username 302 and a password 304, used for online authentication as described above. The account record also contains contact information 310 (e.g., contact name, company name, street address, phone, e-mail address).

Contact information 310 is preferably utilized to direct communications to the advertiser when the advertiser has requested notification of key advertiser events under the notification option, discussed below. The account record 300 also contains billing information 320 (e.g., current balance, credit card information). The billing information 320 contains data accessed when the advertiser selects the option to add money to the advertiser's account. In addition, certain billing information, such as the current balance, may trigger events requiring notification under the notification option. The audit trail section 325 of an account record 300 contains a list of all events wherein the account record 300 is accessed. Each time an account record 300 is accessed or modified, by an administrator or advertiser a short entry describing the account access and/or modification event will be appended to the audit trail section 330 of the administrator or advertiser account that initiated the event. The audit trail information may then be used to help generate a history of transactions made by the account owner under the account.

The advertising information 330 contains information needed to conduct the online bidding process of the present invention, wherein a position is determined for a web site description and hyperlink within a search result list generated by a search engine. The advertising data 342 for each user account 300 may be organized as zero or more subaccounts 340. Each subaccount 340 comprises at least one search listing 344. Each search listing corresponds to a bid on a search term. An advertiser may utilize subaccounts to organize multiple bids on multiple search terms, or to organize bids for multiple web sites. Subaccounts are also particularly useful for advertisers seeking to track the performance of targeted market segments. The subaccount superstructure is introduced for the benefit of the advertisers seeking to organize their advertising efforts, and does not affect the method of operation of the present invention. Alternatively, the advertising information section need not include the added organizational layer of subaccounts, but may simply comprise one or more search listings.

The search listing 344 corresponds to a search term/bid pairing and contains key information to conduct the online competitive bidding process. Preferably, each search listing comprises the following information: search term 352, web site description 354, URL 356, bid amount 358, and a title 360. The search term 352 comprises one or more keywords which may be common words in English (or any other language). Each keyword in turn comprises a character string. The search term is the object of the competitive online bidding process. The advertiser selects a search term to bid on that is relevant to the content of the advertiser's web site. Ideally, the advertiser may select a search term that is targeted to terms likely to be entered by searchers seeking the information on the advertiser's web site, although less common search terms may also be selected to ensure comprehensive coverage of relevant search terms for bidding.

The web site description 354 is a short textual description (preferably less than 190 characters) of the content of the advertiser's web site and may be displayed as part of the advertiser's entry in a search result list. The search listing 344 may also contain a title 360 of the web site that may be displayed as the hyperlinked heading to the advertiser's entry in a search result list. The URL 356 contains the Uniform Resource Locator address of the advertiser's web site. When the user clicks on the hyperlink provided in the advertiser's search result list entry, the URL is provided to the browser program. The browser program, in turn, accesses the advertiser's web site through the redirection mechanism discussed above. The URL may also be displayed as part of the advertiser's entry in a search result list.

The bid amount 358 preferably is a money amount bid by an advertiser for a listing. This money amount is deducted from the advertiser's prepaid account or is recorded for advertiser accounts that are invoiced for each time a search is executed by a user on the corresponding search term and the search result list hyperlink is used to refer the searcher to the advertiser's web site. Finally, a rank value is a value generated dynamically, preferably by the processing system 34 of the account management server 22 shown in FIG. 1, each time an advertiser places a bid or a search enters a search query. The rank value of an advertiser's search listing determines the placement location of the advertiser's entry in the search result list generated when a search is executed on the corresponding search term. Preferably, rank value is an ordinal value determined in a direct relationship to the bid amount 358; the higher the bid amount, the higher the rank value, and the more advantageous the placement location on the search result list. Most preferably, the rank value of 1 is assigned to the highest bid amount with successively higher ordinal values (e.g., 2, 3, 4, . . . ) associated with successively lower ranks and assigned to successively lower bid amounts.

Once logged in, an advertiser can perform a number of straightforward tasks set forth in menu 120 of FIG. 2, including viewing a list of rules and policies for advertisers, and requesting customer service assistance. These items cause routines to be invoked to implement the request. For example, when "Customer Service" is selected, an input screen 130 is displayed to allow the advertiser to select the type of customer service requested. In addition, forms may be provided on screen 130 so that an advertiser may type a customer comment into a web-based input form.

When "View Advertiser Policies" is selected, a routine will be invoked by processing system 34 of the account management server 22 FIG. 1. As shown in FIG. 2, the routine will display an informational web page 140. The web page 140 sets forth the advertiser policies currently in effect (e.g., "All search listing descriptions must clearly relate to the search term").

Menu 120 of FIG. 2 also includes an "Account Administration" selection 150 which allows an advertiser, among other things, to view and change the advertiser's contact information and billing information, or update the advertiser's access profile, if any. Web-based forms well known in the art and similar to those discussed above are provided for updating account information.

The "Account Administration" menu also includes a selection enabling an advertiser to view the transaction history of the advertiser's account. Under the "View Transaction History" selection, the advertiser may invoke routines to view a listing of past account transactions (e.g., adding money to account, adding or deleting bidded search terms, or changing a bid amount). Additional routines may be implemented to permit advertisers to display a history of transactions of a specified type, or that occur within a specified time. The transaction information may be obtained from the audit trail list 325 of FIG. 5, described above. Clickable buttons that may be implemented in software, web-based forms, and/or menus may be provided as known in the art to enable advertisers to specify such limitations.

In addition, the "Account Administration" menu 150 of FIG. 2 includes a selection enabling an advertiser to set notification options. Under this selection, the advertiser may select options that will cause the system to notify the advertiser when certain key events have occurred. For example, the advertiser may elect to set an option to have the system send conventional electronic mail messages to the advertiser when the advertiser's account balance has fallen below a specified level. In this manner, the advertiser may receive a "warning" to replenish the account before the account is suspended (meaning the advertiser's listings will no longer appear in search result lists). Another key event for which the advertiser may wish notification is a change in position of an advertiser's listing in the search result list generated for a particular search term. For example, an advertiser may wish to have the system send a conventional electronic mail message to the advertiser if the advertiser has been outbid by another advertiser for a particular search term (meaning that the advertiser's listing will appear in a position farther down on the search result list page than previously). When one of the system-specified key events occurs, a database search is triggered for each affected search listing. The system will then execute the appropriate notification routine in accordance with the notification options specified in the advertiser's account.

Referring back to FIG. 2, a selection also appears in menu 120 that permits an advertiser to add money to the advertiser's account, so that the advertiser will have funds in their account to pay for referrals to the advertiser's site through the search results page. Preferably, only advertisers with funds in their advertiser's accounts may have their paid listings included in any search result lists generated. Most preferably, advertisers meeting selected business criteria may elect, in place of maintaining a positive account balance at all times, incur account charges regardless of account balance and pay an invoiced amount at regular intervals which reflects the charges incurred by actual referrals to the advertiser's site generated by the search engine. The process that is executed when the "Add Money to Account" selection is invoked is shown in further detail in FIG. 6, beginning at step 602. When the "Add Money to Account" selection is clicked in step 604, a function is invoked which receives data identifying the advertiser and retrieves the advertiser's account from the database. The executing process then stores the advertiser's default billing information and displays the default billing information for the advertiser in step 606. The displayed billing information includes a default amount of money to be added, a default payment type, and default instrument information.

In the preferred embodiment of the present invention, an advertiser may add funds online and substantially in real time through the use of a credit card, although the use of other payment types are certainly well within the scope of the present invention. For example, in an alternate embodiment of the present invention, advertisers may add funds to their account by transferring the desired amount from the advertiser's bank account through an electronic funds verification mechanism known in the art such as debit cards, in a manner similar to that set forth in U.S. Pat. No. 5,724,424 to Gifford. In another alternate embodiment of the present invention, advertisers can add funds to their account using conventional paper-based checks. In that case, the additional funds may be updated in the account record database through manual entry. The instrument information includes further details regarding the type of payment. For example, for a credit card, the instrument information may include data on the name of the credit card (e.g., MasterCard, Visa, or American Express), the credit card number, the expiration date of the credit card, and billing information for the credit card (e.g., billing name and address). In a preferred embodiment of the present invention, only a partial credit card number is displayed to the advertiser for security purposes.

The default values displayed to the advertiser are obtained from a persistent state, e.g., stored in the account database. In an embodiment of the present invention, the stored billing information values may comprise the values set by the advertiser the last (e.g. most recent) time the process of adding money was invoked and completed for the advertiser's account. The default billing information is displayed to the advertiser in a web-based form. The advertiser may click on the appropriate text entry boxes on the web-based form and make changes to the default billing information. After the advertiser completes the changes, the advertiser may click on a hyperlinked "Submit" button provided on the form to request that the system update the billing information and current balance in step 608. Once the advertiser has requested an update, a function is invoked by the system which validates the billing information provided by the advertiser and displays it back to the advertiser for confirmation, as shown in step 610. The confirmation billing information is displayed in read-only form and may not be changed by the advertiser.

The validation step functions as follows. If payment is to be debited from an advertiser's external account, payment may be authenticated, authorized and completed using the system set forth in U.S. Pat. No. 5,724,424 to Gifford. However, if the payment type is by credit card, a validating algorithm is invoked by the system, which validates the credit card number using a method such as that set forth in U.S. Pat. No. 5,836, 241 to Stein et al. The validating algorithm also validates the expiration date via a straightforward comparison with the current system date and time. In addition, the function stores the new values in a temporary instance prior to confirmation by the advertiser.

Once the advertiser ascertains that the displayed data is correct, the advertiser may click on a "Confirm" button provided on the page to indicate that the account should be updated in step 612. In step 612, a function is invoked by the system which adds money to the appropriate account balance, updates the advertiser's billing information, and appends the billing information to the advertiser's payment history. The advertiser's updated billing information is stored to the persistent state (e.g., the account record database) from the temporary instance.

Within the function invoked at step 612, a credit card payment function may be invoked by the system at step 614. In an alternate embodiment of the present invention, other payment functions such as debit card payments may be invoked by defining multiple payment types depending on the updated value of the payment type.

If the payment type is credit card, the user's account is credited immediately at step 616, the user's credit card having already been validated in step 610. A screen showing the status of the add money transaction is displayed, showing a transaction number and a new current balance, reflecting the amount added by the just-completed credit card transaction.

In an alternate embodiment of the present invention, after the money has been added to the account, the amount of money added to the account may be allocated between subaccounts the end of the add money process at step 616. If the advertiser has no subaccounts, all of the money in the account is a general allocation. However, if the advertiser has more than one subaccount, the system will display a confirmation and default message prompting the advertiser to "Allocate Money Between Subaccounts".

The menu selection "Allocate Money Between Subaccounts" may be invoked when money is added to the advertiser account after step 616 of FIG. 6, or it may be invoked within the "Account Management" menu 170 shown in FIG. 2. The "Account Management" menu 170 is accessible from the Advertiser Main Page 120, as shown in FIG. 2. This "Allocate Money Between Subaccounts" menu selection permits an advertiser to allocate current and any pending balances of the advertiser's account among the advertiser's subaccounts. The system will then update the subaccount balances. The current balance allocations will be made in real time, while the pending balance allocations will be stored in the persistent state. A routine will be invoked to update the subaccount balances to reflect the pending balance allocations when the payment for the pending balance is processed. Automatic notification may be sent to the advertiser at that time, if requested. This intuitive online account management and allocation permits advertisers to manage their online advertising budget quickly and efficiently. Advertisers may replenish their accounts with funds and allocate their budgets, all in one easy web-based session. The computer-based implementation eliminates time consuming, high cost manual entry of the advertiser's account transactions.

The "Allocate Money Between Subaccounts" routine begins when an advertiser indicates the intent to allocate money by invoking the appropriate menu selection at the execution points indicated above. When the advertiser indicates the intent to allocate, a function is invoked by the system to determine whether there are funds pending in the current balance (i.e., unactivated account credits) that have not yet been allocated to the advertiser's subaccounts, and displays the balance selection options. In a preferred embodiment of the present invention, an account instance is created and a pending current balance account field is set from the persistent state.

If there are no unallocated pending funds, the system may display the current available balances for the account as a whole as well as for each subaccount. The advertiser then distributes the current available balance between subaccounts and submits a request to update the balances. A function is invoked which calculates and displays the current running total for subaccount balances. The current running total is stored in a temporary variable which is set to the sum of current balances for all subaccounts for the specified advertiser. The function also validates the new available subaccount balances to make sure that the total does not exceed the authorized amount. If the new advertiser-set available subaccount balances does not exceed the authorized amount, a function is invoked which will update all of the subaccount balances in the persistent state and display the update in read-only format.

If there are pending funds in the current account balance, the pending funds must be allocated separately from the available current balance. The pending funds will then be added into the available current balance when the funds are received. The function must therefore prompt the advertiser to choose between allocating pending funds or allocating available funds. The allocating pending funds selection works in much the same manner as the allocating available funds selection outlined above. After the advertiser chooses to allocate pending funds, a routine is invoked to display current pending balances for the account and the subaccounts. The advertiser distributes the pending subaccount balances between campaigns and submits a request to update the balances. A function is invoked which calculates and displays the current running totals for the pending subaccount balances. This function also validates the new pending subaccount allocations to make sure that the allocations do not exceed any authorized amount. The current running total of pending allocations is set to the sum of current pending balances for all subaccounts for the advertiser. If the new user-set pending subaccount balances or the total of such balances do not exceed any authorized amount, the function will update all of the pending subaccount allocations in the persistent state, e.g. the advertiser's account in the database, and display the update in read-only format.

As indicated above and shown in FIG. 2, a routine displaying the account management menu 170 may be invoked from the advertiser main menu 120. Aside from the "Allocate Money Between Subaccounts" selection described above, the remaining selections all use to some extent the search listings present in the advertiser's account on the database, and may also affect the advertiser's entry in the search result list. Thus, a further description of the search result list generated by the search engine is needed at this point.

When a remote searcher accesses the search query page on the search engine web server 24 and executes a search request according to the procedure described previously, the search engine web server 24 preferably generates and displays a search result list where the "canonicalized" entry in search term field of each search listing in the search result list exactly matches the canonicalized search term query entered by the remote searcher. The canonicalization of search terms used in queries and search listings removes common irregularities of search terms entered by searches and web site promoters, such as capital letters and pluralizations, in order to generate relevant results. However, alternate schemes for determining a match between the search term field of the search listing and the search term query entered by the remote searcher are well within the scope of the present invention. For example, string matching algorithms known in the art may be employed to generate matches where the keywords of the search listing search term and the search term query have the same root but are not exactly the same (e.g., computing vs. computer). Alternatively a thesaurus database of synonyms may be stored at search engine web server 24, so that matches may be generated for a search term having synonyms. Localization methodologies may also be employed to refine certain searches. For example, a search for "bakery" or "grocery store" may be limited to those advertisers within a selected city, zip code, or telephone area code. This information may be obtained through a cross-reference of the advertiser account database stored at storage 32 on account management server 22. Finally, internationalization methodologies may be employed to refine searches for users outside the United States. For example, country or language-specific search results may be generated, by a cross-reference of the advertiser account database, for example.

An example of a search result list display used in an embodiment of the present invention is shown in FIG. 7, which is a display of the first several entries resulting from a search for the term "zip drives". As shown in FIG. 7, a single entry, such as entry 710*a* in a search result list consists of a description 720 of the web site, preferably comprising a title and a short textual description, and a hyperlink 730 which, when clicked by a searcher, directs the searcher's browser to the URL where the described web site is located. The URL 740 may also be displayed in the search result list entry 710*a*, as shown in FIG. 7. The "click through" of a search result item occurs when the remote searcher viewing the search result item display of FIG. 7 selects, or "clicks" on the hyperlink 730 of the search result item display 710. In order for a "click through" to be completed, the searcher's click should be recorded at the account management server and redirected to the advertiser's URL via the redirect mechanism discussed above.

Search result list entries 710*a*-710*h* may also show the rank value 760*a*, 760*b*, 760*c*, 760*d*, 760*e*, 760*f*, 760*g*, 760*h* of the advertiser's search listing. The rank value 760*a*, 760*b*, 760*c*, 760*d*, 760*e*, 760*f*, 760*g*, 760*h* is an ordinal value, preferably a number, generated and assigned to the search listing by the processing system 34 of FIG. 1. Preferably, the rank value 760*a*, 760*b*, 760*c*, 760*d*, 760*e*, 760*f*, 760*g*, 760*h* is assigned through a process, implemented in software, that establishes an association between the bid amount, the rank, and the search term of a search listing. The process gathers all search listings that match a particular search term, sorts the search listings in order from highest to lowest bid amount, and assigns a rank value to each search listing in order. The highest bid amount receives the highest rank value, the next highest bid amount receives the next highest rank value, proceeding to the lowest bid amount, which receives the lowest rank value. Most preferably, the highest rank value is 1 with successively increasing ordinal values (e.g., 2, 3, 4, . . . ) assigned in order of successively decreasing rank. The correlation between rank value 760*a*, 760*b*, 760*c*, 760*d*, 760*e*, 760*f*, 760*c*, 760*h* and bid amount is illustrated in FIG. 7, where each of the paid search list entries 710*a* through 710*f* display the advertiser's bid amount 750*a* through 750*f* for that entry. Preferably, if two search listings having the same search term also have the same bid amount, the bid that was received earlier in time will be assigned the higher rank value. Unpaid listings 710*g* and 710*h* do not display a bid amount and are displayed following the lowest-ranked paid listing. Preferably, unpaid listings are displayed if there are an insufficient number of listings to fill the 40 slots in a search results page. Unpaid listings are generated by a search engine utilizing objective distributed database and text searching algorithms known in the art. An example of such a search engine may be operated by Inktomi Corporation. The original search query entered by the remote searcher is used to generate unpaid listings through the conventional search engine.

Figure 8:
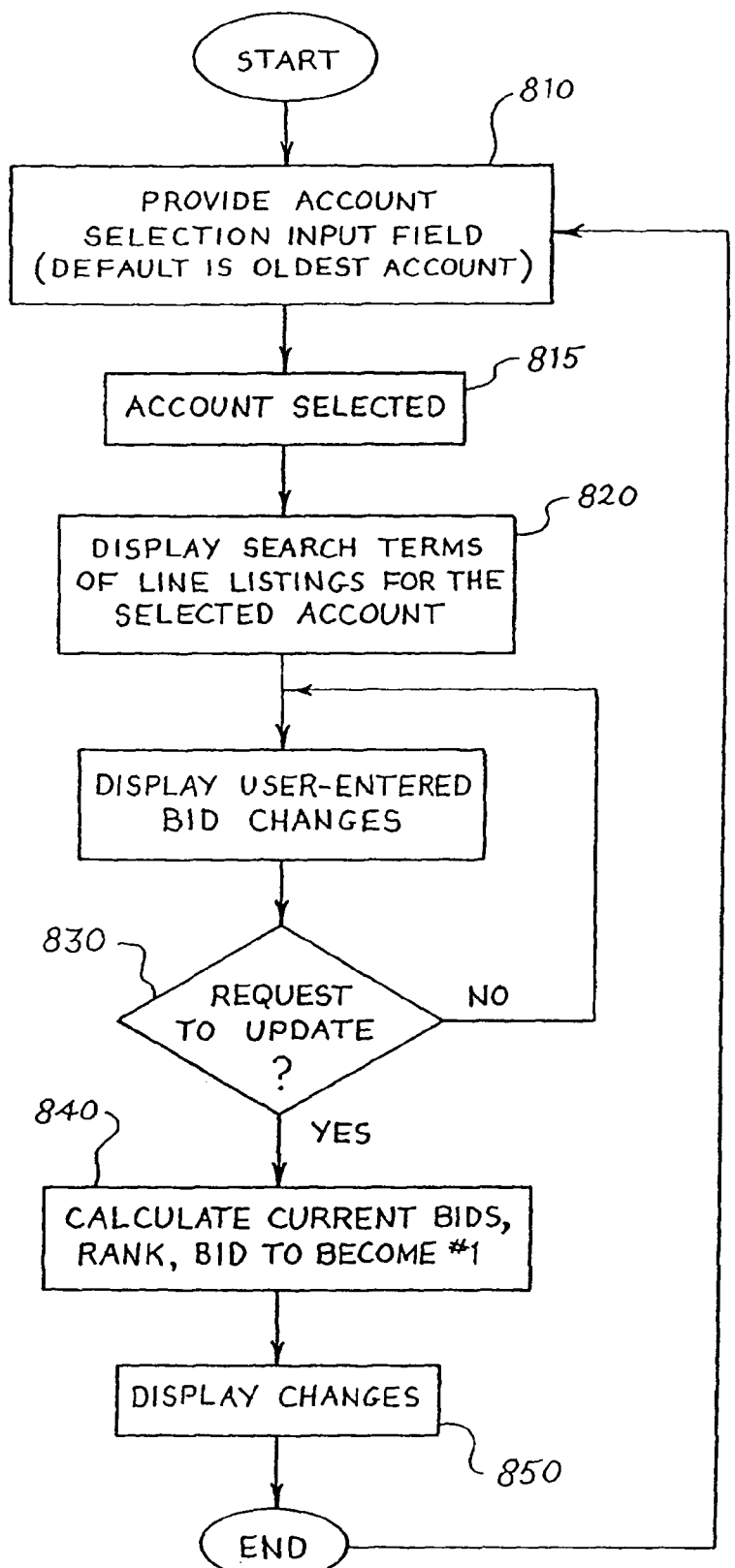
FIG. 8 is a flow chart illustrating a change bids process used in one embodiment of the present invention.

As shown in the campaign management menu 170 of FIG. 2, several choices are presented to the advertiser to manage search listings. First, in the "Change Bids" selection, the advertiser may change the bid of search listings currently in the account. The process invoked by the system for the change bids function is shown in FIG. 8. After the advertiser indicates the intent to change bids by selecting the "Change Bids" menu option, the system searches the user's account in the database and displays the search listings for the entire account or a default subaccount in the advertiser's account, as shown in step 810. Search listings may be grouped into subaccounts defined by the advertiser and may comprise one or more search listings. Only one subaccount may be displayed at a time. The display should also preferably permit the advertiser to change the subaccount selected, as shown in step 815. The screen display will then show the search listings for the selected subaccount, as indicated in step 820.

Figure 9:
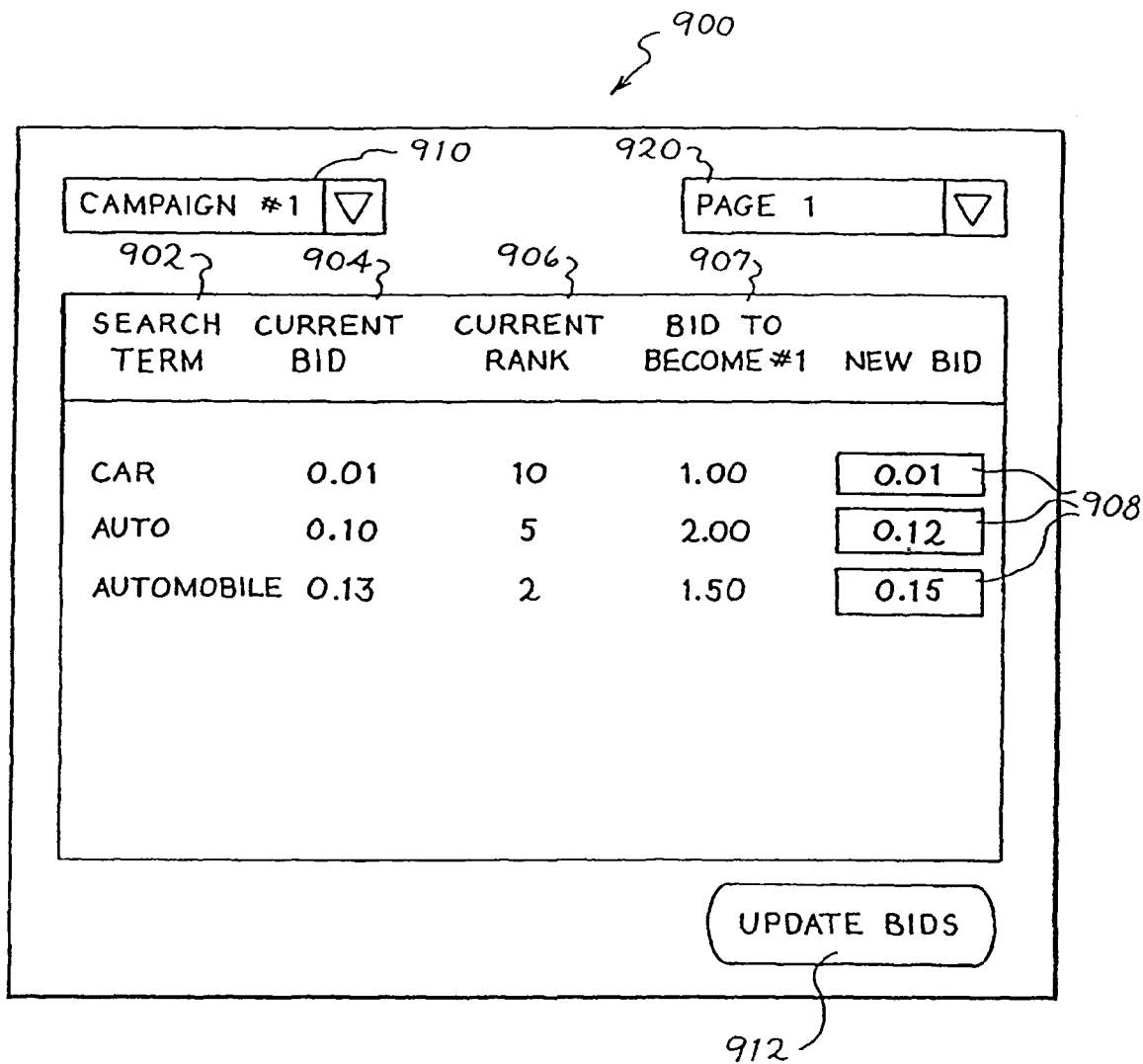
FIG. 9 illustrates an example of a screen display used in the change bids process of FIG. 8.

An example of screen display shown to the advertiser in step 810 is shown in FIG. 9 and will be discussed below. To change bids, the advertiser user may specify new bids for search terms for which the advertiser already has an existing bid by entering a new bid amount into the new bid input field for the search term. The advertiser-entered bid changes are displayed to the advertiser at step 820 of FIG. 8 as discussed above. To update the bids for the display page, the advertiser requests, at step 830 of FIG. 8, to update the result of changes. The advertiser may transmit such a request to the account management server by a variety of means, including clicking on a button graphic.

As shown in step 840 of FIG. 8, upon receiving the request to update the advertiser's bids, the system calculates the new current bid amounts for every search listing displayed, the rank values, and the bid amount needed to become the highest ranked search listing matching the search term field. Preferably, the system then presents a display of changes at step 850. After the user confirms the changes, the system updates the persistent state by writing the changes to the account in the database.

The search listing data is displayed in tabular format, with each search listing corresponding to one row of the table 900. The search term 902 is displayed in the leftmost column, followed by the current bid amount 904, and the current rank 906 of the search listing. The current rank is followed by a column entitled "Bid to become #1" 907, defined as the bid amount needed to become the highest ranked search listing for the displayed search term. The rightmost column of each row comprises a new bid input field 908 which is set initially to the current bid amount.

As shown in FIG. 9, the search listings may be displayed as "subaccounts." Each subaccount comprises one search listing group, with multiple subaccounts residing within one advertiser account. Each subaccount may be displayed on a separate display page having a separate page. The advertiser should preferably be able to change the subaccount being displayed by manipulating a pull-down menu 910 on the display shown in FIG. 9. In addition, search listing groups that cannot be displayed completely in one page may be separated into pages which may be individually viewed by manipulating pull-down menu 920. Again, the advertiser should preferably be able to change the page displayed by clicking directly on a pull-down menu 920 located on the display page of FIG. 9. The advertiser may specify a new bid for a displayed search listing by entering a new bid amount into the new bid input field 908 for the search listing. To update the result of the advertiser-entered changes, the advertiser clicks on button graphic 912 to transmit an update request to the account management server, which updates the bids as described above.

Many of the other selections listed in the "Account Management" menu 170 of FIG. 2 function as variants of the "Change Bid" function described above. For example, if the advertiser selects the "Change Rank Position" option, the advertiser may be presented with a display similar to the display of FIG. 9 used in the "Change Bid" function. However, in the "Change Rank Position" option, the "New Bid" field would be replaced by a "New Rank" field, in which the advertiser enters the new desired rank position for a search term. After the advertiser requests that the ranks be updated, the system then calculates a new bid price by any of a variety of algorithms easily available to one skilled in the art. For example, the system may invoke a routine to locate the search listing in the search database having the desired rank/search term combination, retrieve the associated bid amount of said combination, and then calculate a bid amount that is N cents higher; where N=1, for example. After the system calculates the new bid price and presents a read-only confirmation display to the advertiser, the system updates the bid prices and rank values upon receiving approval from the advertiser.

The "Modify Listing Component" selection on Account Management menu 170 of FIG. 2 may also generate a display similar to the format of FIG. 9. When the advertiser selects the "Modify Listing Component" option, the advertiser may input changes to the URL, title, or description of a search listing via web-based forms set up for each search listing. Similar to the process discussed above, the forms for the URL, title, and description fields may initially contain the old URL, title and description as default values. After the advertiser enters the desired changes, the advertiser may transmit a request to the system to update the changes. The system then displays a read-only confirmation screen, and then writes the changes to the persistent state (e.g., the user account database) after the advertiser approves the changes.

A process similar to those discussed above may be implemented for changing any other peripheral options related to a search listing; for example, changing the matching options related to a bidded search term. Any recalculations of bids or ranks required by the changes may also be determined in a manner similar to the processes discussed above.

In the "Delete Bidded Search Term" option, the system retrieves all of the search listings in the account of the advertiser and displays the search listings in an organization and a format similar to the display of FIG. 9. Each search listing entry may include, instead of the new bid field, a check box for the advertiser to click on. The advertiser would then click to place a check (X) mark next to each search term to be deleted, although any other means known in the art for selecting one or more items from a list on a web page may be used. After the advertiser selects all the search listings to be deleted and requests that the system update the changes, the system preferably presents a read-only confirmation of the requested changes, and updates the advertiser's account only after the advertiser approves the changes. The "deleted" search listings are removed from the search database 36 and will not appear in subsequent searches. However, the search listing will remain as part of the advertiser's account record for billing and account activity monitoring purposes.

In the "Add Bidded Search Term" option, the system provides the advertiser with a display having a number of entry fields corresponding to the elements of a search listing. The advertiser then enters into each field information corresponding to the respective search listing element, including the search term, the web site URL, the web site title, the web site description, and the bid amount, as well as any other relevant information. After the advertiser has completed entering the data and has indicated thus to the system, the system returns a read-only confirmation screen to the advertiser. The system then creates a new search listing instance and writes it into the account database and the search database upon receiving approval from the advertiser.

Preferably, the "Account Management" menu 170 of FIG. 2 provides a selection for the advertiser to "Get Suggestions On Bidded Search Term". In this case, the advertiser enters a bidded search term into a form-driven query box displayed to the advertiser. The system reads the search term entered by the advertiser and generates a list of additional related search terms to assist the advertiser in locating search terms relevant to the content of the advertiser's web site. Preferably, the additional search terms are generated using methods such as a string matching algorithm applied to a database of bidded search terms and/or a thesaurus database implemented in software. The advertiser may select search terms to bid on from the list generated by the system. In that case, the system displays to the advertisers the entry fields described above for the "Add Bidded Search Term" selection, with a form for entering a search listing for each search term selected. Preferably, the selected search term is inserted as a default value into the form for each search listing. Default values for the other search listing components may also be inserted into the forms if desired.

The "Account Management" menu 170 of FIG. 2 also preferably provides advertisers with a "Project Expenses" selection. In this selection, the advertiser specifies a search listing or subaccount for which the advertiser would like to predict a "daily run rate" and "days remaining to expiration." The system calculates the projections based on a cost projection algorithm, and displays the predictions to the advertiser on a read-only screen. The predictions may be calculated using a number of different algorithms known in the art. However, since the cost of a search listing is calculated by multiplying the bid amount by the total number of clicks received by the search listing at that bid amount during a specified time period, every cost projection algorithm must generally determine an estimated number of clicks per month (or other specified time period) for a search listing. The clicks on a search listing may be tracked via implementation of a software counting mechanism as is well known in the art. Clicks for all search listings may be tracked over time, this data may be used to generate estimated numbers of clicks per month overall, and for individual search terms. For a particular search term, an estimated number of searches per day is determined and is multiplied by the cost of a click. This product is then multiplied by a ratio of the average number of clicks over the average number of impressions for the rank of the search listing in question to obtain a daily run rate. The current balance may be divided by the daily run rate to obtain a projected number of days to exhaustion or "expiration" of account funds.

One embodiment of the present invention bases the cost projection algorithm on a simple predictor model that assumes that every search term performs in a similar fashion. This model assumes that the rank of the advertiser's search listing will remain constant and not fluctuate throughout the month. This algorithm has the advantages of being simple to implement and fast to calculate. The predictor model is based on the fact that the click through rate, e.g. the total number of clicks, or referrals, for a particular searcher listing, is considered to be a function of the rank of the search listing. The model therefore assumes that the usage curve of each search term, that is, the curve that result when the number of clicks on a search listing is plotted against the rank of the search listing, is similar to the usage curve for all search terms. Thus, known values extrapolated over time for the sum of all clicks for all search terms, the sum of all clicks at a given rank for all search terms, and the sum of all clicks for the selected search term may be employed in a simple proportion to determine the total of all clicks for the given rank for the selected search term. The estimated daily total of all clicks for the selected search term at the selected rank is then multiplied by the advertiser's current bid amount for the search term at that rank to determine a daily expense projection. In addition, if particular search terms or classes of search terms are known to differ markedly from the general pattern, correction values specific to the search term, advertiser, or other parameter may be introduced to fine-tune the projected cost estimate.

Finally, the "Account Management" menu 170 of FIG. 2 provides several selections to view information related to the advertiser's campaigns. The "View Subaccount Information" selection displays read-only information related to the selected subaccount. The "View Search Term List" selection displays the list of the advertiser's selected search terms along with the corresponding URLs, bid price, and rank, with the search terms preferably grouped by subaccount. The advertiser may also view current top bids for a set of search terms selected from a list of search terms from a read-only display generated by the system upon receiving the requested search terms from the advertiser.

For an advertiser who requires a more comprehensive report of search listing activity, the "View Report" option may be selected from the Advertiser Main Page 120 of FIG. 2. In an embodiment of the present invention, the "View Report" options generate reports comprehensive for up to one year preceding the current date. For example, daily reports are available for the each of the immediately preceding 7 days, weekly reports for the preceding four weeks, monthly reports for the preceding twelve months, and quarterly reports for the last four quarters. Additional reports may also be made available depending on advertiser interest. Other predefined report types may include activity tracked during the following time periods: Since Inception of the Account, Year To Date, Yearly, Quarter To Date, Month To Date, and Week to Date. Report Categories may include a Detail Report, viewable by Advertiser Account, by Search Listing, and by URL, and a Summary Report, viewable by Advertiser Account and by Subaccount. The reports may include identification data such as advertiser account and subaccount name, the dates covered by the report and the type of report. In addition, the reports may include key search listing account data such as current balance, pending current balance, average daily account debit, and run rate. Furthermore, the reports may also include key data, such as: search terms, URLs, bids, current ranks, and number of clicks, number of searches done for the search term, number of impressions (times that the search listing appeared in a search result list), and click through rate (defined as Number of Clicks/Number of Impressions). Preferably, the report is available in at least HTML view options for viewing via a browser program, printing, or downloading. Note, however, that other view options may be made available, such as Adobe Acrobat, PostScript, ASCII text, spreadsheet interchange formats (e.g., CSV, tab-delimited), and other well-known formats.

When the advertiser has selected the "View Report" option, the system invokes a function which displays a list of available report types, dates, categories, and view options. The system preferably creates a report instance with the following fields, all of which are initially set to null: report type, report date, report category, and view option. Once the advertiser has defined the parameters described above, the system invokes a function to generate the requested report, based on the advertiser-set parameters, and to display the report, based on the view option parameter.

Finally, a preferred embodiment of the present invention implements an option for context specific help that the advertiser may request at any time the advertiser is logged in. The help option may be implemented as a small icon or button located on the system generated display page. The advertiser may click on the icon or button graphic on the display page to request help, upon which the system generates and displays a help page keyed to the function of the particular display the user is viewing. The help may be implemented as separate display pages, a searchable index, dialog boxes, or by any other methods well known in the art.

FIGS. 10-29 are a flowchart illustrating methods for operating the system described above. The methods illustrated in FIGS. 10-29 and described below may be performed by software, hardware or a combination of the two. In one embodiment, the methods described herein may be performed by one or more program codes operating in conjunction with the account management server 22 including the database 38 and the search engine web server 24 including the search database 40 (FIG. 1). Alternatively, the program codes may be distributed among several computing devices and associated storage facilities having access to stored search listings and search requests received from searchers.

One embodiment is presented in the following algorithm. The search engine web server 24 forms a search engine and the database 38 forms a database searchable by the search engine and including a plurality of search listings. At least some search listings are associated with advertisers. Such advertiser search listings generally include a search term specified by the advertiser and for at least some search listings, a bid associated with the search term and the advertiser. The listing includes a current cost per click (CPC) and a maximum cost per click chargeable to the advertiser. The maximum cost per click may also be referred to as a bid amount. The advertiser search listings also include a desired rank desired by the advertiser. Upon receipt of a search query from a searcher that matches the search term of the advertiser search listing, the search listing is presented or displayed with other matching search results to the searcher. The position of the search listing in the search results is controlled by the CPC, which is determined from the bid and the desired rank. If the searcher subsequently clicks on the advertiser's search listing, causing the searcher's browser to be re-directed to the URL associated with the search listing, the cost per click amount is chargeable to the advertiser. An account of the advertiser may be deducted by the CPC amount, credits may be reduced or any other suitable accounting measure may be performed.

In particular embodiments, a timestamp, a bid amount and a desired rank may also be associated with an advertiser's search listings. The timestamp reflects the date and time a search listing was stored or created or last updated by the advertiser. The bid reflects the maximum CPC amount the advertiser is willing to pay or be charged for a clickthrough by a searcher. The desired rank reflects the ordinal position in the search results displayed to the searcher preferred by the advertiser. Operation of the system and method in conjunction with these features will be described below.

Each advertiser has an agent that acts on the advertiser's behalf. The agent is a software program code or routine which may be called or invoked to run on a processor to accomplish the described functions. The agent may be a general purpose agent, operable on behalf of any one of a number of advertisers using information specific to that one advertiser. Alternatively, the agent may be an advertiser-specific agent, retaining and operating on input and output information provided by and for the advertiser and active only when called upon to update the advertiser's account or other information.

The agent is instructed as to the desired rank and bid (maximum cost per click or CPC) for a search listing. The agent may take its instructions directly from the advertiser by means of a data entry and reporting process, or the agent may be activated by another application, such as an application running on the account management server 22 (FIG. 1).

Thus, a processor operating in conjunction with an agent implement a method for managing search listings in a search database. The method includes storing one or more search listings for an advertiser, where each search listing generally includes a search term, a cost per click, a maximum cost per click or bid and a desired rank. Each search listing is displayable in a display rank with other search listings according to the cost per click. The display rank is the relative position of a listing as displayed. The method further includes receiving and storing advertiser bid information and automatically adjusting the cost per click for selected search listings when the CPC or bid of any selected search listings changes. The method may be embodied as a software program including one or more program code means for implementing the described functions.

The account management system described above may be used by an advertiser to manage the advertiser's account including advertiser search listings. The system may implement a method which includes storing one or more search listings for an advertiser, each search listing being associated with a search term. The method further includes receiving from the advertiser identification information for a search listing and a maximum cost per click, or bid, for the search listing. The identification information may be, for example, the search term associated with the identified search listing. This information is stored, for example, in a search database or an account management database or both. Subsequently, the account management system determines a cost per click for the identified search listing based on the bid and other search listings which include the search term associated with the identified search listing.

In an alternative embodiment of the method, a desired rank is received from the advertiser and the desired rank is used to determine the cost per click for the identified search listing. In a further alternative embodiment of the method, instead of receiving from the advertiser the maximum cost per click, the method includes receiving from the advertiser identification information for the search listing and a desired rank for the identified search listing. The desired rank is then used in determining a cost per click for the identified search listing.

The agents as described herein permit implementation of a method for automatically managing search listing in a search database. The method includes storing a plurality of search listings for an advertiser. The method further includes receiving from the advertiser a designation of one or more search listings for which the cost per click should be automatically adjusted in response to variations in cost per click for other search listings associated with search terms of the designated one or more search terms. By means of the agents or any other suitable device, the method includes automatically adjusting the cost per click for the designated one or more search listings.

Figure 10:
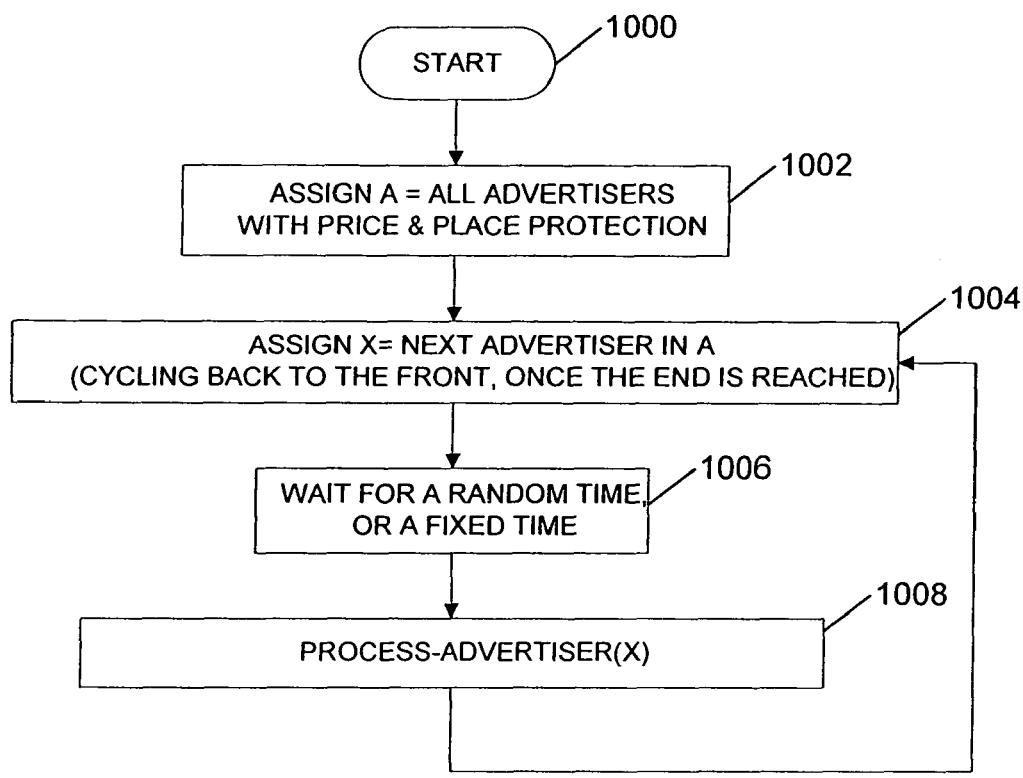
FIGS. 10-30 and 32-39 are flow diagrams illustrating operation of a system in accordance with the present embodiments.

The process for activating an agent is illustrated in FIG. 10. The process begins at block 1000. The agent for an advertiser is activated from time to time. This activation may performed be periodically, at random intervals or with any other timing.

At block 1002, a list A is established containing all advertisers who subscribe to or make use of the service, referred to as Price and Place Protection. At block 1004, a loop is entered. First, a variable x is assigned to the next advertiser in the list A. At block 1006, the process waits for a time period. As noted, this time period may be random, fixed or any suitable time. At block 1008, a procedure process advertiser (x) is called. This procedure will be described in greater detail below in conjunction with FIG. 11. In this procedure, the agent examines the state of the existing CPC's for competing listings, and sees if it is possible to adjust the GPC of the advertiser's listing to satisfy the advertiser's goals. Preferably, all advertisers' agents are activated fairly and with substantially the same frequency so that no advertisers experience particular advantages or disadvantages due to the process.

The method of FIG. 10 may be embodied in accordance with the pseudocode below.

---

Procedure Schedule-&-Invoke-agents ( )
  Let A be the list of all advertisers with Price & Place Protection;
  Loop forever
    Assign x to the next advertiser in A (cycling back to the front
    once the tail is reached);
    Wait for a random time, or some fixed time;
    Process-Advertiser (x);
  End Loop;
End Procedure;

---

Figure 11:
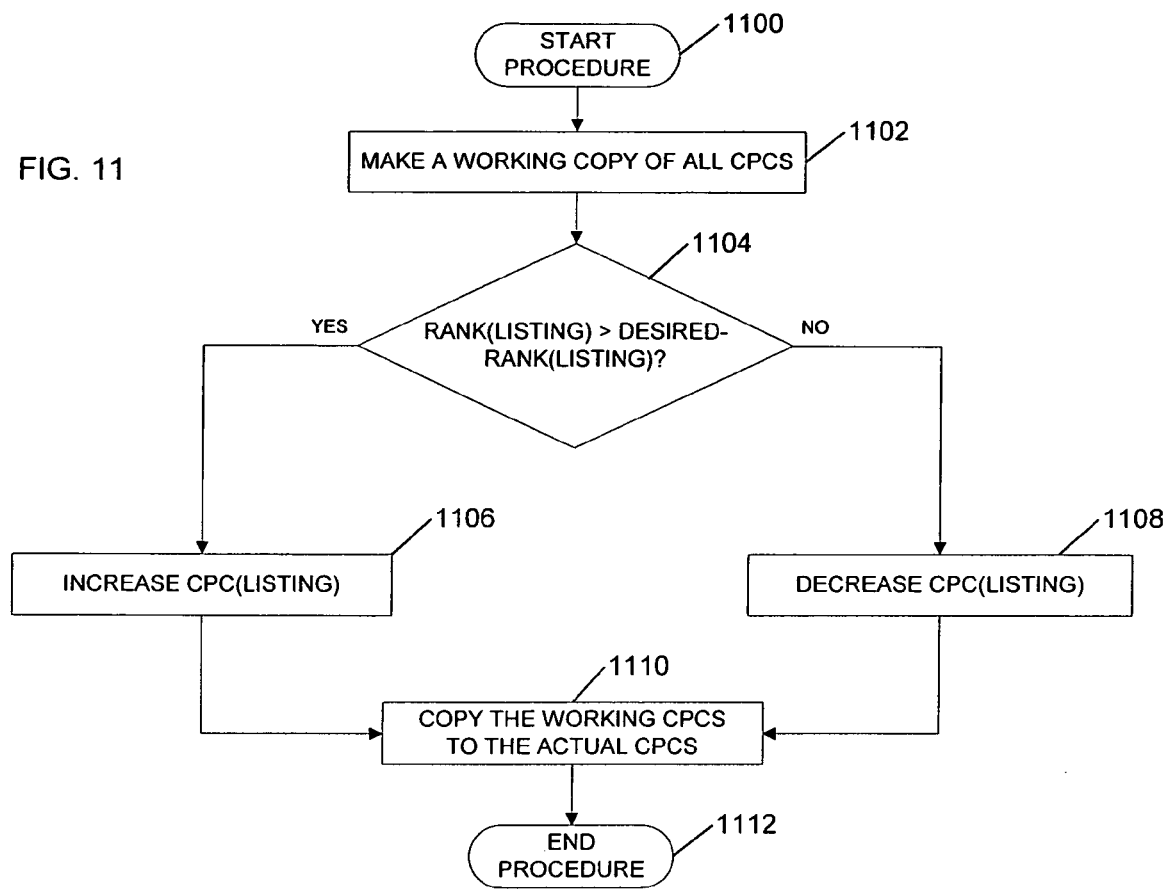

FIG. 11 is a flow diagram illustrating one embodiment of the process advertiser procedure of FIG. 10. The procedure begins at block 1100. At block 1102, the procedure first makes a working copy of the actual CPCs. There may be a number of intermediate values of the CPCs for the working copy, which are not reflected in the running system. Operating on the separate working copy isolates the running system from the temporary values introduced by the procedure.

When the agent for an advertiser is activated, the agent checks at block 1104 if the CPC of its listing should be adjusted. In FIG. 11, the test is a determination if the current rank for the advertiser is greater than that advertiser's desired rank. One procedure for determining an advertiser's rank will be described below in conjunction with FIG. 12.

At block 1106, the CPC is increased if the listing is at a worse rank than the desired rank and if it is possible to improve the rank by increasing the CPC without going over the CPC limit set by the advertiser-specified bid for the search listing. One embodiment of the increase-CPC procedure will be described below in conjunction with FIG. 13. On the other hand, at block 1108, the CPC is decreased if the listing is at a rank better than the advertiser's desired rank, or if it is possible to reduce the CPC without being at a rank worse than the current rank. One embodiment of the decrease-CPC procedure will be described below in conjunction with FIG. 16.

It is assumed herein that a rank is better if it is a higher rank, causing a search listing to be displayed higher or earlier in the search results presented to a searcher in response to a search query. Under this assumption the best rank is a rank equal to 1, meaning the first search listing displayed to the searcher.

Preferably, the CPC cannot be reduced below the minimum CPC. In one embodiment, the minimum CPC is $0.01. Other minimum CPC values may be used.

At the end of the procedure embodied in FIG. 11, when the correct CPCs are established, these are copied to the actual running system, block 1110. The rank of a listing is automatically computed using the working copy of its CPC and its time-stamp. The procedure ends at block 1112.

The procedure of FIG. 11 may be embodied in accordance with the pseudocode below.

```
Procedure Process-Advertiser(advertiser)
    Make a working copy of all CPCs;
    If rank(listing) > desired-rank(listing)
        Increase-CPC(listing);
    Else Decrease-CPC(listing);
    End If;
    Copy the working CPCs to the actual CPCs;
End Procedure;
```

Figure 12:
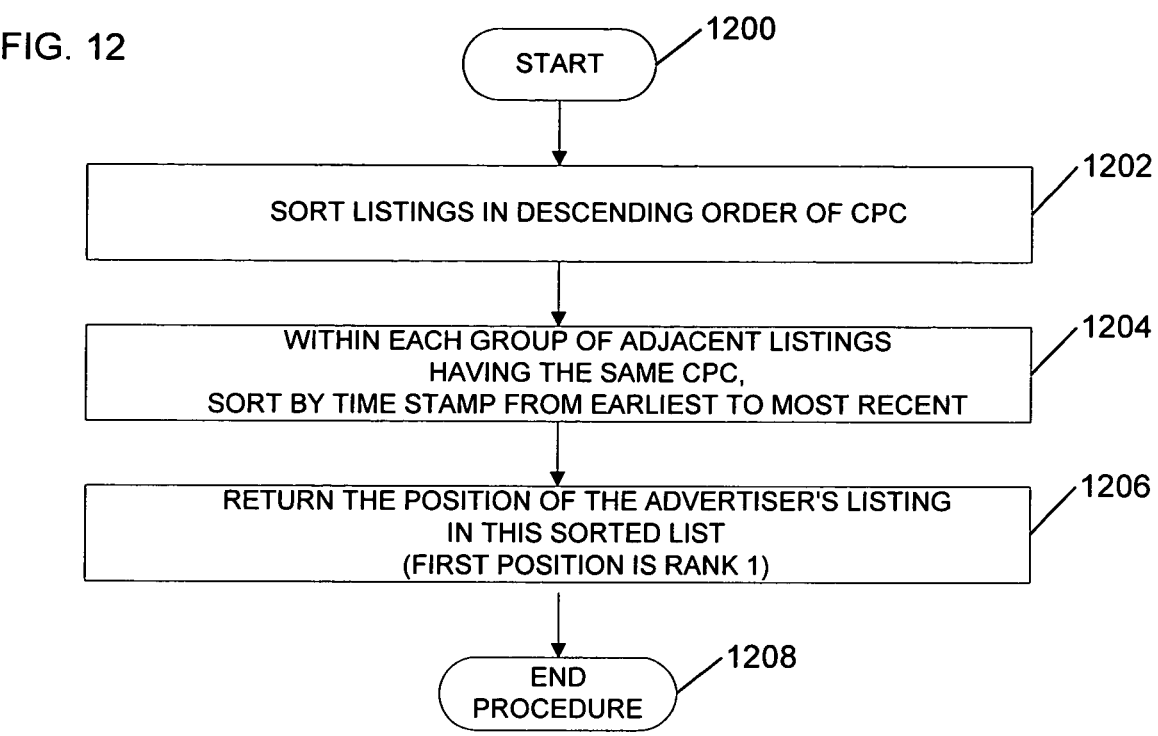

FIG. 12 is a flow diagram illustrating one embodiment of the rank(advertiser) procedure of FIG. 11. This procedure computes the rank of a listing from its CPC and timestamp. The procedure begins at block 1200.

At block 1202, all search listings for a common search term are sorted by their current cost per click (CPC). In the illustrated embodiment, the listings are sorted into descending order by CPC and earliest to latest by time stamp. Any convenient sorting may be used. At block 1204, within each group of listings having the same cost per click, the listings are sorted by their time stamp values. The timestamps reflect the date and time the search listing was stored or created or last updated by the advertiser. In the illustrated embodiment, the listings are sorted from earliest to most recent by time stamp.

At block 1206, the procedure returns to the calling routine the position of the advertiser's listing in the sorted list after sorting at block 1204. The procedure ends at block 1208.

The procedure of FIG. 12 may be embodied in accordance with the pseudocode below.

```
Procedure rank (listing)
    Sort all listings #1 by their CPC (highest to lowest) and
    #2 by their time-stamp (earliest to most recent);
    Return the position of the advertiser's listing in this sorted list
        (first position is at rank 1);
End Procedure;
```

Figure 13:
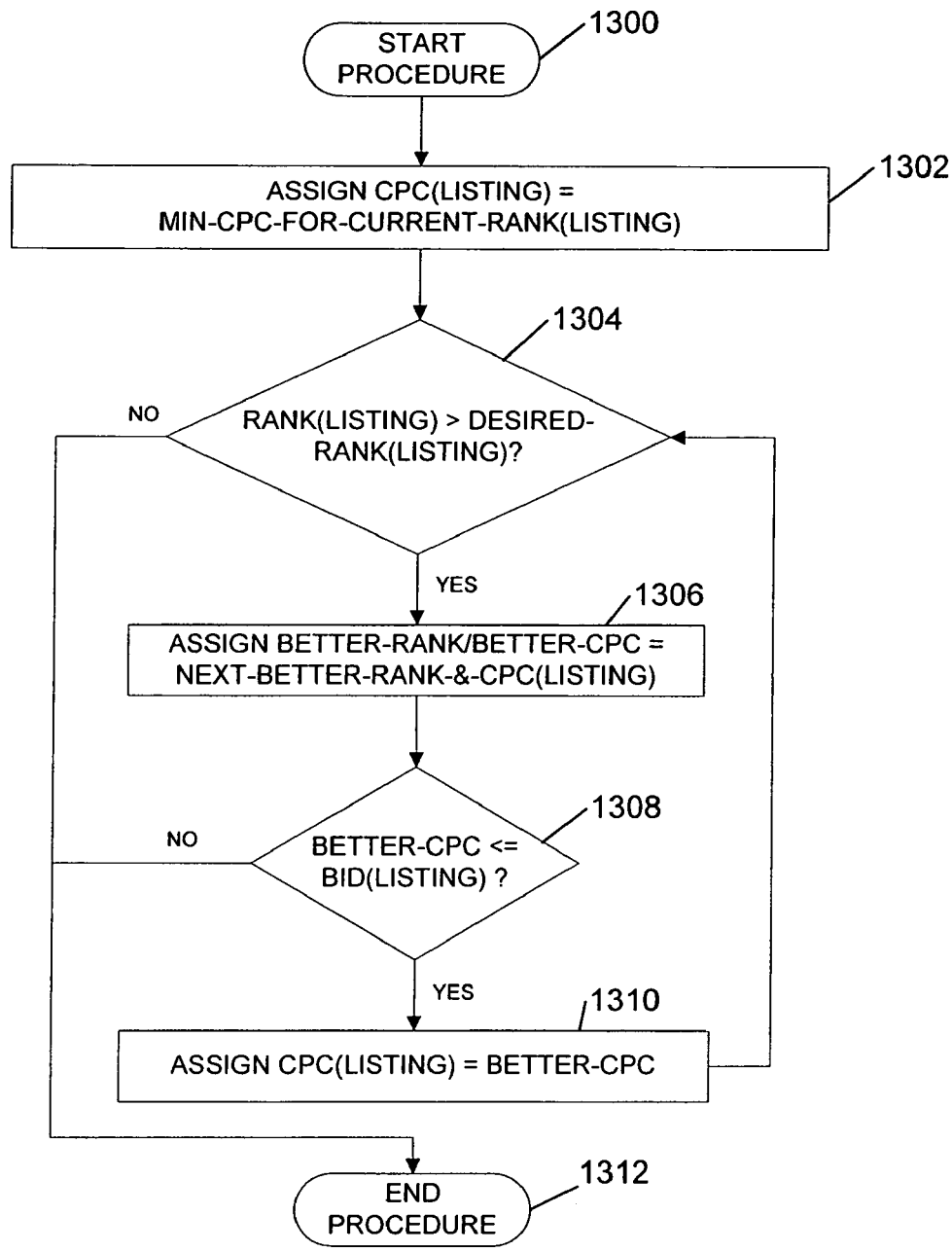

FIG. 13 is a flow diagram illustrating one embodiment of the increase-CPC (advertiser) procedure of FIG. 11. The method of FIG. 13 attempts to increase the CPC of an advertiser's listing to improve its rank to the desired rank, without exceeding the bid or maximum cost per click. The procedure begins at block 1300.

At block 1302, the cost per click for the advertiser is assigned equal to the minimum CPC for the current rank for the advertiser. The procedure min-CPC-for-current-rank will be described below in conjunction with FIG. 14. At block 1304, it is determined if the advertiser's rank exceeds the advertiser's desired rank. The rank(advertiser) procedure of FIG. 12 may be used to produce the advertiser rank information necessary to make this comparison. If the rank for the listing is less than or equal to the desired rank, control proceeds to block 1312 and the procedure ends.

If the comparison of block 1304 produces an affirmative result, at block 1306 a pair of variables better-rank and better-CPC are assigned equal to the values returned by a procedure next-better-rank-&-CPC, one embodiment of which will be described below in conjunction with FIG. 15. At block 1308, it is determined if the value of better-CPC is less than or equal to an advertisers bid or maximum CPC. If not, control proceeds to block 1312 and the procedure ends. better-CPC is less than or equal to the maximum CPC for the search listing, at block 1310, the advertiser's cost per click for the search listing is assigned to be the value of better-CPC. Thus, the cost per click for the listing is adjusted until it exceeds all other CPCs for the listing, unless the adjusted CPC exceeds the maximum CPC for the search listing. The result is a CPC that exceeds the next-highest CPC by the minimum CPC amount.

The procedure of FIG. 13 may be embodied in accordance with the pseudocode below.

```
Procedure Increase-CPC(listing)
    Assign CPC(listing) = Min-CPC-for-Current-Rank(listing);
    Loop
        If rank(listing) = desired-rank(listing)
            Exit Loop;
        Else
            Assign better-rank/better-CPC =
                Next-Better-Rank-&-CPC(listing);
            If better-CPC > bid(listing)
                Exit Loop;
            Else
                Assign CPC(listing) = better-CPC;
            End If;
        End If;
    End Loop;
End Procedure;
```

Figure 14:
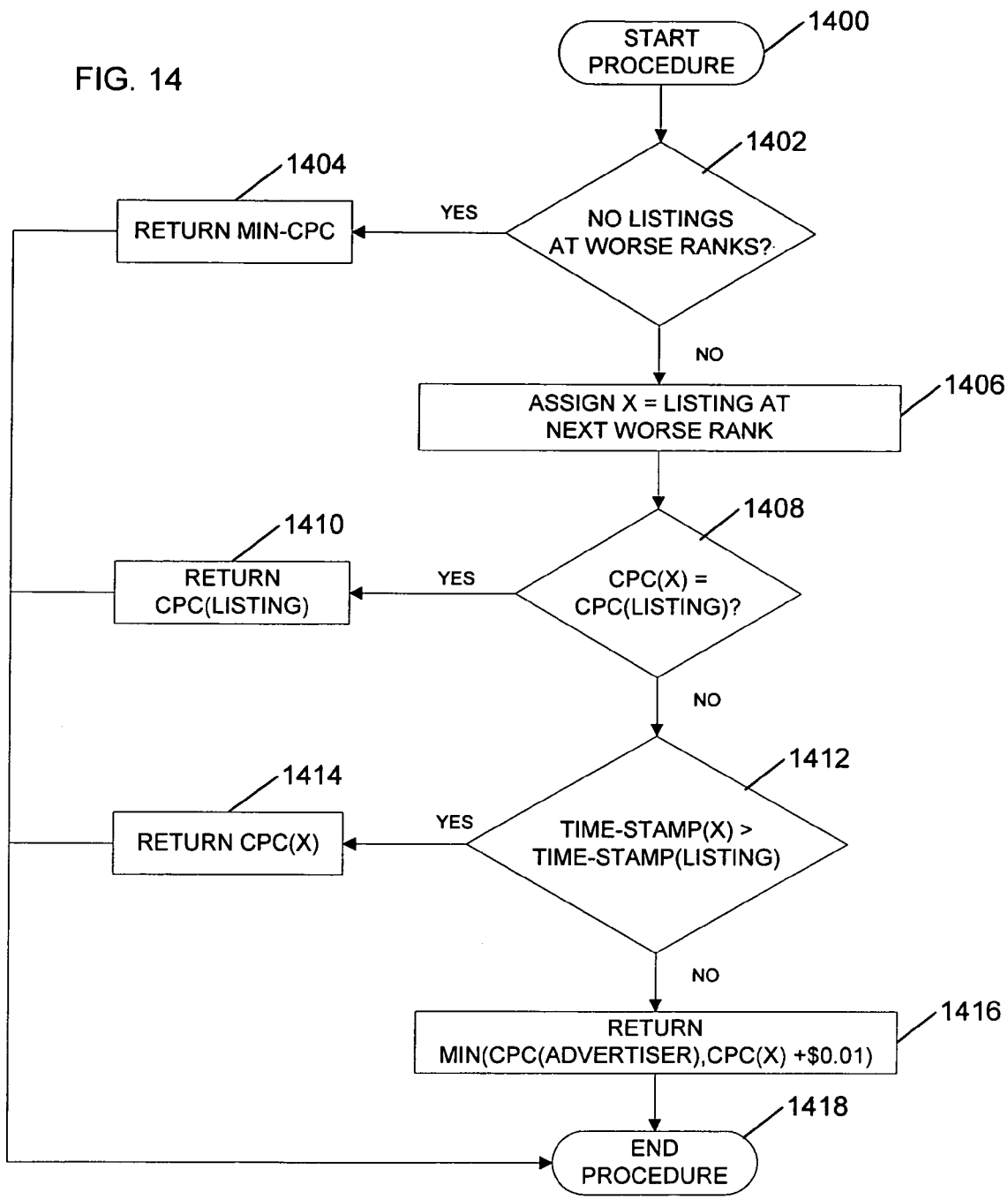

FIG. 14 is a flow diagram illustrating one embodiment of the procedure min-CPC-for-Current-Rank. This procedure computes the minimum CPC for an advertiser's listing to maintain its current rank. The procedure begins at block 1400.

At block 1402, it is determined if there are listings at worse ranks, where worse ranks are less prominent ranks, having higher ordinal numbers. If there are no such listings, at block 1404 the procedure returns the minimum CPC amount as the minimum CPC for the current rank. Control then proceeds to block 1418 and the procedure ends.

At block 1406, if there are listings at worse ranks, the variable x is assigned to the advertiser at the next-worse rank. At block 1408 it is determined if the CPC for that advertiser is equal to the CPC for the search listing. If so, at block 1410, the procedure returns the CPC for the listing as the minimum CPC for the current rank. Control then proceeds to block 1418 and the procedure ends.

If at block 1408 the CPC for the advertiser is not equal to the CPC for the search listing, at block 1412 it is determined if the timestamp for the advertiser at the next worse rank is greater or later than the timestamp for the search listing. If so, at block 1414, the procedure returns the CPC of advertiser x as the minimum CPC for the current rank. Control then proceeds to block 1418 and the procedure ends. Otherwise, at block 1416, the procedure returns the lesser of the CPC for the listing and the CPC of advertiser x incremented by the minimum amount to overtake a listing, which is $0.01 in this example. The procedure ends at block 1418.

The procedure of FIG. 14 may be embodied in accordance with the pseudocode below.

```
Procedure Min-CPC-for-Current-Rank(listing)
If no listings at worse ranks
    Return Min-CPC;
Else
    Assign x = listing at next worse rank;
    IF CPC(x) = CPC(listing)
        Return CPC(listing);
    Else IF Time-Stamp(x) > Time-Stamp(listing)
        Return CPC(x);
    Else
        Return min(CPC(listing),CPC(x) + $0.01);
    End If;
End If;
End Procedure;
```

Figure 15:
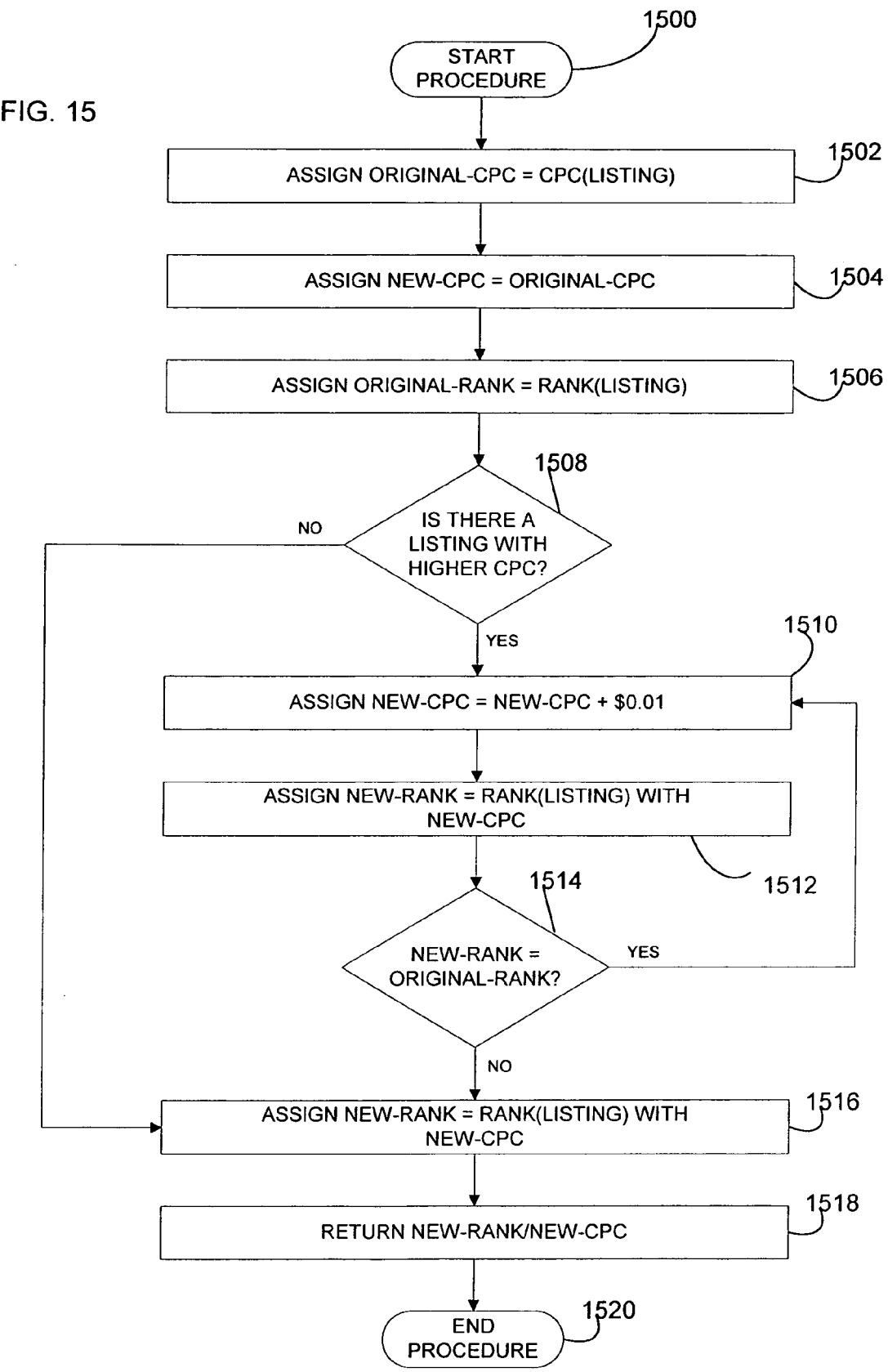

FIG. 15 is a flow diagram illustrating one embodiment of the procedure Next-Better-Rank-&-CPC. This procedure computes the next better rank that an advertiser's listing can be at, and the minimum CPC for this next better rank. It is possible that the next better rank is not one less than the current rank. This can happen if there is more than one listing at the next higher CPC. If the listing's CPC is changed to this next higher value, then the listing will be inserted at a position based on its timestamp. If the timestamp of the listing is the earliest, it will have the best rank for this new CPC, thus skipping over intermediate ranks. If the timestamp of the listing is the latest, then it will have the worst rank for this new CPC—effectively not changing its rank. The listing can have other ranks in between these two extremes, depending on its timestamp and the timestamps of the other listings.

The procedure begins at block 1500. At block 1502, the variable original-CPC is assigned the value of the current CPC for the search listing. At block 1504, the variable new-CPC is assigned the value of the variable original-CPC. At block 1506, the variable original-Rank is assigned the value of the current rank of the listing.

At block 1508, a test is made to determine if there are listings with higher cost per click. If not, the NO branch is followed and control passes to block 1516. If there are listings with higher CPC, at block 1510 the variable new-CPC is incremented by the minimum CPC amount to overtake a listing, $0.01 in this example. At block 1512, the variable new-Rank is assigned the value of the rank of the listing having the new cost per click new-CPC. The Rank procedure described above in conjunction with FIG. 12 may be used.

At block 1514, a test is made to compare the variable new-Rank and the variable original-Rank. If the two are equal, control returns to block 1510. The procedure will remain in the loop of blocks 1510, 1512, 1514 until a new rank which is higher than the original rank for the listing is obtained. Once the new rank is obtained, control proceeds from block 1514 to block 1516 where the variable new-Rank is assigned the value of the rank of the listing having the new cost per click. Again, the Rank procedure described above in conjunction with FIG. 12 may be used. At block 1518, the procedure returns the new rank and new CPC values and the procedure ends at block 1520.

The procedure of FIG. 15 may be embodied in accordance with the pseudocode below.

```
Procedure Next-Better-Rank-&-CPC(listing)
Assign original-CPC = CPC(listing);
Assign new-CPC = original-CPC;
Assign original-rank = rank(listing);
If there is a listing with a higher CPC
    Loop
        Assign new-CPC = new-CPC + $0.01;
        Assign new-rank = rank(listing) with new-CPC;
        If new-rank original-rank
            Exit Loop;
        End If;
    End Loop;
End If;
Assign new-rank = rank(listing) with new-CPC;
Return new-rank/new-CPC;
End Procedure;
```

Figure 16:
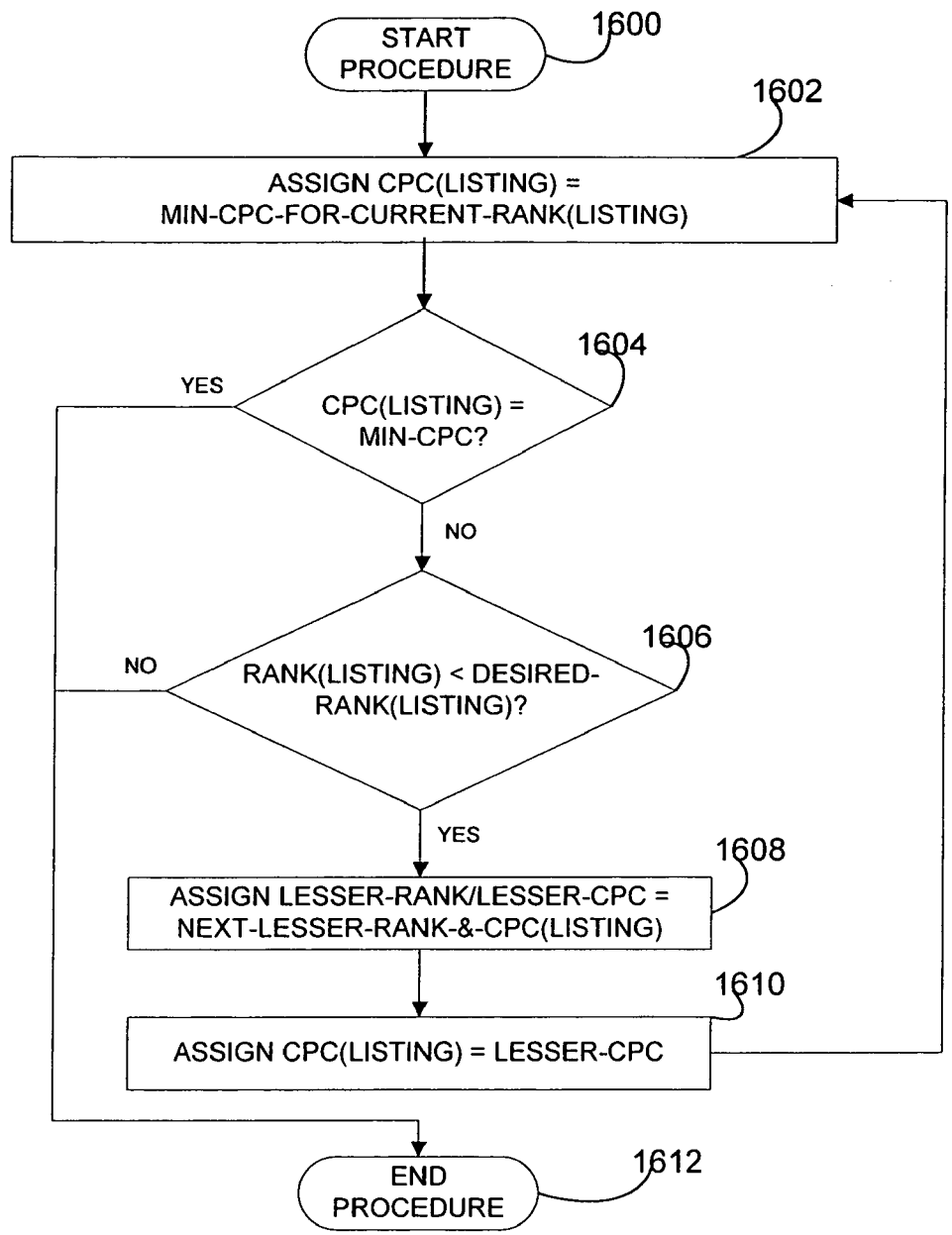

FIG. 16 is a flow diagram illustrating one embodiment of the procedure Decrease-CPC. This procedure attempts to decrease the CPC of an advertiser's listing to reduce its rank to the desired rank, without going below the minimum CPC. The procedure begins at block 1600.

At block 1602, the CPC for the search listing is assigned to the value of the minimum CPC possible for the current rank. The procedure described above in conjunction with FIG. 14 may be used. At block 1604 a test is performed to determine if the CPC for the current listing matches the minimum CPC value. If so, the CPC for the listing cannot be decreased and the procedure ends at block 1612.

If the CPC for the current listing does not match the minimum CPC value, at block 1606 it is determined if the rank of the current search listing is less than the desired rank for the search listing as specified by the advertiser. The Rank procedure described above in conjunction with FIG. 12 may be used. If the rank of the current search listing is greater than or equal to the desired rank, the CPC will not be decreased and the procedure ends, block 1612.

If the rank of the current search listing is less than the desired rank, then the pair of variables lesser-rank and lesser-GPO are assigned values according to the procedure next-lesser-rank-&-CPC, block 1608, described below in conjunction with FIG. 17. Next, the GPO for the current search listing is set equal to the value of the variable lesser-CPC, block 1610. Control then returns to block 1602 and the loop is again processed to determine if the GPO can be reduced further.

The procedure of FIG. 16 may be embodied in accordance with the pseudocode below.

```
Procedure Decrease-CPC(listing)
Loop
    Assign CPC(listing) = Min-CPC-for-Current-Rank(listing);
    If CPC(listing) = Min-CPC
        Exit Loop;
    Else If rank(listing) >= desired-rank(listing)
        Exit Loop;
    Else
        Assign lesser-rank/lesser-CPC =
            Next-Lesser-Rank-&-CPC(listing);
        Assign CPC(listing) = lesser-CPC;
    End If;
End Loop;
End Procedure;
```

Figure 17:
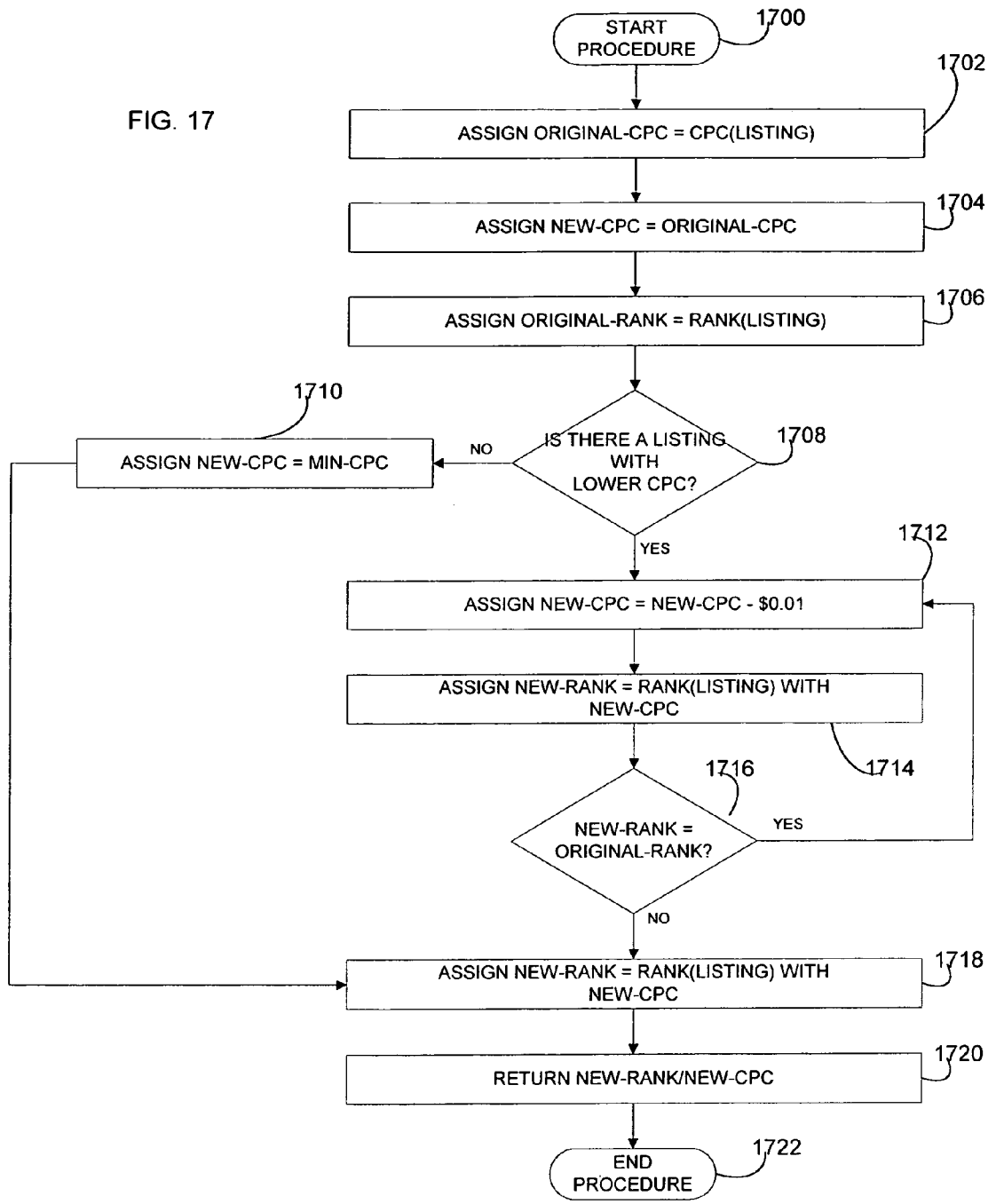

FIG. 17 is a flow diagram illustrating one embodiment of the procedure next-lesser-rank. This procedure computes the next lesser rank that an advertiser's listing can be at, and a CPC for this next lesser rank. It is possible that the next lesser rank is not the current rank plus one. This can happen if there is more than one listing at the next lower CPC. If we change the listing's CPC to this next lower value, then the listing will be inserted at a position based on its timestamp. If the timestamp of the listing is the earliest, it will have the best rank for this new CPC—effectively not changing its rank. If the timestamp of the listing is the latest, then it will have the worst rank for this new CPC, thus skipping over intermediate ranks. The listing can have other ranks in between these two extremes, depending on its time stamp and the time stamps of the other listings.

The procedure begins at block 1700. At block 1702, the variable original-CPC is assigned the value of the CPC of the current search listing. At block 1704, the value of the variable new-CPC is assigned the value of the variable original-CPC. At block 1706, the variable original-rank is stored with the value of the current rank of the listing.

At block 1708, it is determined if there is are listings with a lower CPC. If not the rank and CPC for the listing cannot be lowered and, at block 1710, the variable new-CPC is set to the minimum CPC value, and control proceeds to block 1718.

If there is a listing with a lower CPC, at block 1712 the value of new-CPC is decremented by the minimum CPC to overtake a listing, $0.01. At block 1714, the value of new-rank is set to the rank of the listing having CPC equal to the value of new-CPC. At block 1716, the value of new-rank is compared with the value of original-rank. If they are equal, the rank of the listing has not been decreased so control returns to block 1712. The procedure remains in the loop including blocks 1712, 1714, 1716 until the rank of the listing has been decremented.

Once the rank of the listing has changed, at block 1718 the value of new-rank is assigned to the rank of the listing having CPC of the value of new-CPC. At block 1720, the procedure returns the values of new-rank and new-CPC. The procedure ends at block 1722.

The procedure of FIG. 17 may be embodied in accordance with the pseudocode below.

```
Procedure Next-Lesser-Rank-&-CPC(listing)
    Assign original-CPC = CPC(listing);
    Assign new-CPC = original-CPC;
    Assign current-rank = rank(listing);
    If no listing with lower CPC
            Assign new-CPC = Min-CPC;
    Else
        Loop
            Assign new-CPC = new-CPC – $0.01;
            Assign new-rank = rank(listing) with new-CPC;
            If new-rank original-rank
                Exit Loop;
            End If;
        End Loop;
    End If;
    Assign new-rank = rank(listing) with new-CPC;
    Return new-rank/new-CPC;
    End Procedure;
```

Simultaneous Price & Place Protection

In the embodiment of FIGS. 10-17, referred to as Price & Place Protection, the system and method assign the CPCs of the listings to their ideal values one advertiser at a time. This is an endless loop, as indicated by FIG. 10, where the system waits for a random or periodic time, and then acts on behalf of successive advertisers. Setting the CPC on behalf of one advertiser can undo the goals of other advertisers. This has the disadvantage that the CPCs of listings can oscillate up and down, as the system acts on behalf of successive advertisers.

In a second embodiment, the ideal CPCs of all listings are set at the same time. In addition, in this second variation, the CPC of a listing is only decreased if the system can guarantee that no other listing with Price & Place Protection can have its CPC increased to unseat the advertiser from his current rank according to the current instructions from all competing advertisers. The following is one means of implementing this second embodiment.

We first describe the concept of competitive search listings. This concept is used to decide if it is appropriate to reduce the CPC of a search listing, given the search listing below. If a listing is competitive with the listing below, then we cannot reduce its CPC below the bid (maximum CPC) of the listing below.

A search listing $L_1$ at current rank $C_1$ is competitive with another listing directly below it $L_2$ at current rank $C_2=C_1+1$, written as competitive($L_1,L_2,C_1$) if:

1. $L_1$ desires to be at its current rank or a rank better than its current rank, and
2. $L_2$ is at a rank worse than its desired rank (fixed CPC listings have an implicit desired rank of 1)

That is, competitive($L_1,L_2, C_1$) if:

$C_1$ desired-rank($L_1$) & $C_2$>desired-rank($L_2$)

Every search listing having Price & Place Protection has at least one of a bid or maximum CPC, a desired rank, and a CPC. Some search listings may have only a desired rank and some may have only a fixed or maximum CPC. A fixed CPC listing has an implicit desired rank of 1. The CPC and timestamp of a listing determine its current rank.

So, if competitive($L_1,L_2, C_1$), then search listing $L_1$ does not want to be at a worse rank. If search listing $L_2$ is a fixed CPC, then search listing $L_1$'s CPC cannot be reduced below this fixed CPC. If search listing $L_2$ is a search listing having Price & Place Protection, then $L_1$'s CPC cannot be reduced below the bid (maximum CPC) of $L_2$, otherwise $L_2$'s CPC could then be increased to displace $L_1$ from its desired rank.

Figure 18:
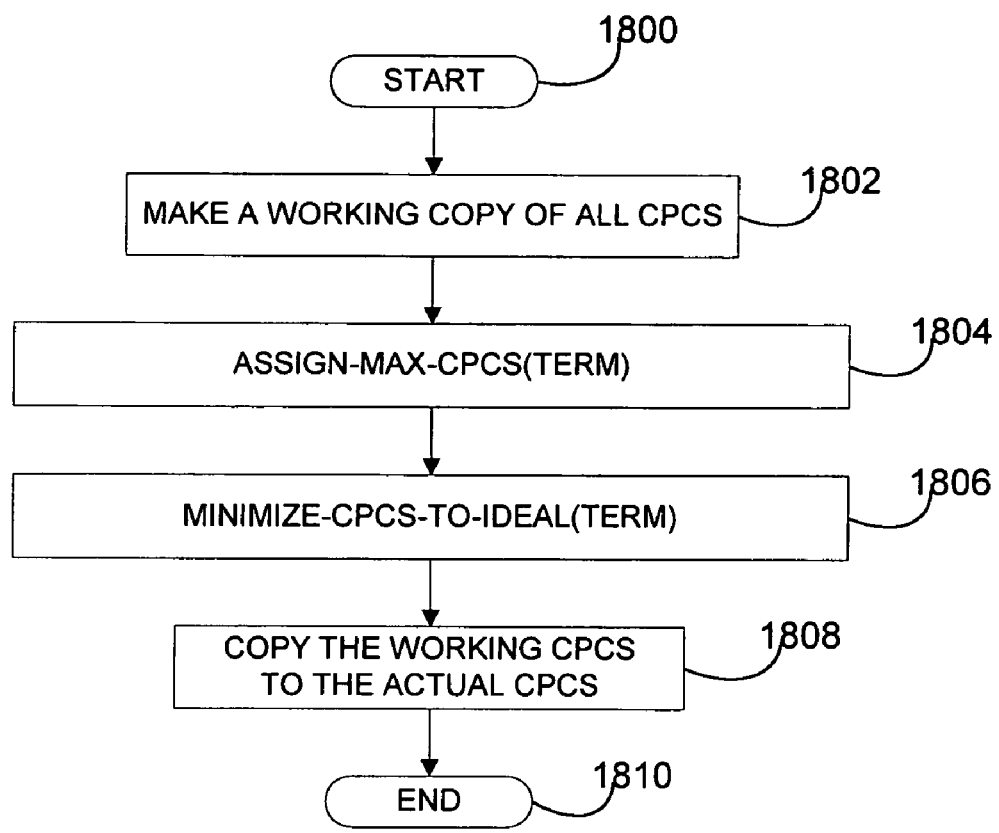

FIG. 18 is a flow diagram illustrating one embodiment of a procedure to compute the ideal CPCs for all search listings, taking into account each listing's maximum CPC or bid and desired rank. For each term, this only need be done when an advertiser manually changes a fixed CPC, or an advertiser enters a new Price & Place Protection search listing or changes the bid of an existing Price & Place Protection search listing.

The procedure temporarily sets the CPCs of all listings with Price & Place Protection (PPP) to their maximum, and then reduces these CPCs to try to set each listing to its ideal rank, starting with the lowest desired rank, and working up to the highest desired rank.

The procedure begins at block 1800. At block 1802, the system makes a working copy of all cost per click entries that may be affected so that the currently installed copy in the system is not affected by temporary variations due to operation of the procedure. At block 1804, a procedure assign-max-CPCs is called. This procedure is described below in conjunction with FIG. 19. At block 1806, a procedure minimize-CPCs-to-ideal is called. This procedure is described below in conjunction with FIG. 20. At block 1808, the working copy of the cost per click entries is copied back to the actual CPC information used by the system. The procedure ends at block 1810.

The procedure of FIG. 18 may be embodied in accordance with the pseudocode below.

```
Procedure Recompute-CPCs-Fixed-Point-Price-&-Place-Protection (term)
Make a working copy of all CPCs;
Assign-Max-CPCs (term);
Minimize-CPCs-to-Ideal (term);
Copy the working CPCs to the actual CPCs;
End Procedure;
```

Figure 19:
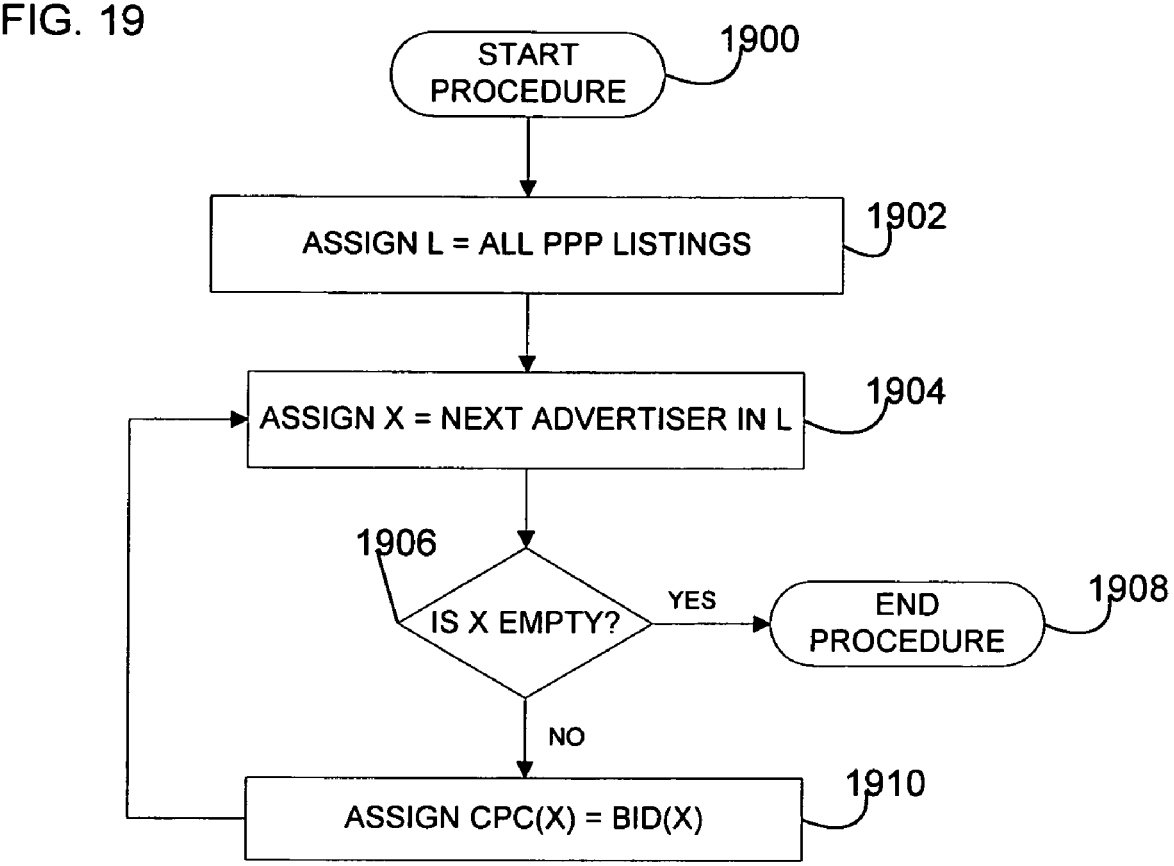

FIG. 19 is a flow diagram illustrating one embodiment of procedure assign-max-CPCs. This procedure temporarily sets the cost per click of each search listing having Price & Place Protection to the maximum permitted by its bid. The procedure begins at block 1900.

At block 1902, all Price & Place Protection search listings are stored in the list L. At block 1904, variable x is assigned to be the search listing for the next advertiser in the list L. At block 1906, a test is performed to see if the variable x is empty. If so, indicating the end of the list L, the procedure ends at block 1908. If not, at block 1910, the cost per click of for search listing x is assigned to be the bid or the maximum cost per click of the search listing x.

The procedure of FIG. 19 may be embodied in accordance with the pseudocode below.

```
Procedure Assign-Max-CPCs (term)
Loop x over all PPP listings for term
    Assign CPC (x) = bid (x);
End Loop;
End Procedure;
```

Figure 20:
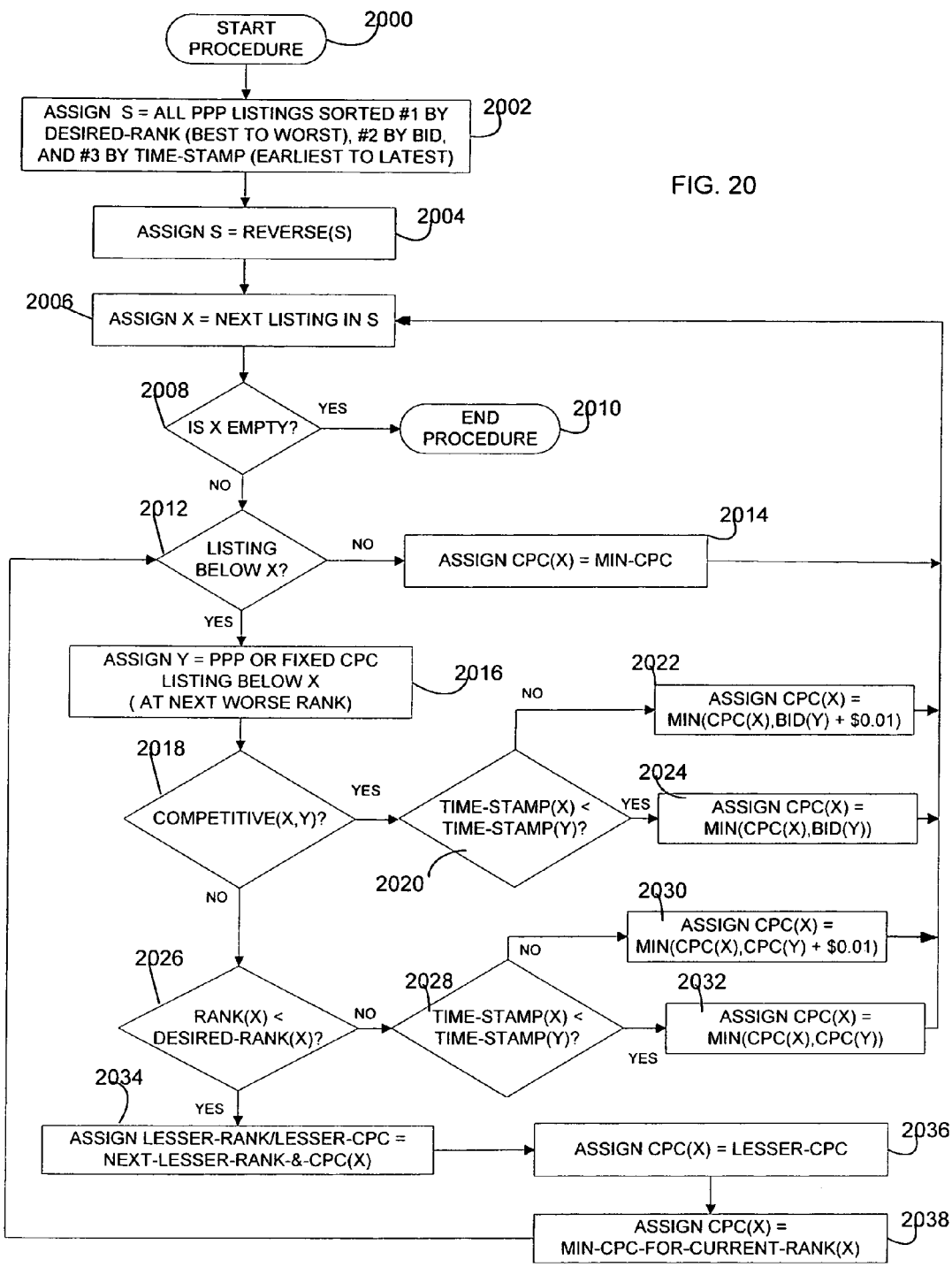

FIG. 20 is a flow diagram illustrating one embodiment of procedure minimize-CPCs-to-ideal. This procedure operates to reduce the temporary CPCs to the ideal minimal value for all advertisers, while satisfying the bid and desired rank constraints of each advertiser. The procedure begins at block 2000.

At block 2002, a sorted list S is formed by sorting all Price & Place Protection search listings. Preferably, the search listings are first sorted by desired rank, sorting from best rank to worst rank, second sorted by bid and third sorted by timestamp, earliest to latest. In block 2004, the sorted list S is reversed and in block 2006 a next listing x in the reversed list S is selected for processing.

At block 2008, it is determined if listing x is empty. If so, the end of the list S has been reached and the procedure ends at block 2010. If not, at block 2012 it is determined if there is a listing below listing x. If not, at block 2014 the cost per click of listing x is set to the minimum CPC value. Control returns to block 2006 to select the next listing in S for processing.

If there was a listing below listing x at block 2012, at block 2016 variable Y is set to the search listing at the next worse rank below listing x. At block 2018, it is determined if listings x and y are competitive listings, as described above. If so, at block 2020, the timestamps associated with listings x and y are compared. If the timestamp for listing y is not greater than the timestamp for listing x, the cost per click for listing x is set to the lower of the CPC of listing x or the maximum CPC of listing Y plus the minimum CPC value to overtake a listing, $0.01, block 2022. Otherwise, the CPC of listing x is set to the lower value of the CPC of listing x and the maximum CPC of listing Y, block 2024.

If listings x and Y are not competitive at block 2018, at block 2026 is determined if the rank of listing x is less than the advertiser's desired rank for listing x. If not, at block 2028, the timestamps associated with listings x and y are compared. If the timestamp for listing y is not greater than the timestamp for listing x, the cost per click for listing x is set to the lower of the CPC of listing x or the CPC of listing Y plus the minimum CPC value to overtake a listing, $0.01, block 2030. Otherwise, the CPC of listing x is set to the lower value of the CPC of listing x and the CPC of listing Y, block 2032.

If the rank of listing x is less than the advertiser's desired rank for listing x at block 2026, at block 2034 the two variables lesser-rank and lesser-CPC are set equal to the results of the procedure next-lesser-rank&-CPC, which may be embodied as described above in connection with FIG. 19. At block 2036, the CPC for listing x is set to the lesser-CPC and at block 2038 the CPC of listing x is set to the results of the procedure min-CPC-for-current-rank, which may be embodied as described above in connection with FIG. 14. Control then returns to block 2012.

The procedure of FIG. 20 may be embodied in accordance with the pseudocode below.

```
Procedure Minimize-CPCs-to-Ideal(term)
Assign S to the list of PPP listings for term sorted #1 by the
    desired-rank (best to worst), #2 by bid, and #3 by time-stamp
    (earliest to latest);
Loop x over all elements in S, in reverse order
L1: If no listing below x (at next worse rank)
        Assign CPC(X) = min-CPC;
    Else
        Assign y to PPP or fixed CPC listing below x (at next
            worse rank);
        If competitive(x,y)
            If time-stamp(x) < time-stamp(y)
                Assign CPC(x) = min(CPC(x),bid(y));
            Else
                Assign CPC(x) = min(CPC(x),bid(y) +$0.01);
            End If;
        Else If rank(x) >= desired-rank(x)
            If time-stamp(x) < time-stamp(y)
                Assign CPC(x) = min(CPC(x),CPC(y));
            Else
                Assign CPC(x) = min(CPC(x),CPC(y) +$0.01);
            End If;
        Else
            Assign lesser-rank/lesser-CPC =
                Next-Lesser-Rank-&-CPC(x);
            Assign CPC(x) = lesser-CPC;
            Assign CPC(x) = Min-CPC-for-Current-Rank(x);
            Go To L1;
        End If;
    End If;
End Loop;
End Procedure;
```

Every fixed CPC listing has an implicit "bid" equal to its fixed CPC, and this implicit value is used above.

The procedures for Simultaneous Price & Place Protection attempt to find the best solution, given the goals of all advertisers. However, in certain situations it may be impossible to satisfy advertiser goals. There are two possible problems:

1. some ranks do not have any advertiser bids, and
2. higher ranks do not have higher bids.

In one problematic example, there is only one advertiser A, and this is a PPP advertiser with a bid of $2.00 for rank 2. This means that A has the goal of being at rank 2 with a maximum CPC of $2.00. If rank 2 cannot be achieved with the $2.00 limit, then A has the goal of being at rank 3 with a maximum CPC of $2.00 (and so on). Note that A does not have any bid for rank 1! The current procedures will assign A the minimum CPC, and A will be at rank 1, though he wanted to be at rank 2.

In a second problematic example, advertiser A has a bid of $1.00 for rank 1, advertiser B has a bid of $2.00 for rank 2, and advertiser C has a bid of $1.50 also for rank 2. In this case advertisers B and C are competing with each other for rank 2. The current procedures will assign $1.01 CPC for advertisers B and C, and $1.00 CPC for advertiser A (rank 3). Advertiser B will be at rank 1 (assume its timestamp is earlier than C's time stamp), though he wanted to be at rank 2.

There are a number of possible ways to address these concerns. The first is to use the existing procedures—they try to find the best solution given the goals.

A second solution is to use "filler" listings. These are default listings, preferably bearing some matching relation to the search term put forth by the searcher. There are no advertisers bidding for these listings. However we assign them an implicit bid that is higher than all other PPP bids or fixed CPCs. Filler listings are added automatically at the start for all ranks that do not have bids, and for all ranks that have a bid that is lower than the maximum bid of an adjacent rank (next worse rank).

For the first problem example, a filler listing added at rank 1, which results in advertiser A being at rank 2 (which is what A wanted). For the second problem example, a filler listing is also added at rank 1, which results in advertiser B being at rank 2 (which is what B wanted), advertiser C being at rank 3, and advertiser A being at rank 4.

A third solution is to relax the marketplace rules that require the CPC not to increase with increasing rank. For the first problem example, this would allow adding a filler listing with minimum CPC at rank 1. For the second problem example, this would allow having advertiser A at rank 1 with CPC $1.00, advertiser B at rank 2 at $1.01, and advertiser C at rank 3 at $1.01. This can be accomplished by changing the definition of the procedure "rank" to take into account the winners at each step of the procedure Minimize-CPCs-to-Ideal.

Simultaneous Price Protection

In a third embodiment, some advertisers can only specify a maximum CPC. In this case, these listings are to be set to the best possible rank, without going over their CPC limit. Other listings may have a fixed CPC, or they may have a bid (maximum CPC) and a desired rank.

One means of implementing the third variation is to use the algorithm of the second variation, but where we set the desired rank to 1 for all listings that only have a maximum CPC.

If there are no advertisers that specify a desired rank, then it is possible to simplify the algorithm. In this case, every listing is competitive with every other listing, and we can dispense with this concept. One means of implementing the third variation when no advertisers specify a desired rank is given in FIG. 21, which is a flow diagram illustrating one embodiment of a procedure recompute-CPCs-fixed-point-price-protection. This algorithm is only run when an advertiser changes the bid or fixed CPC of any listing. The procedure begins at block 2100.

At block 2102, a working copy of all cost per click data is stored separate from the data currently in use. At block 2104, a set S is set to contain all listings sorted first by bid or maximum cost per click and second by time stamp, earliest to latest. At block 2106, the sorted list S is reversed. At block 2108, search listing x is selected from the reversed, sorted list S for processing. At block 2110, it is determined if listing x is empty, indicating if the end of the list S has been reached. If so, at block 2112, the working CPC data is copied back to the data currently in use and the procedure ends at block 2114.

If listing x is not empty, at block 2116 it is determined whether there are one or more listings below listing x. If no, at block 2118, the CPC for listing x is set to the minimum CPC value and control then returns to block 2108 to process the next listing in set S. If there are listings below listing x, at block 2120 listing Y is set to the listing at the next worse rank below listing x.

At block 2122, the CPC for listing x is set to the lesser of either the CPC of listing x or the bid for listing Y plus the minimum CPC value to overtake a listing, $0.01, if listing Y is a Price & Place Protected listing. If listing Y is a fixed CPC listing, meaning that it has no desired rank entered by the advertiser, the CPC for listing x is set to the lesser of either the current CPC of listing x or the CPC of listing Y plus the minimum CPC value to overtake a listing, $0.01.

At block 2124, the CPC of listing x is set to the results of procedure min-CPC-for-current-rank, which may be implemented as described above in connection with FIG. 14. Control then returns to block 2108 to process the next listing in set S.

Figure 21:
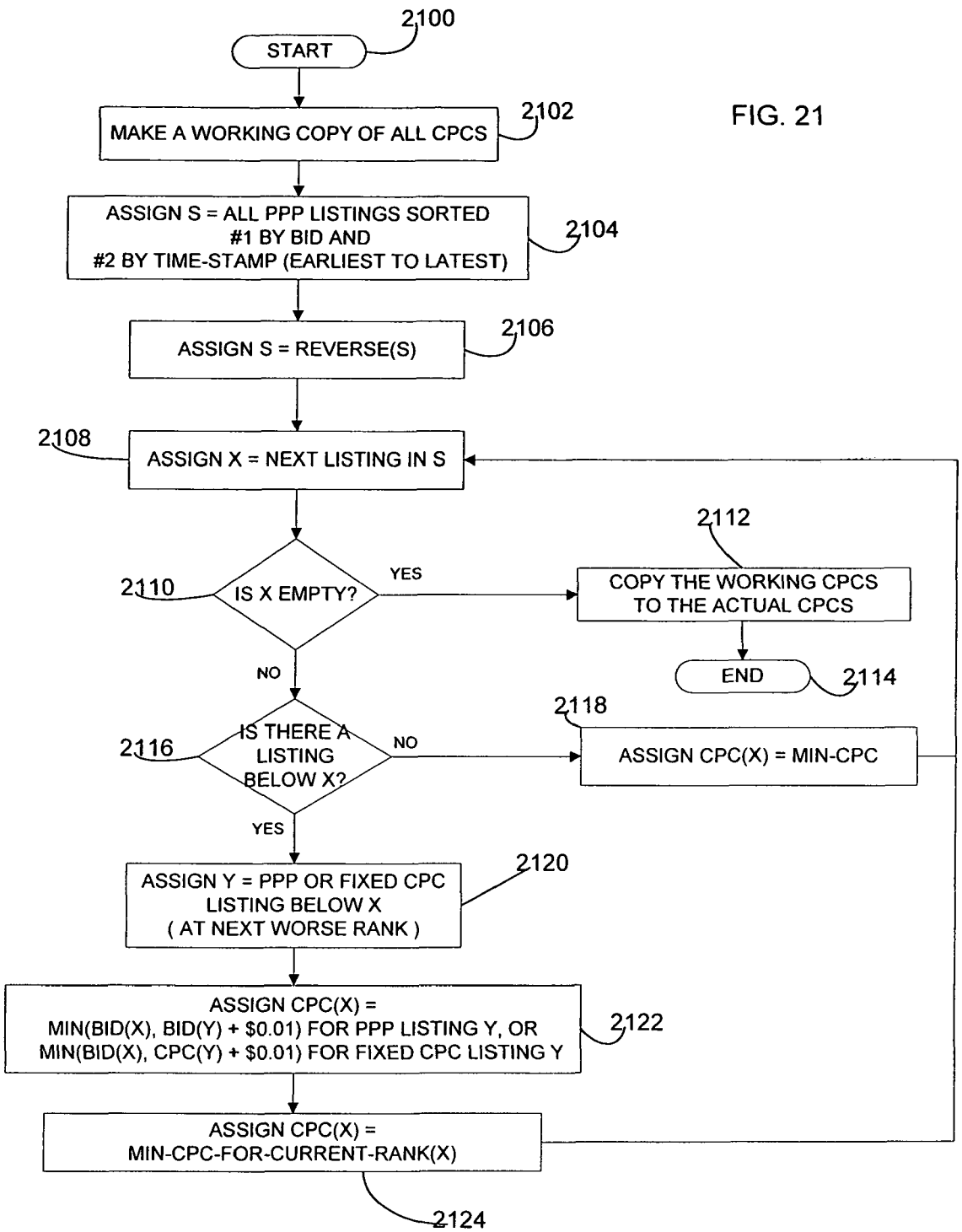

The procedure of FIG. 21 may be embodied in accordance with the pseudocode below.

```
Procedure Recompute-CPCs-Fixed-Point-Price-Protection(term)
Make a working copy of all CPCs;
Assign S to the list of PPP listings for term sorted #1 by bid and #2
    by time-stamp (earliest to latest);
Loop x over all elements in S, in reverse order
    L1: If there is no listing below x (at next worse rank)
        Assign CPC(x) = min-CPC;
    Else
        Assign y to PPP or fixed CPC listing below x (at next
            worse rank);
        Assign CPC(x) =
            min(BID(x),bid(y) + $0.01) if PPP y, or
            min(bid(x),CPC(y) + $0.01) if fixed CPC y;
        Assign CPC(x) = min-CPC-for-Current-Rank(x);
    End If;
End Loop;
Copy the working CPCs to the actual CPCs;
End Procedure;
```

Simultaneous Price Protection does not suffer from any of the problems mentioned earlier for Simultaneous Price & Place Protection:

1. some ranks do not have any advertiser bids, and
2. higher ranks do not have higher bids.

This is because all bids have any implicit rank of 1. A bid, say of $1.00 for rank 1, means that the system should try to get the advertiser to rank 1 with a maximum CPC of $1.00. If rank 1 is not achievable with the $1.00 limit, the system should try to get the advertiser to rank 2 with a maximum CPC of $1.00 (and so on). Therefore, eventually all ranks will be covered, if all bids have an implicit desired rank of 1. It is also not possible for higher ranks to have lower bids, since all bids are for rank 1.

Simultaneous Place Protection

In a fourth embodiment, some advertisers can omit a bid, indicating that there is no CPC limit, and that they want the system to set their CPC to be whatever amount is necessary to be at a given rank. At most one listing is permitted per desired rank with an unlimited CPC (e.g., the first one to request this mode). Other listings may have a fixed CPC, or they may have a bid with a desired rank, or they may only have a bid (with an implicit desired rank of 1).

For all listings without CPC limits, the present embodiments assign them an effective bid that is higher than all other fixed CPCs and the maximum CPCs of all other listings with a bid. The assigned bids for better ranks are higher than the assigned effective bids for worse ranks. These assigned effective bids are only recomputed when an advertiser manually changes a fixed CPC, or an advertiser enters a new Price & Place Protection listing or changes the bid of an existing Price & Place Protection listing. The algorithm of the third embodiment can be used to actually assign the optimal CPC's for all the listings.

Figure 22:
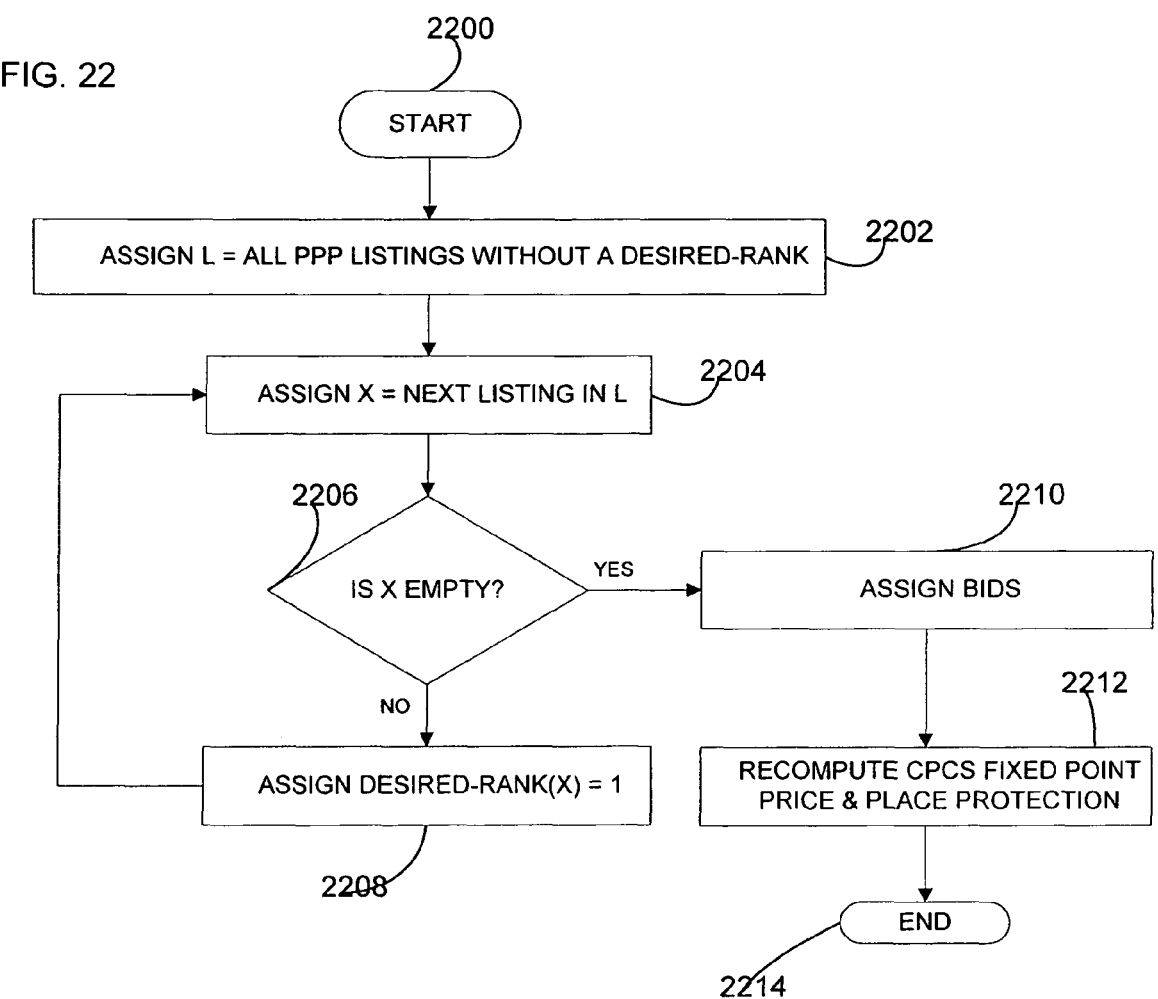

FIG. 22 is a flow diagram illustrating one embodiment of a procedure recompute-CPCs-fixed-point-place-protection. The procedure begins at block 2200. At block 2202, a list L is set to include all Price and Place Protection listings that do not have a desired rank specified by the advertiser. At block 2204, a listing x is selected from the list L for processing.

In block 2206, it is determined if x is empty. If not, at block 2208 the desired rank for the listing x is set to rank 1 and control then returns to block 2204 to process the next listing in set L. If listing x is empty, the end of the list L has been reached. At block 2210, a procedure assign-bids is called, for example as described below in conjunction with FIG. 23. After the assign-bids procedure is executed, at block 2212 a procedure recompute-CPCs-Fixed-Point-Price-&-Place-Protection is executed. FIG. 24 and the associated description below illustrate one embodiment of this procedure. The procedure ends at block 2214.

The procedure of FIG. 22 may be embodied in accordance with the pseudocode below.

```
Procedure Recompute-CPCs-Fixed-Point-Place Protection (term);
Assign the desired-rank of all listings w/o desired-rank to 1;
Assign-Bids (term);
Recompute-CPCs-Fixed-Point-Price-&-Place-Protection (term);
End Procedure;
```

Figure 23:
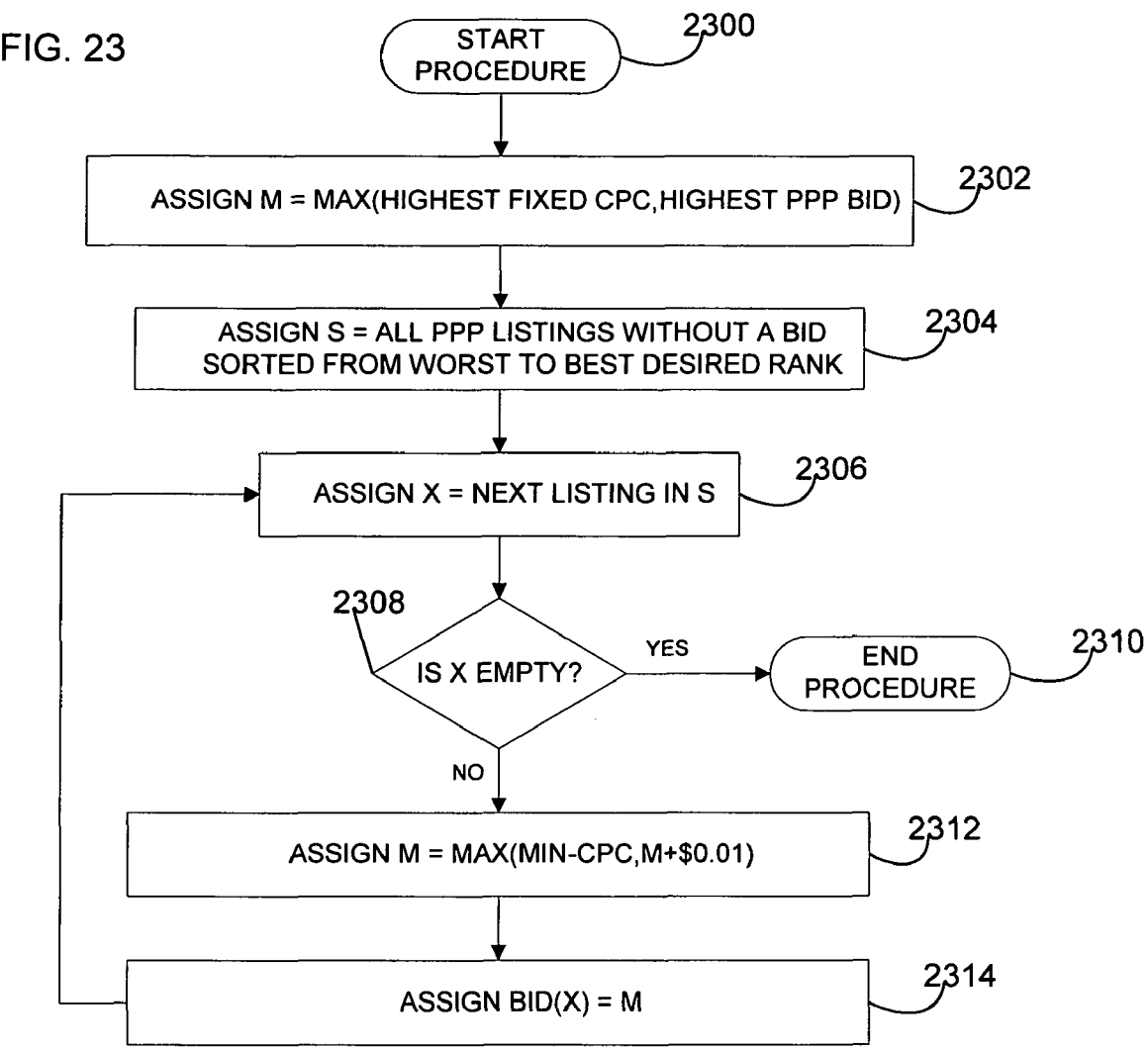
Figure 24:
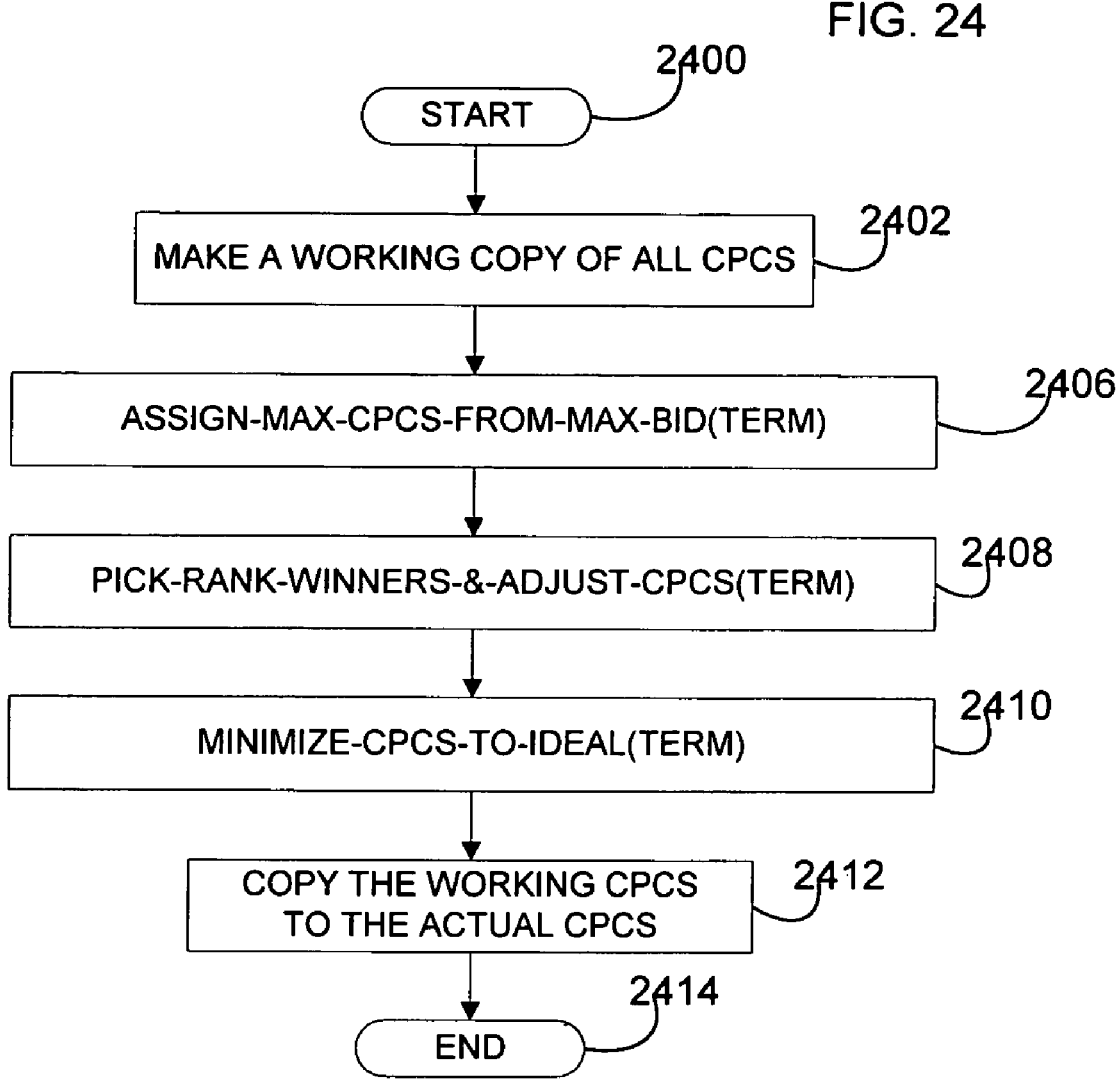

FIG. 23 is a flow diagram illustrating one embodiment of a procedure assign-bids. This procedure assigns effective bids for listings for which the advertiser has not specified a bid. The procedure begins at block 2300.

At block 2302, a variable M is initialized to the maximum value of the fixed CPC values and the highest Price and Place Protection bid or maximum CPC. At block 2304, the set S is assigned to be all Price and Place Protection listings which do not have a bid, sorted by desired rank from worst to best rank. At block 2306, a next listing x is selected from the list S.

At block 2308, it is determined if the end of the list has been reached by testing if the listing x is empty. If so, the procedure ends at block 2310. If not, the variable M is set to be the larger of the minimum GPO value, or the current value of M plus the minimum GPO value to overtake a listing, $0.01, block 2312. At block 2314, the bid or maximum cost per click for the listing x is set to the value of M. Control then returns to block 2306 to select a next value of x for processing.

The procedure of FIG. 23 may be embodied in accordance with the pseudocode below.

```
Procedure Assign-Bids(term);
Assign M = max(the highest fixed CPC, highest PPP bid) for term;
Assign S to the list of listings w/o bids sorted inversely by the
    desired rank (worst to best desired rank);
```

```
For all listings <listing,desired-rank,No-Limit> in S
    Assign M=max(min-CPC,M+$0.01);
    Assign bid of current listing to M (i.e., we now have
        <listing,desired-rank,M>);
End For;
End Procedure;
```

Simultaneous Place Protection can suffer from the problems mentioned earlier for Simultaneous Price & Place Protection:

1. some ranks do not have any advertiser bids, and
2. higher ranks do not have higher bids.

The same solutions mentioned earlier apply here.

Simultaneous Plural Price & Place Protection

In a fifth embodiment, an advertiser can specify a collection of specific bid/rank combinations, in addition to a default bid/rank. The bid of the default bid/rank must be less than all other bids. For a non-default bid/rank, the advertiser is specifying the maximum CPC for that exact rank is bid. For the default bid/rank, the advertiser is specifying the maximum CPC for the default rank, and all worse ranks, is bid.

This is a variation of the embodiment described as Price & Place Protection where an advertiser can specify a sequence of bid/rank combinations. For example, an advertiser can state: "I bid $2.50 for rank 1, $1.95 for rank 3, $0.90, for rank 4, and $0.80 for ranks below 4." The following is one embodiment of implementing this variation.

FIG. 24 is a flow diagram illustrating one embodiment of a procedure Recompute-CPCs-Fixed-Point-Plural-Price-and-Place-Protection. This procedure computes the ideal CPCs for all listings, taking into account each listing's sequence of bid/rank specifications. The various bid/rank specifications are sorted by bid, and the last bid/rank is the default bid for rank and all ranks worse than rank. For each search term, this procedure only needs to be executed when an advertiser manually changes a fixed CPC, or when an advertiser enters a new Price & Place Protection listing or changes the bid of an existing Price & Place Protection listing, or when an advertiser enters a new Plural Price & Place Protection listing or changes the bid of an existing Plural Price & Place Protection listing.

The procedure temporarily sets the CPCs of all listings with Plural Price & Place Protection (PPPP) to the maximum bid and sets the desired rank to the rank associated with the maximum bid, and then reduces these CPCs to try to set each listing to its ideal rank, starting with the lowest desired rank, and working up to the highest desired rank. The procedure starts at block 2400.

At block 2402, a working copy of all CPC data is made to prevent the currently in-use data from being affected by processing of the procedure. At block 2406, a procedure Assign-Max-CPCs-From-Max-Bid is called. One embodiment of this procedure is described below in conjunction with FIG. 25. At block 2408, a procedure Pick-Rank-Winners-&-Adjust-CPCs is called. One embodiment of this procedure is described below in conjunction with FIG. 26. At block 2410, a procedure Minimize-CPCs-to-Ideal is called. One embodiment of this procedure is described above in conjunction with FIG. 20. At block 2412, the working copy of the CPCs is copied back to the data used by the system. The procedure ends at block 2414.

The procedure of FIG. 24 may be embodied in accordance with the pseudocode below.

```
Procedure Recompute-CPCs-Fixed-Point-Plural-Price-&-Place-
    Protection (term)
    Make a working copy of all CPCs;
    Assign-Max-CPCs-from-Max-Bid (term);
    Pick-Rank-Winners-&-Adjust-CPCs (term);
    Minimize-CPCs-to-Ideal (term);
    Copy the working CPCs to the actual CPCs;
End Procedure;
```

Figure 25:
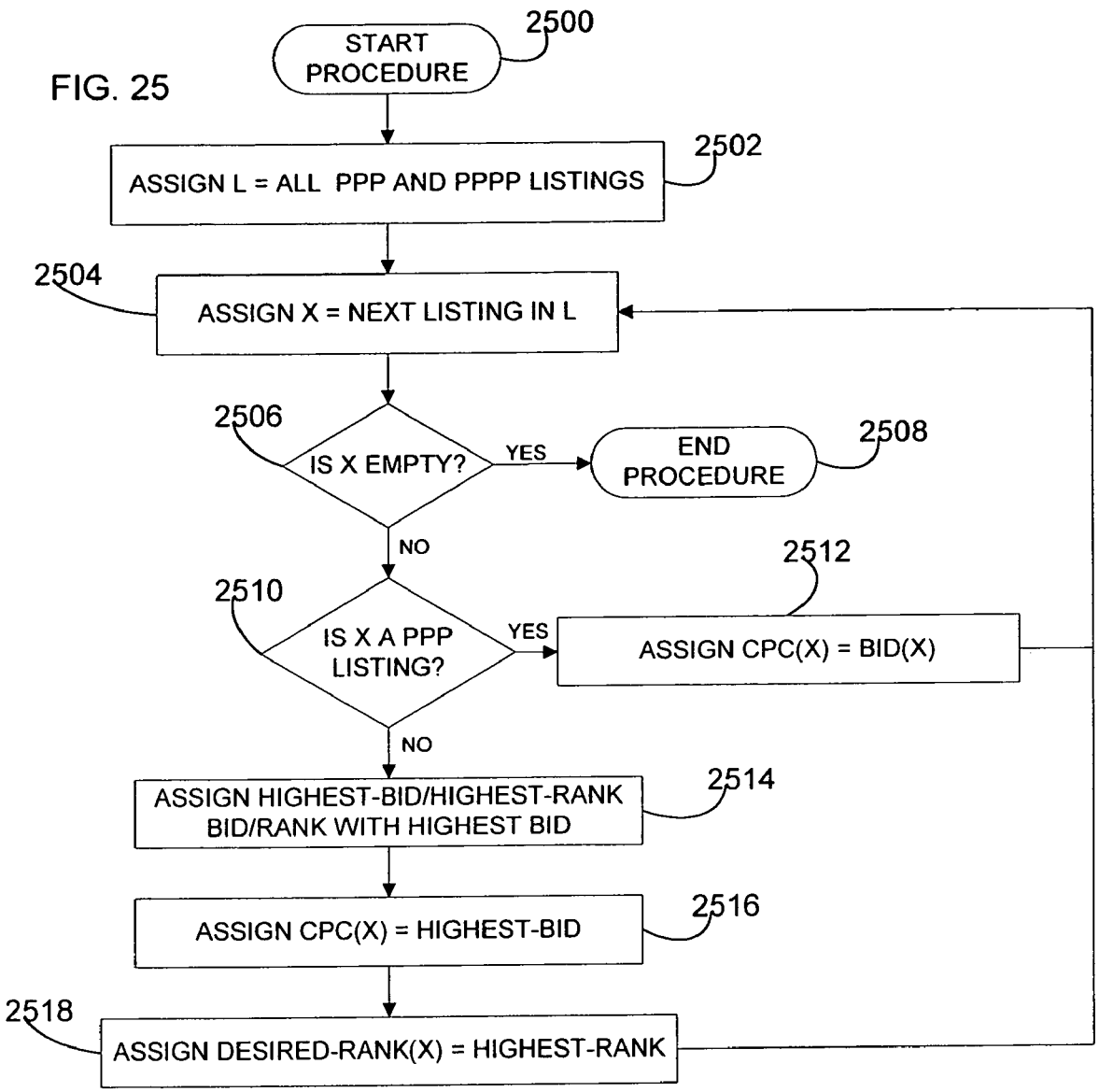

FIG. 25 is a flow diagram illustrating one embodiment of a procedure Assign-Max-CPCs-from-Max-Bid. This procedure in the embodiment of FIG. 25 is the same as the previous procedure Assign-Max-CPCs, except that for a PPPP listing, the CPC is set to the bid and the desired rank is set to rank, where bid/rank is the bid/rank pair with the highest bid. The procedure begins at block 2500.

At block 2502, a list L is stored with all Price and Place Protection (PPP) search listings and all Plural Price and Place Protection (PPPP) search listings. A loop begins at block 2504, where the variable x is initialized to a listing in the list L. At block 2506, x is tested. If x is empty, indicating the end of the list has been reached, at block 2508 the procedure ends.

If x is not empty, at block 2510, it is determined if x is a PPP listing. If so at block 2512, the cost per click for x is assigned to the bid of the listing x, also referred to as the maximum cost per click of the search listing x. If x is not a PPP listing, at block 2514, the values of the highest bid and highest rank are assigned to a variables highest-bid and highest-rank. At block 2516, the cost per click for listing x is assigned with the highest bid. At block 2518, the highest rank is stored as the desired rank of listing x. Control returns to block 2504 to select the next listing for processing.

The procedure of FIG. 25 may be embodied in accordance with the pseudocode below.

```
Procedure Assign-Max-CPCs-from-Max-Bid(term)
Loop x over all PPP and PPPP listings for term
    If x is a PPP listing
        Assign CPC(X) = bid(x);
    Else
        Assign highest-bid/highest-rank = the bid/rank pair with
            highest bid;
        Assign CPC(x) = highest-bid;
        Assign desired-rank(x) = highest-rank;
    End If;
End Loop;
End Procedure;
```

Figure 26:
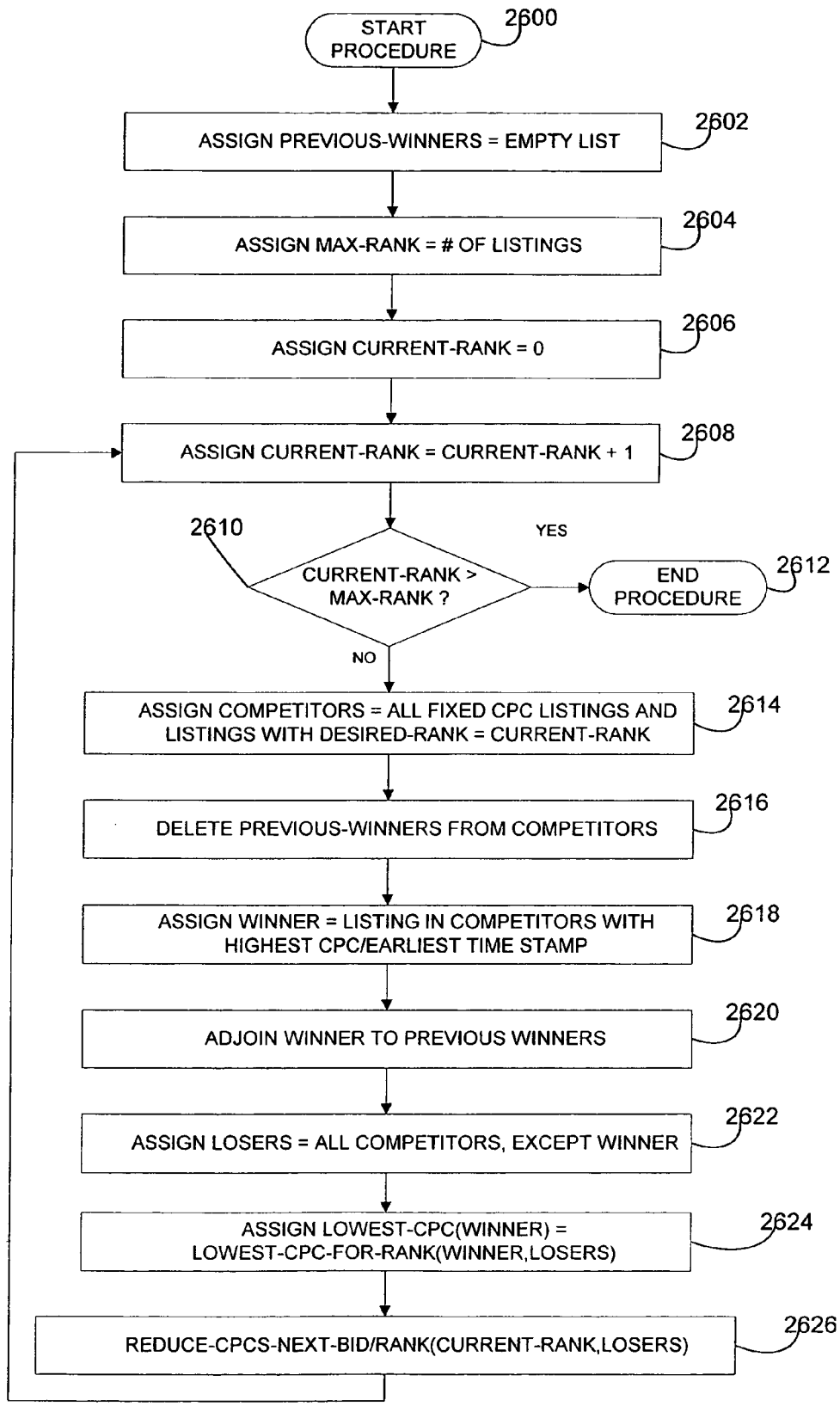

FIG. 26 is a flow diagram illustrating one embodiment of a procedure Pick-Rank-Winners-&-Adjust-CPCs. This procedure picks the winners at each rank. The winning listing for a rank has the highest bid for that rank. Listings that lose the competition for the current rank, and also have a lower bid/rank, have their CPCs reduced to bid and their desired rank increased to rank. This enables them to compete again at the lower rank. The procedure begins at block 2600.

At block 2602, a variable Previous-Winners is initialized to be an empty list. At block 2604, a variable Max-Rank is initialized with the number of search listings being processed. At block 2606, a variable Current-Rank is initialized to 0. The value of Current-Rank is incremented at block 2608 to start a loop for processing the listings.

At block 2610, the value of Current-Rank is compared with the value of Max-Rank. If all listings have been processed, the procedure ends at block 2612. Otherwise, at block 2614, a variable Competitors is set to include all listings having fixed cost per click or listings whose desired rank matches the value of Current-Rank. At block 2616, the contents of Previous-Winners are eliminated from the set of Competitors. At block 2618, a winner is selected as the search listing having the highest CPC and, if necessary to resolve a tie in the value of the CPC, the earliest timestamp. Other criteria may be substituted. At block 2620, the search listing selected as the winner in block 2618 is added to the list of Previous-Winners. The set of Losers is then established as the contents of the list Competitors, minus the search listing selected as the winner, block 2622.

Figure 27:
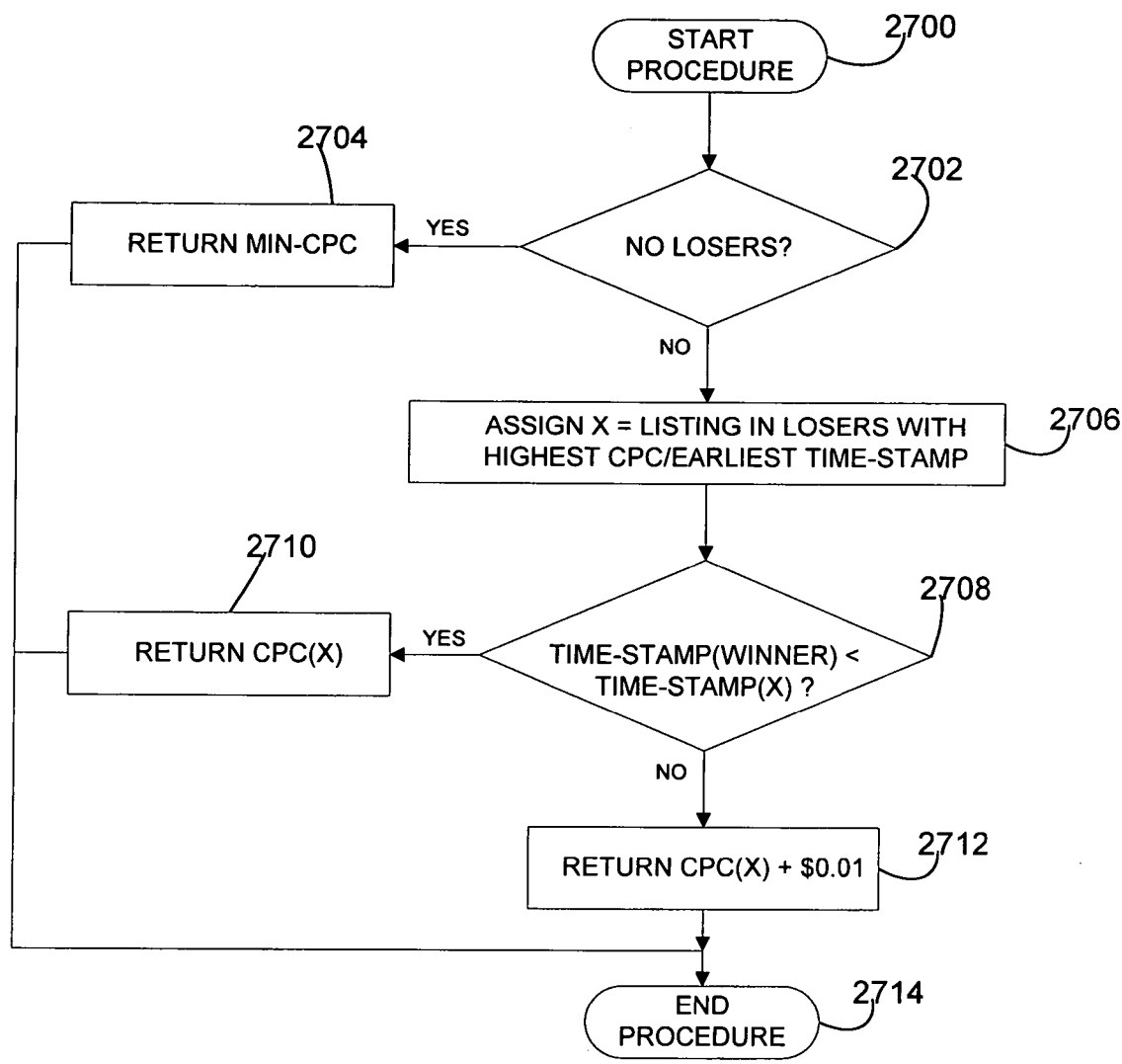

At block 2624, value of the lowest cost per click for the winner is set to the result of a procedure Lowest-CPC-For-Rank. One embodiment of this procedure is illustrated in FIG. 27. At block 2626, a procedure Reduce-CPCs-Next-Bid/Rank is called. One embodiment of this procedure will be described below in conjunction with FIG. 26. Control returns to block 2608 for processing of a next rank.

The procedure of FIG. 26 may be embodied in accordance with the pseudocode below.

```
Procedure Pick-Rank-Winners-&-Adjust-CPCs(term)
    Assign previous-winners = empty list;
    Assign max-rank = # of listings;
    Assign current-rank = 0;
    Loop
        Assign current-rank = current-rank + 1;
        If current-rank > max-rank
            Exit Loop;
        Else
            Assign competitors = all fixed CPC listings and
                listings with desired-rank = current-rank;
            Delete previous-winners from competitors;
            Assign winner = listing in competitors with highest
                CPC/earliest time stamp;
            Adjoin winner to previous-winners;
            Assign losers = all competitors, except winner;
            Assign lowest-CPC(winner) =
                Lowest-CPC-for-Rank(winner,losers);
            Reduce-CPCs-Next-Bid/Rank(current-rank,losers);
        End If;
    End Loop;
    End Procedure;
```

FIG. 27 is a flow diagram illustrating one embodiment of a procedure Lowest-CPC-For-Rank. This procedure reduces the CPC of a listing that was the winner in the competition for the current-rank to a value which just exceeds the highest CPC losers. It sets the winner's CPC to the minimum value required to be placed above the losers.

The procedure starts at block 2700. At block 2702, it is determined if there are losers from the competition for the current rank. If there are no losers, at block 2704 the cost per click for the winner is returned as the minimum cost per click. Otherwise, at block 2706, the variable x is set to the listing in the set of losers having the highest cost per click and earliest time stamp.

At block 2708, it is determined if the time stamp of the winner search listing is earlier than the time stamp of the listing referenced by the variable x. If so, at clock 2710, the cost per click for the listing associated with the variable x is returned as the cost per click for the winner. Otherwise at block 2712, the cost per click for the listing associated with the variable x plus the minimum cost per click amount is returned as the cost per click for the winner. The procedure ends at block 2714.

The procedure of FIG. 27 may be embodied in accordance with the pseudocode below.

```
Procedure Lowest-CPC-for-Rank(winner,losers)
    If no losers
        Return Min-CPC;
    Else
        Assign x = listing in losers with highest CPC/earliest
        time-stamp;
        If time-stamp(winner) < time-stamp(x)
            Return CPC(x);
        Else
            Return CPC(x) + $0.01;
        End If;
    End If;
End Procedure;
```

Figure 28:
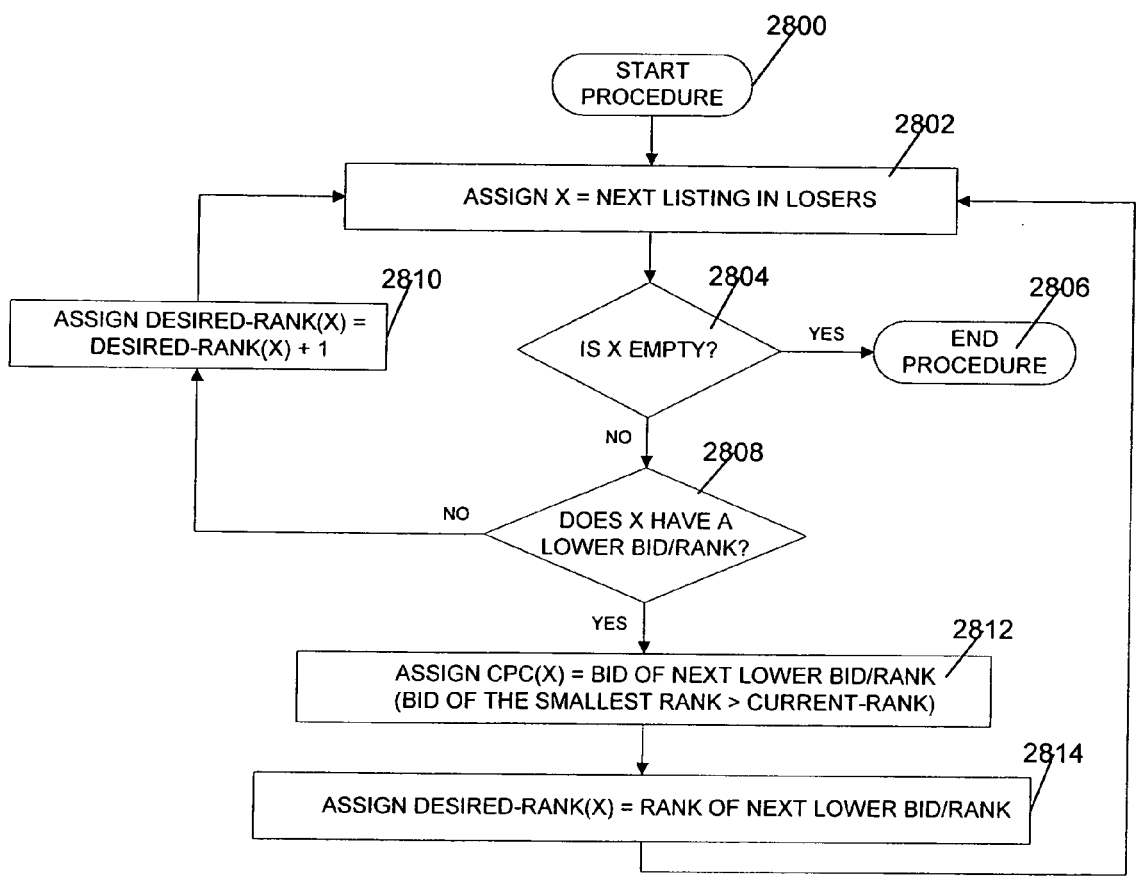

FIG. 28 is a flow diagram illustrating one embodiment of a procedure Reduce-CPCs-Next-Bid/Rank (Current-rank, Loser). This procedure reduces the CPC of listings that were losers in the competition for the current-rank. The losers have their CPC set to the bid of the next lower bid/rank if there is one. There is no lower bid/rank for fixed CPC listings. In addition, there is no lower bid/rank for a PPPP listing if CPC is set to the bid of the default bid/rank. In this case, CPC is left unchanged, since the advertiser has this default bid for the current rank and all ranks worse than the current rank, however, the desired rank is incremented by 1. The procedure begins at block 2800.

At block 2802, a variable x is set to an element of the list Losers. At block 2804, it is determined if x is empty in order to determine if the end of the list Losers has been reached. If so, the procedure ends at block 2806. Otherwise, at block 2808, it is determined if the listing stored in x has a lower bid/rank. If not, at block 2810 the desired rank of the listing in x is incremented by 1 and control returns to block 2802 to select the next search listing in the Losers list.

If at block 2808, x did have a lower bid/rank, at block 2812 the cost per click of the list stored in x is set to the bid of the next lower bid/rank. At block 2814, the desired rank of the search listing in x is set to the rank of the next lower bid/rank and control returns to block 2802 for processing a next search listing.

The procedure of FIG. 28 may be embodied in accordance with the pseudocode below.

```
Procedure Reduce-CPCs-Next-Bid/Rank(current-rank,losers)
Loop x over all losers
    If lower bid/rank for x
        Assign CPC(x) = bid of next lower bid/rank
        (bid of the smallest rank greater than current-rank);
        Assign desired-rank(x) = rank of next lower bid/rank;
    Else
        Assign desired-rank(x) = desired-rank(x) + 1;
    End If;
End Loop;
End Procedure;
```

The procedure Minimize-CPCs-to-Ideal was presented earlier, and its definition is the same, except that:
1. we replace min(CPC (x) bid(y)) with min(CPC(x),max (lowest-CPC-for-Rank(x),bid(y))), and similarly for the three other places with the function min, and
2. we have a slightly different definition of competitive listings. The new definition extends the previous to take into account multiple bid/rank specifications for PPPP listings, and the slightly different meaning of non-default bid/rank specifications.

Every Plural Price and Place Protection listing has exactly one default bid/rank specification and zero or more non-default bid/rank specifications. A non-default bid/rank means that the advertiser is willing have maximum CPC of bid for this rank only. The default bid/rank means that the advertiser is willing to have maximum CPC of bid for rank and all ranks worse than rank. A PPP listing with bid/rank is equivalent to a PPPP listing with only a default bid/rank. A fixed CPC listing has an implicit desired rank of 1.

Although a PPPP listing can have multiple bid/rank specifications, there is a single desired rank selected for every listing before the procedure Minimize-CPCs-to-Ideal is called. A listing $L_1$ with desired rank $R_1$ and current rank $C_1$ is competitive with another listing directly below it $L_2$ with desired rank $R_2$ and current rank $C_2=C_1+1$, written as competitive($L_1/R_1,L_2/R_2,C_1$). There are four cases.
1. $R_1$ and $R_2$ are both default desired ranks (each bid is valid for the desired rank and all ranks worse than the desired rank): competitive($L_1/R_1,L_2/R_2,C_1$) if $C_1=R_1$ & $C_2>R_2$
2. $R_1$ is a default desired rank and $R_2$ is a non-default desired rank (its bid is valid only for rank $R_2$): competitive($L_1/R_1,L_2/R_2,C_1$) if $C_1=R_1$ & $C_1=R_2$
3. $R_1$ is a non-default desired rank and $R_1$ is a default desired rank: competitive($L_1/R_1,L_2/R_2,C_1$) if $C_1=R_1$ & $C_2>R_2$
4. $R_1$ and $R_2$ are both non-default desired ranks: competitive($L_1/R_1,L_2/R_2,C_1$) if $C_1=R_1$ & $C_1=R_2$ If competitive($L_1/R_1,L_2/R_2,C_1$), then $L_1$ is at its desired rank, or a rank worse than its desired rank, and $L_2$ wishes to unseat $L_1$ from its current rank. If $L_1$ is competitive with $L_2$, then we cannot reduce the CPC of $L_1$ below the bid of $L_2$.

Simultaneous Plural Price & Place Protection can suffer from the problematic examples mentioned earlier for Simultaneous Price & Place Protection:
1. some ranks do not have any advertiser bids, and
2. higher ranks do not have higher bids.

The same solutions mentioned earlier apply here. In addition, there is a fourth possible solution:
1. Every PPPP listing is required to have a bid for all ranks better than its default bid/rank (no holes are allowed), and
2. The bids are required to increase monotonically for better ranks.

With these two conditions, we still give advertisers fine-grained control by permitting different bids for different ranks, but we have the advantage of eliminating all pathological problems. In this case, we can also simplify the procedure to PPPP-Restricted.

Figure 29:
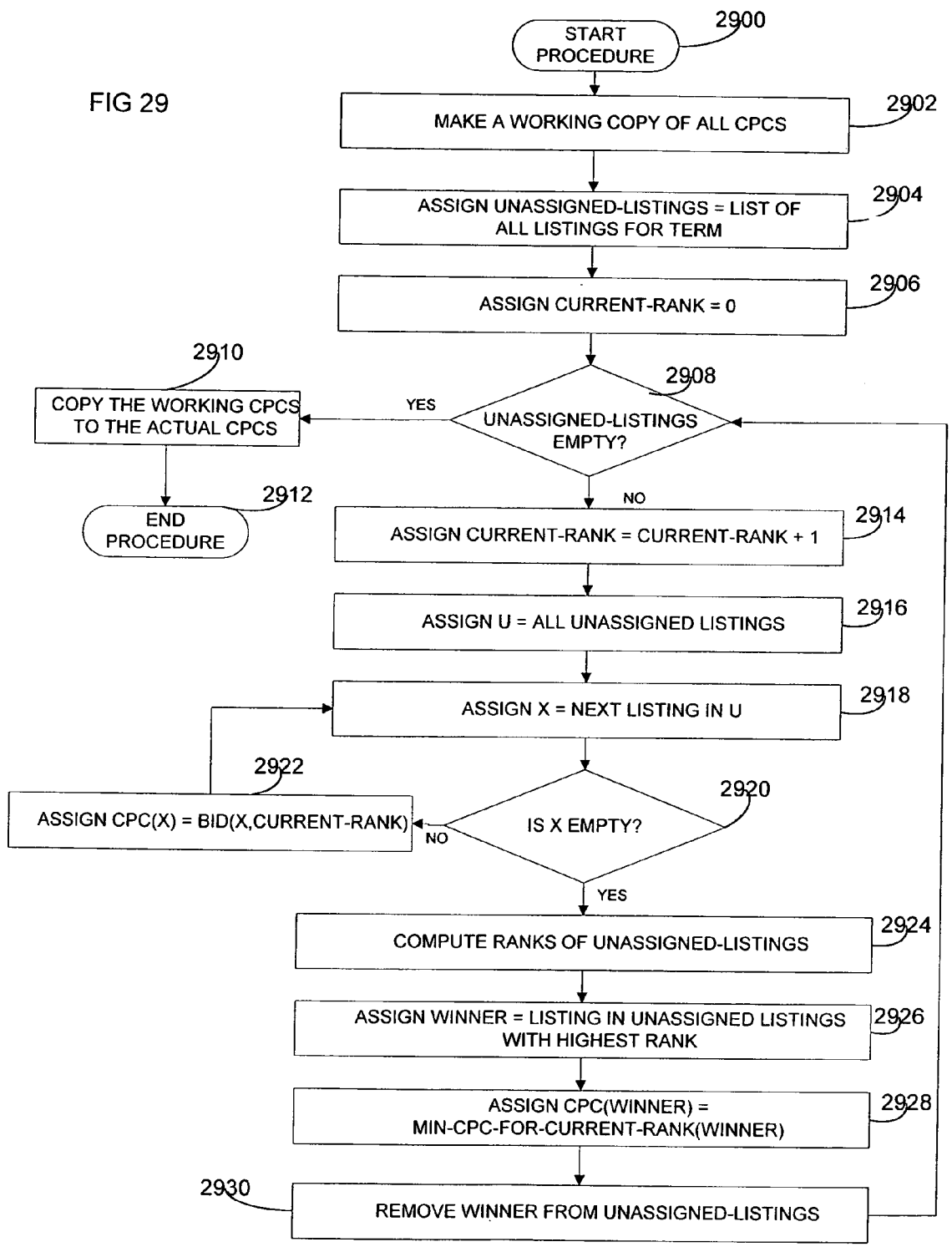

FIG. 29 is a flow diagram illustrating one embodiment of procedure PPPP-Restricted. The procedure begins at block 2900. At block 2902, a working copy of the cost per click data is stored for access. At block 2904, a variable unassigned-listings is stored with a list of all search listings associated with a search term. At block 2906, the variable current-rank is initialized to 0.

At block 2908, it is determined if the variable unassigned-listings is empty. If so, at block 2910, the working copy of the cost per click data is copied to the actual copy for use by the system and the method ends at block 2912. If the variable is not empty, at block 2914 the variable current-rank is incremented by 1. At block 2916, the variable U is set to store all unassigned search listings. At block 2918, the variable x is incremented to the next listing in the variable U. At block 2920, x is tested to determine if it is empty. If not, the cost per click for search listing x is set to the bid or maximum cost per click of search listing x for the current rank, block 2922, and control returns to block 2918.

If x is empty, at block 2924 the ranks of the unassigned listings are computed from the CPCs set at block 2922. The winner is chosen at block 2926 as the listing in the set of unassigned listings having the highest rank. At block 2928, the cost per click for the winner chosen in block 2926 is set to the value returned by procedure Min-CPC-For-Current-Rank, which may be implemented as described above in connection with FIG. 14. At block 2930, the winner is removed from the unassigned listings and control returns to block 2908.

The procedure of FIG. 29 may be embodied in accordance with the pseudocode below.

```
Procedure PPPP-Restricted (term)
Make a working copy of all CPCs;
Assign unassigned-listings = list of all listings for term;
Assign current-rank = 0;
Loop
    If unassigned-listings is empty
        Exit Loop;
    End If;
    Assign current-rank = current-rank + 1;
    Loop x over all unassigned-listings
        Assign CPC(x) = bid (x,current-rank);
    End Loop;
    Compute rank for unassigned listings;
    Assign winner = listing in unassigned-listings with highest
       CPC/earliest time-stamp;
    Assign CPC (winner) = Min-CPC-for-Current-Rank (winner);
    Remove winner from unassigned-listings;
End Loop;
Copy the working CPCs to the actual CPCs;
End Procedure;
```

In a variation on this embodiment, both the requirement that bids be non-increasing with increasing rank, and that each listing have a default bid/rank, are removed.

Figure 30:
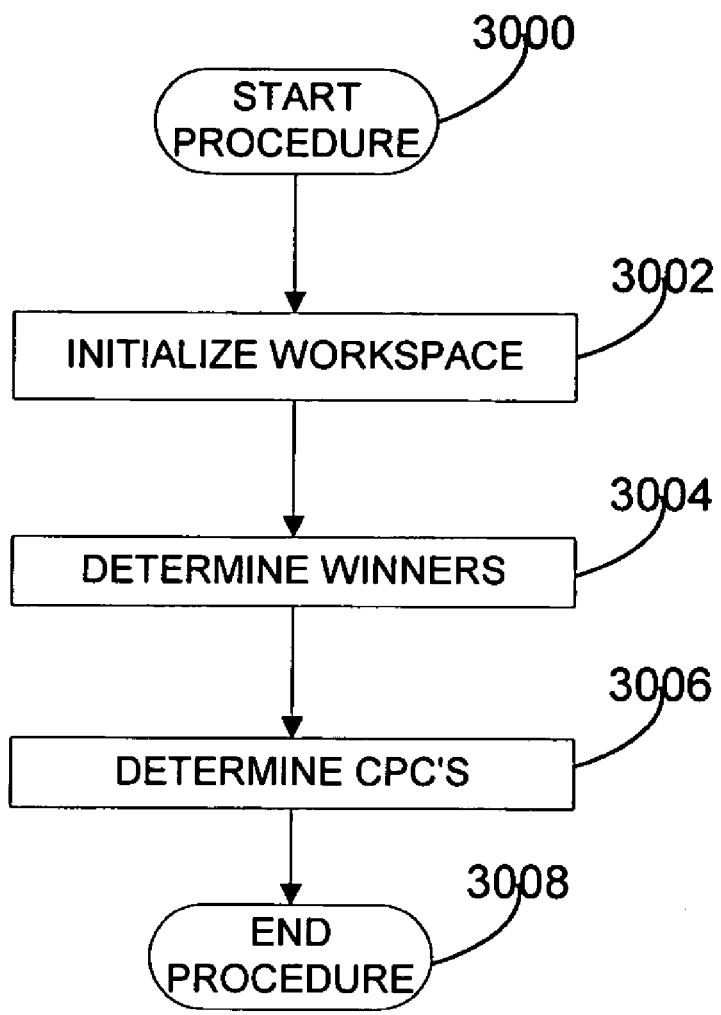

FIG. 30 is a flow diagram illustrating one embodiment of a procedure to determine the listing and corresponding CPC for each rank position to be displayed. FIG. 31 illustrates the workspace employed by this procedure, which may be represented in the working memory of a computer. This workspace consists of a table 3140 having a column 3142, 3144, 3146, 3148, 3150, 3152 for each matching listing, a row 3154 for listing identifiers, a row 3156 to hold the timestamps of listings, and a row 3158, 3160, 3162, 3164, 3166, 3168, 3170, 3172 for each rank position to receive a listing as an output of the procedure. In addition the workspace contains a list 3174 of winning listings by rank, and their corresponding CPC's. The procedure begins at block 3000 of FIG. 30.

At block 3002, the aforementioned workspace is initialized. One means of accomplishing this is by the procedure of FIG. 32, described below. At block 3004, the winning listings are determined for each rank position. One means of accomplishing this is by the procedure of FIG. 35. The CPC's of each winning listing for this result set is determined in block 3006. This can be accomplished by the procedure of FIG. 39. The procedure ends at block 3008.

Figure 32:
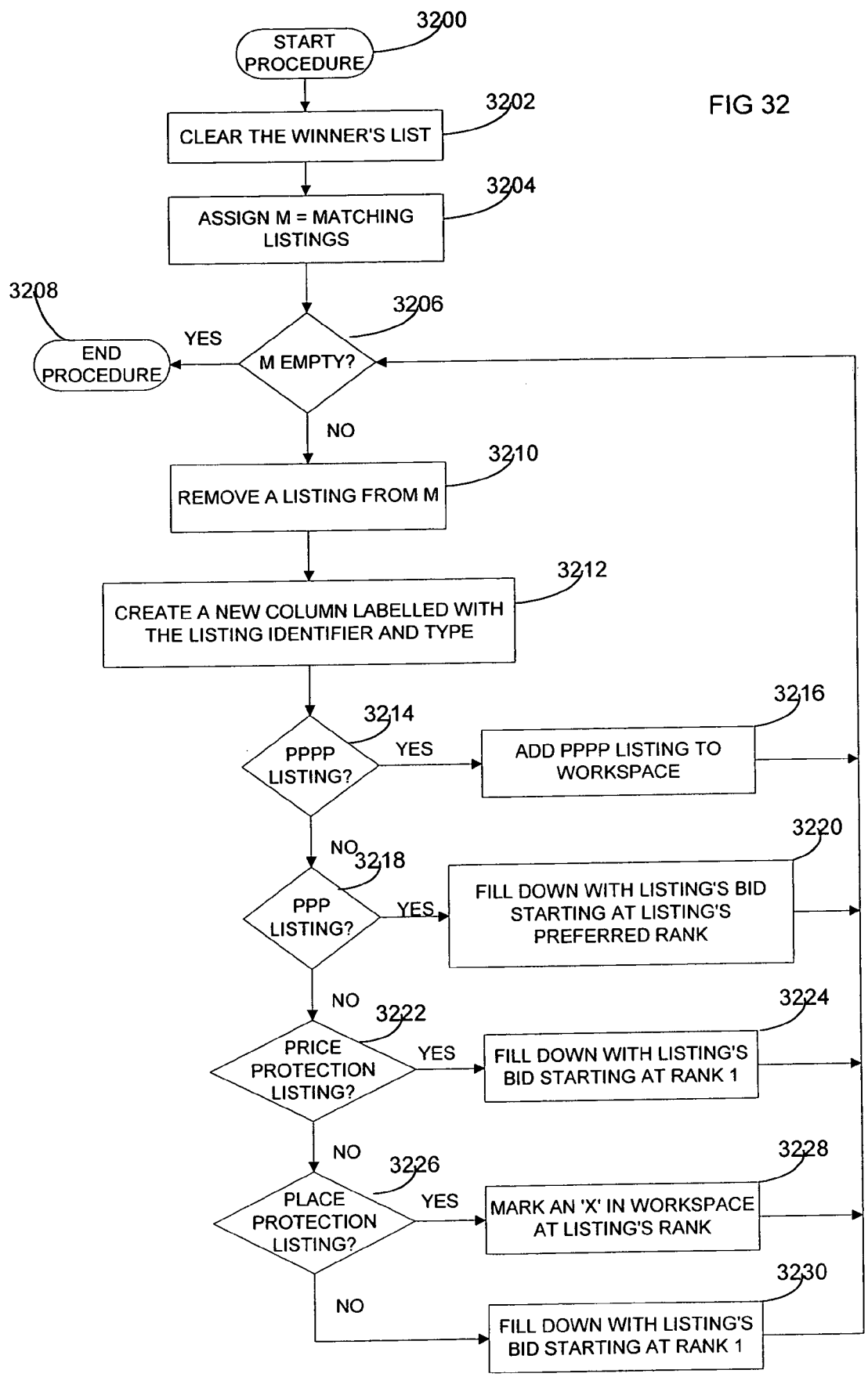

Block 3002 of FIG. 30 utilizes a procedure INITIALIZE WORKSPACE illustrated more fully in FIG. 32. That procedure begins at block 3200. At block 3202 the list of winning listings and their corresponding CPC's is cleared. The set of matching listings, from which the winners' list will be populated, is assigned to the variable M at block 3204. At block 3206, which is at the head of a loop, M is tested for members. If M is found empty, all the matching listings have been considered in initializing the workspace, and control passes to block 3208 where the procedure ends.

If matching listings remain unexamined, control instead passes to block 3210, where a listing is removed from M for examination. Any listing may be selected. A new column in the workspace is created for the selected listing, at block 3212, and labeled with the listing and its type (PPPP, PPP, Fixed CPC, etc.). The next operation depends on the listing type, which discrimination may be accomplished by the series of decision blocks shown.

Control passes from block 3212 to block 3214, where the listing is examined to determine if it is a Plural Price & Place Protection listing. If it is, control passes to the procedure represented by block 3216 and more fully described in FIG. 33. The result of the operation of block 3216 is the entry of the listing's bid, if any, corresponding to each rank in the workspace. Examples are illustrated by listings "Alpha" and "Bravo" in FIG. 31.

Figure 34:
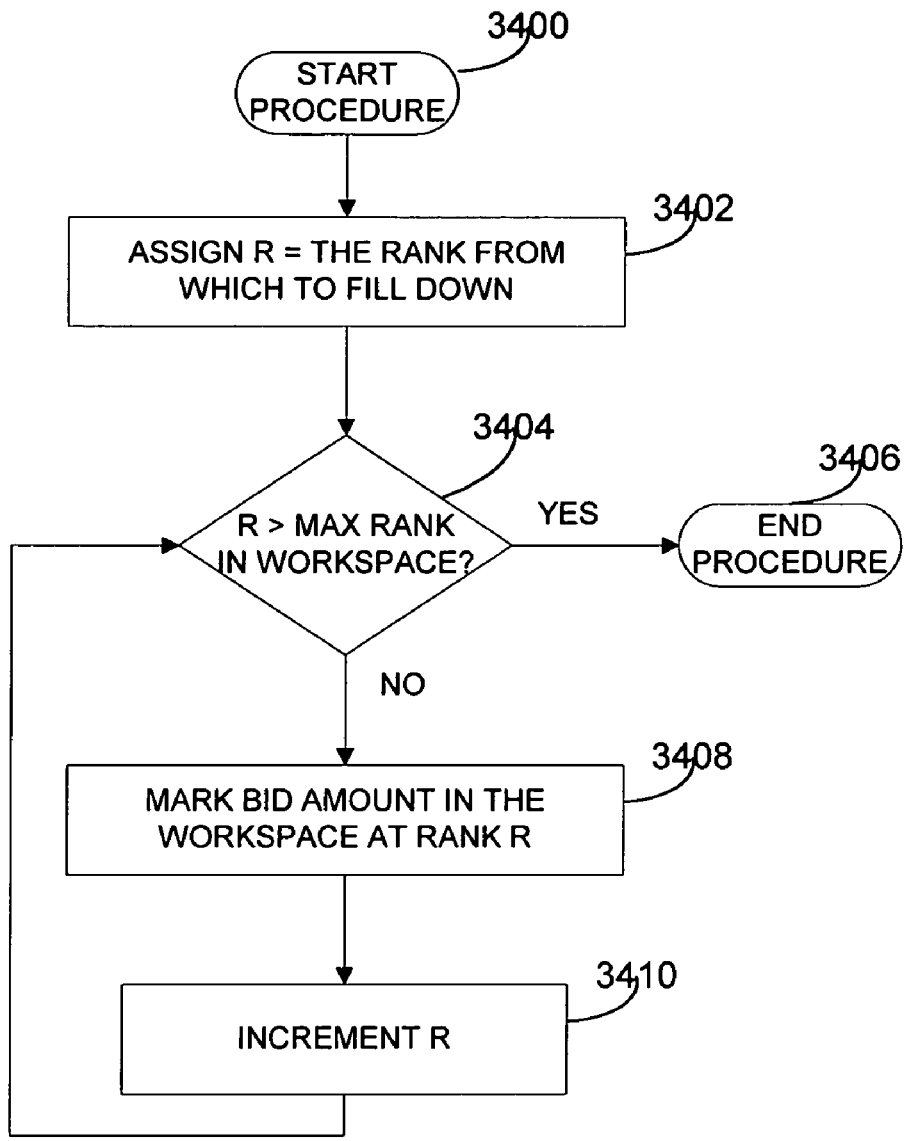

If at block 3214 it is determined that the listing is not a Plural Price & Place Protection listing, control passes to block 3218, where the listing is examined to determine if it is a Price & Place Protection listing. If it is, control passes to block 3220, which fills out the column in the workspace corresponding to the listing, entering the bid value at the listing's preferred rank and every rank below (the numerically higher ranks). This result is illustrated in FIG. 31, where listing "Delta" is a PPP listing with a preferred place of Rank 2. A procedure to accomplish this "fill down" operation is illustrated in FIG. 34.

If the listing is neither a PPPP nor a PPP listing, control passes to block 3222 where a Price Protection listing is recognized as such, in which case control passes to block 3224, which fills out the entire column for the listing with the bid amount. This is illustrated in FIG. 31, where listing "Echo" is a Price Protection listing with a bid of $0.75.

If the listing is neither a PPPP nor a PPP nor a Price Protection listing, control passes to block 3226 where a Place Protection listing is recognized as such, in which case control passes to block 3228, which marks that fact in the listing's column in the workspace, at the rank the listing demands. In the illustrations of FIG. 31 this marking is shown by an "X" in the "Foxtrot" column at Rank 3, the place-protected rank position in the example illustrated. It will be understood by one of ordinary skill in the art of computer programming that this marking may be accomplished in practice by any means recognizable to the subsequent operation of the algorithms concerned with this workspace, for example by recording a bid value of −1 in the position.

If the listing is neither a PPPP nor a PPP nor a Price Protection nor a Place Protection listing, control passes to block 3230, which fills out the entire column for the listing with the bid amount. This path is taken by a Fixed CPC listing, for example, as illustrated by the "Charlie" column of FIG. 31.

At this point in the operation of the procedure, the relevant information has been entered in the workspace for the subject listing. Control next passes back to block 3206 from whichever of blocks 3216, 3220, 3224, 3228 or 3230 was operating, and processing proceeds as described. This loop continues until no more listings in the set of matching listings remain to be considered.

Figure 33:
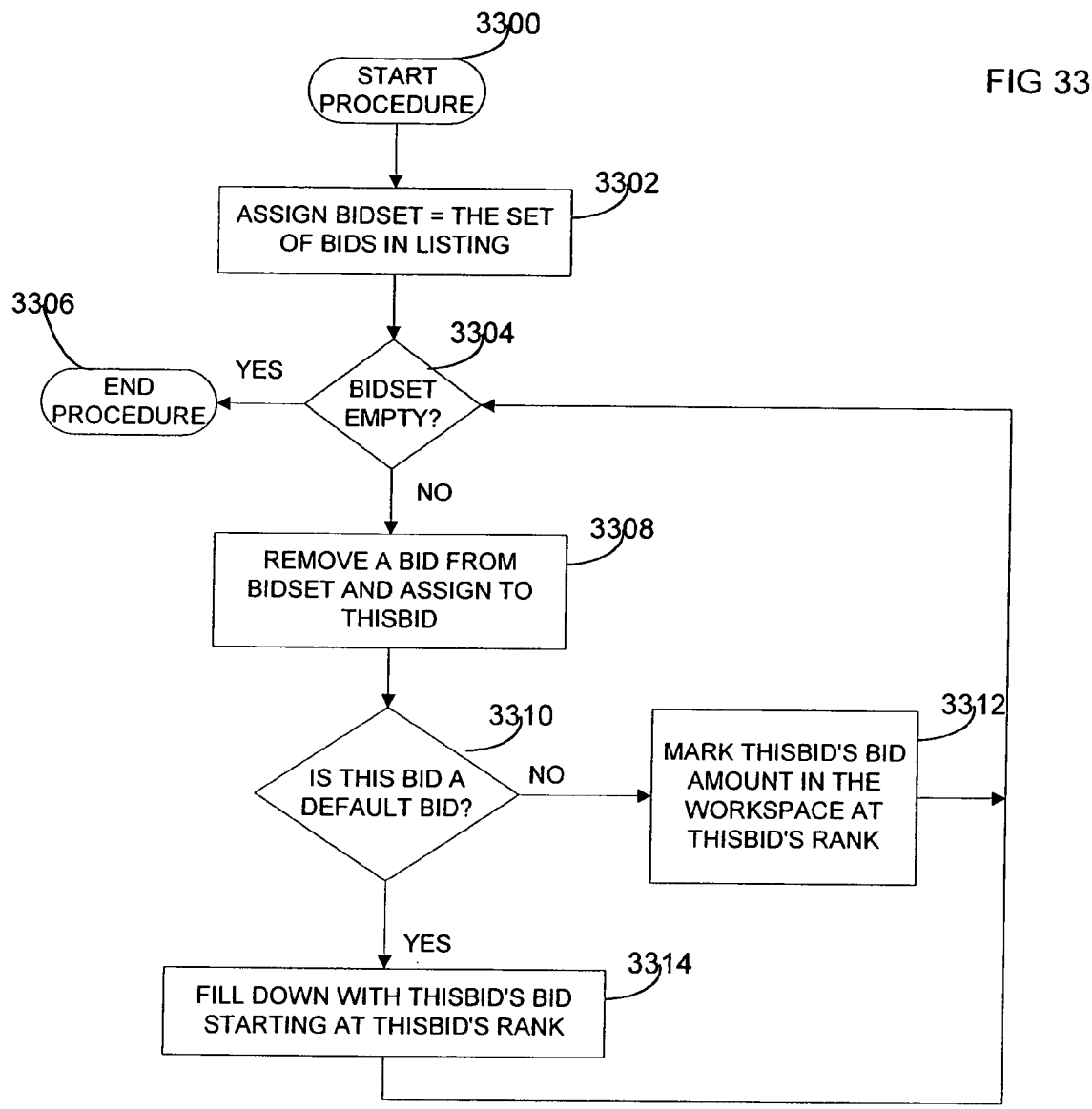

Block 3216, representing the entry of a PPPP listing into the workspace, is more fully illustrated in FIG. 33 and described herewith. The operation of this procedure begins at block 3300. At block 3302 a variable BIDSET is assigned the set of bids in the subject PPPP listing. If BIDSET is empty, as determined at block 3304, control passes to block 3306 and the procedure ends.

If BIDSET is not empty, control instead passes to block 3308, where a bid is removed from BIDSET and assigned to the variable THISBID. That bid is examined at block 3310, from which control passes to block 3312 if it is not a default bid for the listing, and to block 3314 if it is.

At block 3312 the bid amount of THISBID is entered in the workspace at the rank of THISBID, in the column corresponding to the subject listing. If instead control passed to block 3314, the corresponding column is "filled down" with the bid value, starting at THISBID's rank. This operation may be accomplished as illustrated in FIG. 34.

Control then passes from block 3312 or 3314, whichever was selected at block 3310, back to 3304, where the loop proceeds to operate on another bid, or the procedure terminates if no more bids remain to be considered.

The procedure "FILL DOWN WITH BID" is illustrated in FIG. 34, starting at block 3400. At block 3402 a variable R is assigned the starting rank for the fill operation. Block 3404 is a loop test to determine if R has gone beyond the maximum rank in the workspace. If so, the procedure ends at block 3406. Otherwise, R is not beyond the rank limit of the workspace, and control passes to block 3408, where the bid amount is marked in the corresponding rank position in the column. Then at block 3410 the variable R is incremented, and control passes back up to block 3404, where the loop repeats until R exceeds the rank range of the workspace.

Figure 35:
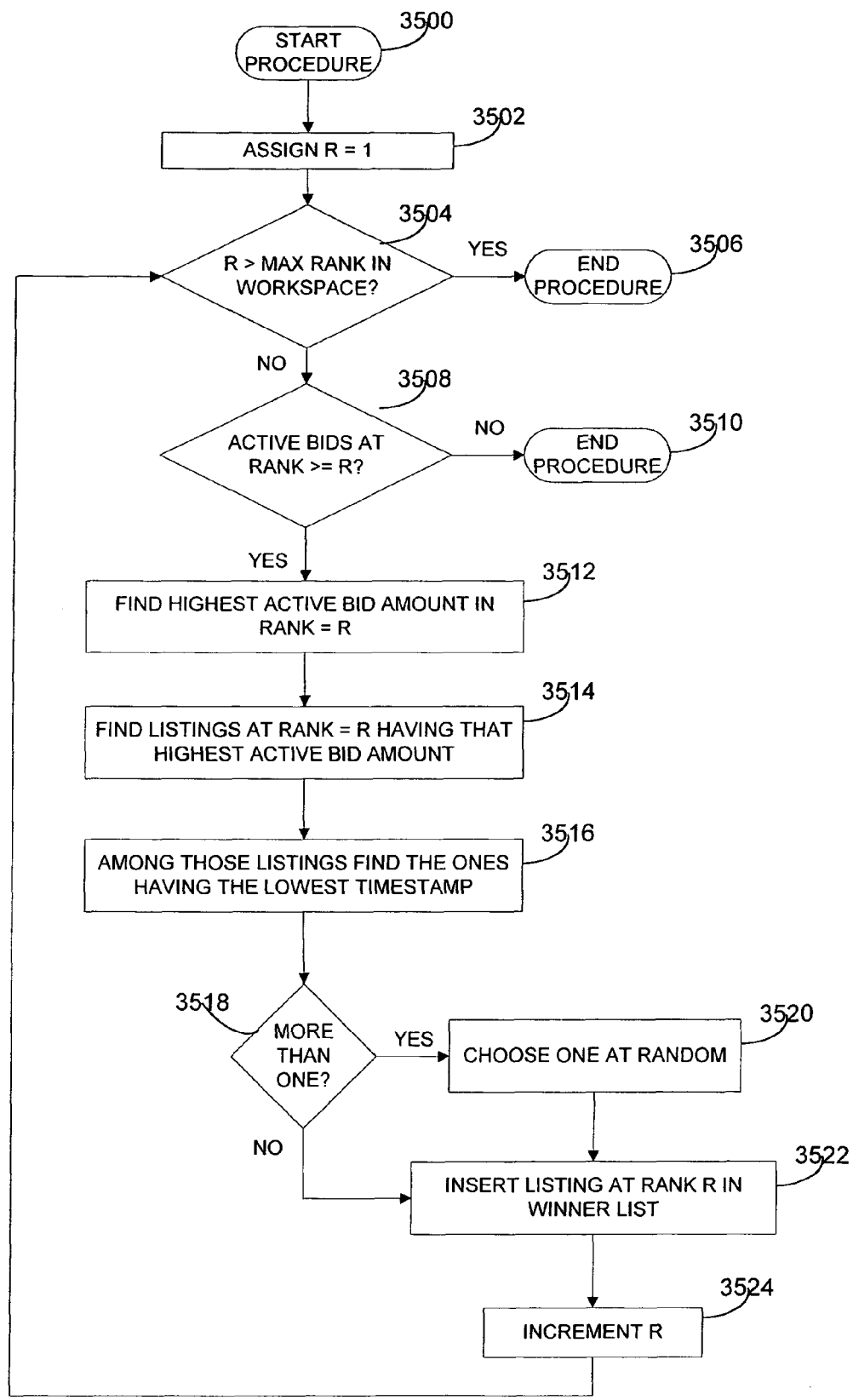

Block 3004 of FIG. 30 performs the operation "DETERMINE WINNERS", which is illustrated in FIG. 35, starting at block 3500. A variable R is initialized to 1 at block 3502. At block 3504 the value of R is compared to the largest rank in the workspace. If R exceeds that largest rank, all the rank winners have been determined and control passes to block 3506, ending the procedure. If R does not exceed the maximum rank in the workspace, control passes to block 3508, where the workspace is examined for active bids at or beneath rank R. If none remain then all the listings that can win a place have already been placed, and control passes to block 3510, which ends the procedure.

If instead there exist active bids at or beneath rank R, control passes to block 3512, where the bids at rank R are examined to find the highest active bid amount at that rank. At block 3514 the one or more listings at rank R having bid amount equal to that highest active bid amount are identified. Among those identified listings the ones with the lowest (earliest) timestamp are identified in block 3516. If more than one such listing has the same earliest timestamp that fact is recognized at block 3518 and control passes to block 3520, where the listing selected is chosen at random from among them. This may alternately be accomplished by any other "tie-breaking" means. Control then passes to block 3522 with a single listing identified. In the case where only one listing at block 3516 has the lowest timestamp then control passes directly from block 3518 to block 3522. At that block the identified listing is inserted into the list of winners at rank R. Block 3524 increments R, from which control loops back up to block 3504 where the new value of R is tested, and the process proceeds until all winners are selected.

Figure 39:
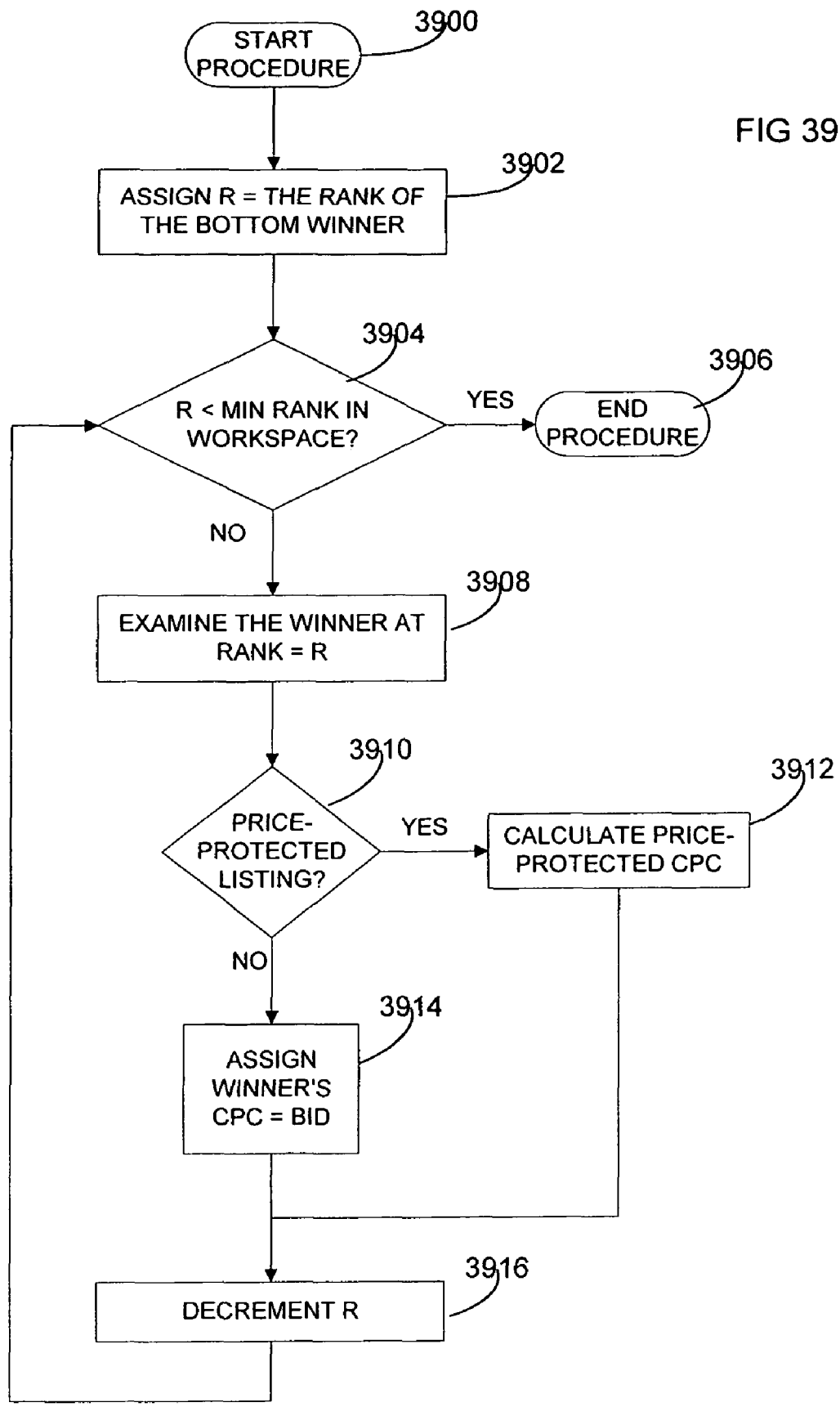

Block 3006 of FIG. 30 performs the operation "DETERMINE CPC'S", which is illustrated in FIG. 39, starting at block 3900. CPC values for the winning listings are determined from the bottom up, by inspection of the active bids at the winning ranks and the timestamps of competing listings, as follows. At block 3902 the variable R is assigned the rank of the bottom-most winner in the list of winners. Block 3904 is a test of the value of R against the minimum rank in the workspace. If R is less than the minimum rank then R refers to a rank which is "off the top" of the workspace, all CPC assignments are complete and control transfers to block 3906 ending the procedure.

If instead R refers to a rank in the workspace, the winner list is examined to identify the winning listing at rank R, block 3908. That listing is examined at block 3910 to determine if it is a price-protected listing. If so, control passes to block 3912 where the CPC of a price-protected listing is calculated. Plural Price & Place Protection listings, Price & Place Protection listings, Price Protection listings, and Place Protection listings are all price-protected, whereas Fixed CPC listings are not. If at block 3910 it is determined that the winning listing is price-protected, control passes to block 3912, where the price-protected CPC is calculated and assigned to the winning listing. One means of accomplishing this calculation and assignment corresponds to FIG. 36 and is described subsequently. If however the listing is not price-protected, control passes from block 3910 to block 3914, where the winning listing's CPC is set equal to that listing's bid at the winning rank.

In either case, price protected or not, control then passes to block 3916 where R is decremented, and control passes back up to block 3904 to process the rank immediately above the one just processed.

Figure 36:
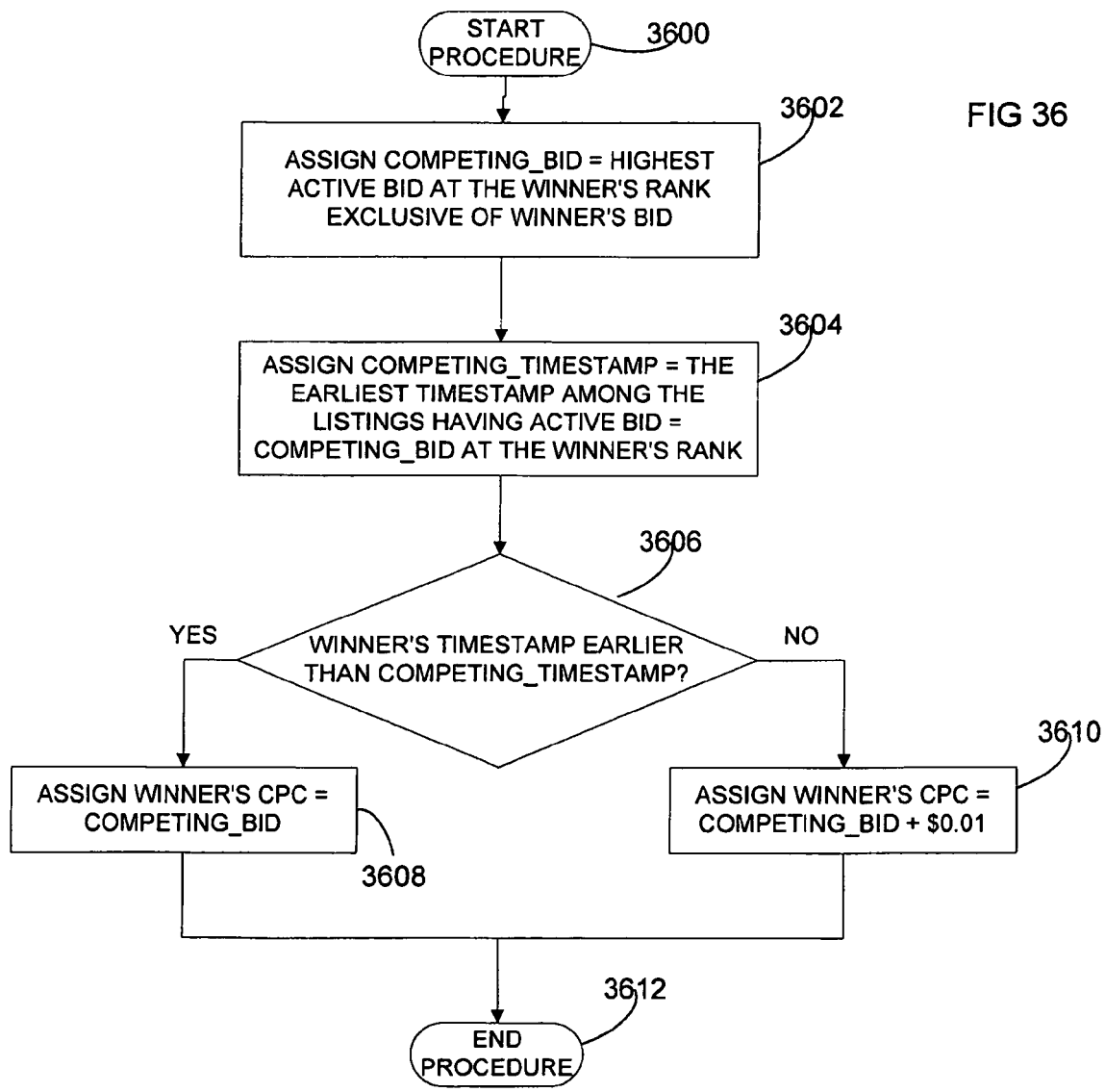

Block 3912 of FIG. 39 performs the operation "CALCULATE PRICE-PROTECTED CPC", which is illustrated in FIG. 36, starting at block 3600. At block 3602 the active bids at the winner's rank are examined to find the highest active bid, exclusive of the winner's own bid. That bid amount is assigned to the variable COMPETING_BID, and may in various instances be any valid bid amount less than or equal to the winning listing's bid.

At block 3604 all the listings at the winner's rank having an active bid equal to the COMPETING_BID are examined for timestamp value. The variable COMPETING_TIMESTAMP is assigned the earliest timestamp among those listings.

The winning listing's timestamp is next compared with COMPETING_TIMESTAMP at block 3606. If the winner's timestamp is earlier the winner has seniority and can claim the rank with only the COMPETING_BID. In that event control passes to block 3608 where the winner's CPC is assigned the value of COMPETING_BID. If the winner's timestamp is not earlier than COMPETING_TIMESTAMP, the winning listing does not have seniority and must bid the minimum raise or bid increment (here $0.01) above the COMPETING_BID block 3610. By one of these two paths the winner's CPC is set, and the procedure ends at block 3612.

Figure 38:
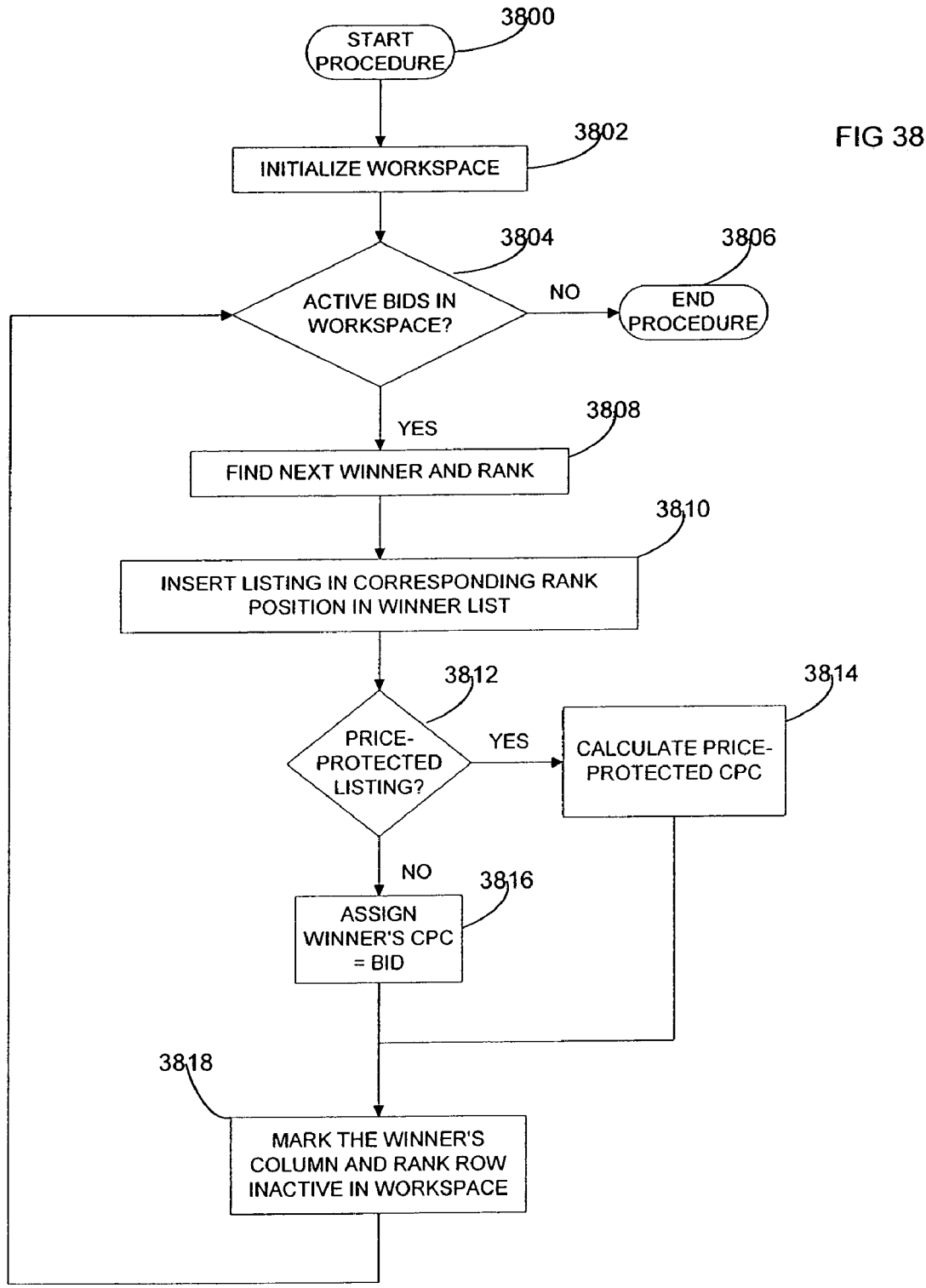

A further variation permits the market to price non-monotonically, in the case where e.g. advertisers are willing to pay a higher CPC for rank 2 than rank 1. FIG. 38 is a flow diagram illustrating one embodiment of this variation. FIG. 31 illustrates the workspace 3100 employed by this procedure, which in the illustrated embodiment is identical in structure and upon initialization to the workspace of the previous variation, with contents which evolve differently as a consequence of the operation of the procedures of this variation. The procedure begins at block 3800 of FIG. 38.

At block 3802, the aforementioned workspace is initialized. This may be accomplishing by the procedure of FIG. 32, described above. At block 3804, the workspace is examined for active bids. If there are none remaining, the winner list in the workspace is complete, and control passes to block 3806, ending the procedure.

If active entries remain in the workspace, control passes to block 3808, where the next winning listing and its corresponding rank are identified. An example procedure to accomplish the identification is described below and illustrated in FIG. 37. At block 3810, the winning listing is inserted in the winners' list at the identified rank. The algorithm then proceeds to determine the CPC for this winning listing.

The listing is examined at block 3812 to determine if it is a price-protected listing. Plural Price & Place Protection listings, Price & Place Protection listings, Price Protection listings, and Place Protection listings are all price-protected, whereas Fixed CPC listings are not. If at block 3812 it is determined that the winning listing is price-protected, control passes to block 3814, where the price-protected CPC is calculated and assigned to the winning listing. This may be accomplished by the procedure of FIG. 36 previously described. If however the listing is not price-protected, control passes from block 3812 to block 3816, where the winning listing's CPC is set equal to that listing's bid at the winning rank.

In either case, price protected or not, control then passes to block 3818 where the workspace is altered to take account of the winner chosen. In particular, the winner's column is marked inactive, as is the row corresponding to the winner's rank. This takes out of subsequent consideration in the operation of this procedure all of the bids of the winning listing, and all other bids at the winning listing's rank.

Figure 37:
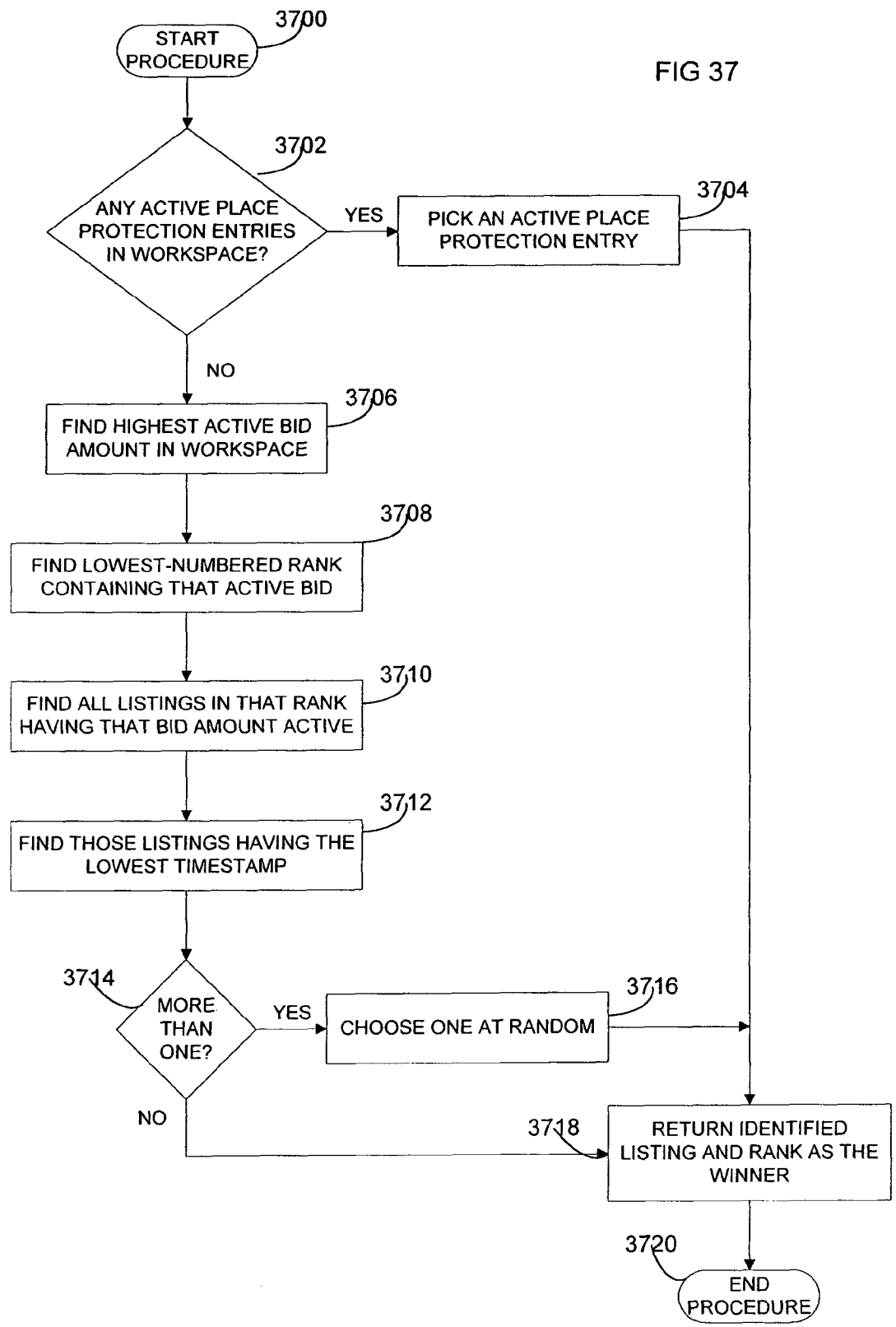

Block 3808 of FIG. 38 performs the operation "FIND NEXT WINNER AND RANK", which is illustrated in FIG. 37, starting at block 3700. The workspace is examined for active Place Protection entries at block 3702, illustrated in FIG. 31 by an "X" for a bid amount. If any are found, at block 3704 one is chosen and control passes to block 3718 to return the listing and its rank, in this case the rank demanded by place protection.

If at block 3702 no active Place Protection entries are found in the workspace, control instead passes to block 3706, where the workspace is searched or examined to find the highest active bid amount. Next, in block 3708 all active bids of that amount are examined to find the lowest-numbered rank in which that highest active bid amount appears. All the active bid values at that identified rank are examined in block 3710 to identify all the listings that have that highest active bid amount active at that lowest-numbered rank. Among those identified listings the ones with the lowest (earliest) timestamp are identified in block 3712. If more than one such listing has the same earliest timestamp that fact is recognized at block 3714 and control passes to block 3716, where the listing selected is chosen at random from among them. This may alternately be accomplished by any other "tie-breaking" means. Control then passes to block 3718 with a single listing identified. At that block the identified listing and rank is returned as the winning combination, and the procedure ends at block 3720.

From the foregoing, it can be seen that the present embodiments provide a method and apparatus for advertisers appearing in a pay for placement web site to maintain their desired place within the rankings of search listings as presented to searchers as the competitive environment changes, with a much lower expenditure of human effort. The system in accordance with these embodiments provides agents operating in software, hardware or a combination of the two on behalf of the advertiser to from time to time update automatically the advertiser's search listing according to the advertiser's specified desired ranking and/or maximum cost per click. The system allows the advertisers to automatically manage their search listings and advertising expenditures related thereto. For the operator of a pay for placement web site, the system reduces or eliminates oscillations or other rapid variations that are detrimental to the average CPC and impact revenue and costs for the operator.

While a particular embodiment of the present invention has been shown and described, modifications may be made. For example, while the methods described herein are illustrated as software routines implemented as one or more procedures that may be called by an account management server, the illustrated functionality may be provided in any suitable manner, including any combination of hardware and software and any degree of direct or distributed processing. It is therefore intended in the appended claims to cover such changes and modifications which follow in the true spirit and scope of the invention.

The invention claimed is:

1. A database searching apparatus comprising:
   a search engine web server operative to provide search results including search listings according to rank;
   a database searchable by the search engine web server and including a plurality of search listings, at least some search listings being associated with advertisers, the search listing associated with an advertiser including
      a search term specified by the advertiser, and
      a desired rank specified by the advertiser for a search listing and a maximum cost per click (maximum CPC) and a cost per click (CPC) associated with the desired rank for the search term and the advertiser,
   an account management server in data communication with the database to automatically adjust the CPC for a search listing in response to advertiser inputs,
   wherein, when the advertiser enters a new search listing or changes the maximum CPC of a search listing, the account management server is operative to:
      adjust the CPC of the advertiser's search listing to maintain the desired rank,
      adjust the CPC of the advertiser's search listing to move the search listing to the highest rank possible without exceeding the maximum CPC of the advertiser's search listing,
      adjust the CPC of the advertiser's search listing to maintain the CPC of the advertiser's search listing less than or equal to the maximum CPC of the advertiser's search listing, and
      avoid setting the CPC of the advertiser's search listing so that desired rank and CPCs of other advertisers are not maintained.

2. The database searching apparatus of claim 1, wherein the database further stores a timestamp associated with the desired rank, the timestamp indicating a time the search listing was entered or changed.

3. The database searching apparatus of claim 2, wherein the search engine is configured to:
   receive a search request;
   locate one or more search listings having a matching relationship with the search request; and
   order search results from the one or more search listings using the CPC associated with the one or more search listings.

4. The database searching apparatus of claim 1, further comprising:
   an account manager accessible by the advertiser to vary at least one of the maximum CPC and the desired rank for a respective search listing.

5. The database searching apparatus of claim 4, wherein the account manager is further accessible by the advertiser to vary the maximum CPC for two or more possible ranks specified by the advertiser.

6. The database searching apparatus of claim 1, further comprising:
   one or more software agents configured to:
      receive advertiser bid information; and
      act on the advertiser bid information to adjust the CPC for a specified search listing.

7. The database searching apparatus of claim 6, wherein the one or more software agents is configured to:
   increase the current CPC of the specified search listing if the rank of the specified search listing can be improved without exceeding the maximum CPC, otherwise, not adjust the current CPC of the specified search listing; and
   decrease the current CPC of the specified search listing without moving the specified search listing to a rank worse than the desired rank.

8. The database searching apparatus of claim 7, wherein the one or more software agents are configured to decrease the current CPC of the specified search listing only if no other search listing will have its respective current CPC increased to decrease the rank of the specified search listing, otherwise, to not adjust the current CPC of the specified search listing.

* * * * *